United States Patent
Chiu et al.

(10) Patent No.: US 12,523,651 B2
(45) Date of Patent: Jan. 13, 2026

(54) DIGITAL AMPLIFICATION FOR PROTEIN DETECTION

(71) Applicant: Lamprogen, Inc., Seattle, WA (US)

(72) Inventors: Daniel T. Chiu, Seattle, WA (US); Peter Allen, Seattle, WA (US)

(73) Assignee: Lamprogen, Inc., Seattle, WA (US)

( * ) Notice: Subject to any disclaimer, the term of this patent is extended or adjusted under 35 U.S.C. 154(b) by 858 days.

(21) Appl. No.: 17/279,275

(22) PCT Filed: Sep. 25, 2019

(86) PCT No.: PCT/US2019/053034
§ 371 (c)(1),
(2) Date: Mar. 24, 2021

(87) PCT Pub. No.: WO2020/069045
PCT Pub. Date: Apr. 2, 2020

(65) Prior Publication Data
US 2021/0403990 A1    Dec. 30, 2021

Related U.S. Application Data

(60) Provisional application No. 62/736,972, filed on Sep. 26, 2018.

(51) Int. Cl.
*C12Q 1/6804* (2018.01)
*G01N 33/543* (2006.01)

(52) U.S. Cl.
CPC ..... *G01N 33/54306* (2013.01); *C12Q 1/6804* (2013.01); *G01N 2458/10* (2013.01)

(58) Field of Classification Search
CPC .......... G01N 2458/10; C12Q 2563/159; C12Q 2563/179; C12Q 2531/113
See application file for complete search history.

(56) References Cited

U.S. PATENT DOCUMENTS

| 7,932,060 B2 * | 4/2011 | Nadeau ................ C12Q 1/6851 435/7.1 |
| 2005/0009050 A1 | 1/2005 | Nadeau et al. |

(Continued)

FOREIGN PATENT DOCUMENTS

| WO | 2004094456 A2 | 11/2004 |
| WO | WO-2012112804 A1 | 8/2012 |

(Continued)

OTHER PUBLICATIONS

Zanoli et al. Isothermal amplification methods for the detection of nucleic acids in microfluidic devices. Biosensors (Basel). Dec. 27, 2012;3(1):18-43. doi: 10.3390/bios3010018. PMID: 25587397; PMCID: PMC4263587. (Year: 2012).*

(Continued)

*Primary Examiner* — Aaron A Priest
*Assistant Examiner* — Tian Nmn Yu
(74) *Attorney, Agent, or Firm* — Kilpatrick Townsend & Stockton LLP

(57) ABSTRACT

The present disclosure provides a method of measuring the quantity of analyte molecules. In some aspects, the method comprises compartmentalizing a sample with binding molecules conjugated to synthetic nucleic acid molecules such that the interaction of the binding molecules with the analyte molecules brings the nucleic acid molecules into proximity. Proximity triggers reactions that result in an optical signal, such as fluorescence, in analyte-containing compartments which can be counted to determine the quantity of analyte present.

17 Claims, 19 Drawing Sheets

Specification includes a Sequence Listing.

(56) References Cited

U.S. PATENT DOCUMENTS

| | | | |
|---|---|---|---|
| 2009/0017453 | A1 | 1/2009 | Maples et al. |
| 2009/0081670 | A1 | 3/2009 | Maples et al. |
| 2012/0264132 | A1 | 10/2012 | Ismagilov et al. |
| 2013/0288249 | A1 | 10/2013 | Gullberg et al. |
| 2015/0038356 | A1* | 2/2015 | Karlin-Neumann ........................ C12Q 1/6827 435/5 |
| 2018/0164308 | A1 | 6/2018 | Walter et al. |
| 2022/0356512 | A1 | 11/2022 | Chiu et al. |
| 2022/0357318 | A1 | 11/2022 | Aghvanyan et al. |

FOREIGN PATENT DOCUMENTS

| | | |
|---|---|---|
| WO | 2015035087 A1 | 3/2015 |
| WO | WO-2017205344 A1 | 11/2017 |
| WO | WO-2018160397 A1 | 9/2018 |
| WO | 2020069045 A1 | 4/2020 |

OTHER PUBLICATIONS

Tan et al., Specific versus nonspecific isothermal DNA amplification through thermophilic polymerase and nicking enzyme activities. Biochemistry. Sep. 23, 2008;47(38):9987-99. doi: 10.1021/bi800746p. Epub Aug. 26, 2008. PMID: 18729381; PMCID: PMC4097029 (Year: 2008).*

Lundberg et al., Homogeneous antibody-based proximity extension assays provide sensitive and specific detection of low-abundant proteins in human blood, Nucleic Acids Research, vol. 39, Issue 15, Aug. 1, 2011, p. e102 (Year: 2011).*

Ang et al., Engineering a robust DNA split proximity circuit with minimized circuit leakage, Nucleic Acids Research, May 20, 2016, vol. 44, No. 14, e121, 9 Pages.

Cao et al., Magnetic-Immuno-Loop-Mediated Isothermal Amplification Based on DNA Encapsulating Liposome for the Ultrasensitive Detection of P-glycoprotein, Scientific Reports, Aug. 24, 2017, vol. 7, No. 9312, pp. 1-7.

Chen Xi, Expanding the rule set of DNA circuitry with associative toehold activation, Journal of the American Chemical Society, Jan. 11, 2012, vol. 134, No. 1, pp. 263-271.

Compton J, Nucleic acid sequence-based amplification:, Nature, Mar. 7, 1991, vol. 350, No. 6313, pp. 91-92.

Dhillon et al., Homogeneous and digital proximity ligation assays for the detection of Clostridium difficile toxins A and B, Biomolecular Detection and Quantification, Aug. 31, 2016, vol. 10, pp. 2-8.

Engelen et al., Antibody-controlled actuation of DNA-based molecular circuits, Nature Communications, Feb. 17, 2017, vol. 8, No. 14473, pp. 1-8.

Fredriksson et al., Protein detection using proximity-dependent DNA ligation assays, Nature Biotechnology, May 2002, vol. 20, pp. 473-477.

Gao et al., Proximity hybridization triggered rolling-circle amplification for sensitive electrochemical homogeneous immunoassay, Analyst, Sep. 27, 2017, vol. 142, No. 22, pp. 4308-4316.

He et al., mRNA-Initiated, Three-Dimensional DNA Amplifier Able to Function inside Living Cells, Journal of the American Chemical Society, Dec. 6, 2017, vol. 140, No. 1, pp. 258-263.

Joneja et al., Linear nicking endonuclease-mediated strand-displacement DNA amplification. Analytical Biochemistry, Jul. 1, 2011, vol. 414, No. 1, pp. 58-69.

Kim et al., Homogeneous entropy-driven amplified detection of biomolecular interactions, ACS Nano, Jul. 27, 2016, vol. 10, No. 8, pp. 7467-7475.

Koos, et al., Proximity-dependent initiation of hybridization chain reaction, Nature Communications, Jun. 12, 2015, vol. 6, No. 7294, pp. 1-10.

Murakami et al., Sensitive isothermal detection of nucleic acid sequence by primer generation-rolling circle amplification, Nucleic Acids Research, Dec. 23, 2008, vol. 37, No. 3, e19, 9 Pages.

PCT/US2019/053034, International Preliminary Report on Patentability mailed Mar. 23, 2021, 11 Pages.

PCT/US2019/053034, International Search Report and Written Opinion mailed Jan. 28, 2020, 18 Pages.

PCT/US2019/053034, Invitation to Pay Additional Fees dated Dec. 4, 2019, 4 Pages.

Pourhassan-Moghaddam et al., Protein detection through different platforms of immuno-loop-mediated isothermal amplification, Nanoscale Research Letters, Nov. 2013, vol. 8, No. 1, 485, 11 Pages.

Qian et al., Sequence dependence of isothermal DNA amplification via EXPAR, Nucleic Acids Research, Mar. 13, 2012, vol. 40, No. 11, e87, 15 Pages.

Schroder et al., Immuno-PCR with digital readout, Biochemical and Biophysical Research Communications, May 5, 2017, vol. 488, pp. 311-315.

Song et al., Development and Validation of Digital Enzyme-Linked Immunosorbent Assays for Ultrasensitive Detection and Quantification of Clostridium difficile Toxins in Stool, Journal of Clinical Microbiology, Oct. 2015, vol. 53, No. 10, pp. 3204-3212.

Srinivas et al., On the biophysics and kinetics of toehold-mediated DNA strand displacement, Nucleic Acids Research, Sep. 9, 2013, vol. 41, No. 22, pp. 10641-10658.

Van Ness et al., Isothermal reactions for the amplification of oligonucleotides, Proceedings of the National Academy of Sciences, Apr. 15, 2003, vol. 100, No. 8, pp. 4504-4509.

Yin et al., Programming biomolecular self-assembly pathways, Nature, Jan. 17, 2008, vol. 451, pp. 318-322.

Yu et al., Proximity hybridization-mediated isothermal exponential amplification for ultrasensitive electrochemical protein detection, International Journal of Nanomedicine, Aug. 2017, vol. 12, pp. 5903-5914.

Zhang et al., Digital quantification of miRNA directly in plasma using integrated comprehensive droplet digital detection, Lab on a Chip, Nov. 7, 2015, vol. 15, No. 21, pp. 4217-4226.

Zhou et al., Proximity hybridization-regulated catalytic DNA hairpin assembly for electrochemical immunoassay based on in situ DNA template-synthesized Pd nanoparticles, Analytica Chimica Acta, Mar. 17, 2017, vol. 969:8, 10 Pages.

EP Application No. 19868104.1 Extended European Search Report dated May 25, 2022.

JP2021-516745, "Office Action", Nov. 18, 2024, 2 pages.

Greenwood C., et al., "Proximity Assays for Sensitive Quantification of Proteins," Biomolecular Detection and Quantification, Jun. 1, 2015, vol. 4, XP055364680, pp. 10-16.

Li L., et al., "Highly Sensitive and Homogeneous Detection of Membrane Protein on a Single Living Cell by Aptamer and Nicking Enzyme Assisted Signal Amplification Based on Microfluidic Droplets," Analytical Chemistry, Apr. 29, 2014, vol. 86, No. 10, XP055832197, pp. 5101-5107.

Tan Y., et al., "Proximity-Dependent Protein Detection based on Enzyme-Assisted Fluorescence Signal Amplification," Biosensors and Bioelectronics, Jan. 15, 2014, vol. 51, XP055443937, pp. 255-260.

* cited by examiner

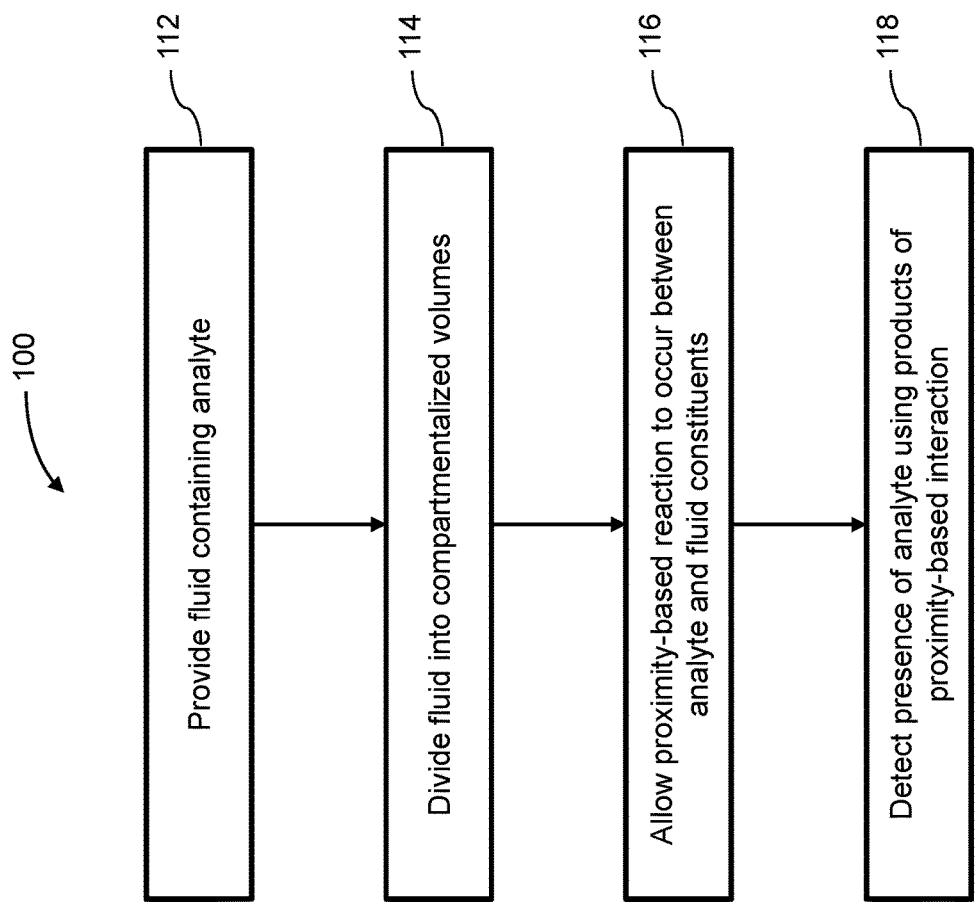

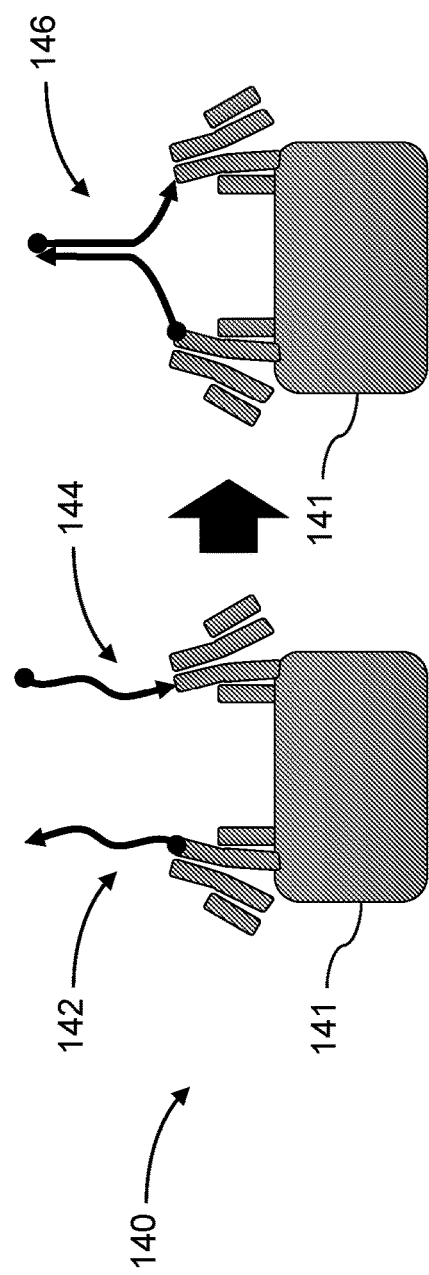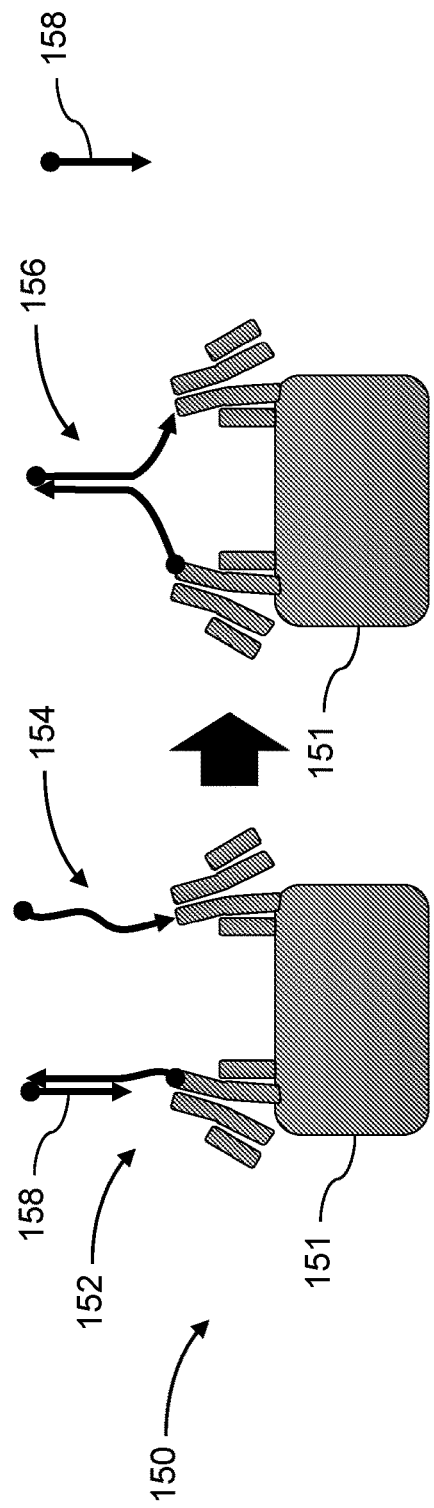

DIGITAL AMPLIFICATION FOR PROTEIN DETECTION

CROSS-REFERENCES TO RELATED APPLICATIONS

The present application is a U.S. National Phase Application under 35 U.S.C. § 371 of International Application No. PCT/US2019/053034, filed Sep. 25, 2019, which claims the benefit of U.S. Provisional Application No. 62/736,972, filed Sep. 26, 2018, each of which are expressly incorporated herein in their entirety for all purposes.

SEQUENCE LISTING

The instant application contains a Sequence Listing which has been submitted electronically in ASCII format and is hereby incorporated by reference in its entirety. Said ASCII copy, created on Sep. 24, 2019, is named 39355-701_601_SL.txt and is 2,585 bytes in size.

BACKGROUND

Digital assays, in which measurements are made based on a counting of binary yes or no responses, are increasingly important in biology, owing to their robustness, sensitivity and accuracy. Whereas analog measurements often require calibration with a running standard, digital measurements do not require calibration, and have the potential to be faster, easier to implement, more accurate, and more robust than analog methods.

Given the limitations inherent in analog assays, and the technical limitations of existing digital assays, it is clear that there is a need to provide improved methods and apparatuses for performing digital protein assays. The invention described herein addresses this need and more.

SUMMARY

The present disclosure provides methods, systems, and compositions for performing assays. In various aspects, the present disclosure relates to digital assays, and in particular aspects protein assays, that can be performed using an amplification reaction and/or in a single step or single container. In some aspects, the amplification reaction is an isothermal amplification reaction. In certain aspects, the isothermal amplification is a digital isothermal amplification. In some aspects, the amplification reaction is a PCR amplification. In certain aspects, the PCR amplification is a digital PCR amplification. In many aspects, the assays disclosed herein are performed without a washing step. The present disclosure further relates to assays that can be performed as a homogeneous assay, that is, without reaction agents attached to solid supports. In many embodiments the homogeneous assay uses a homogeneous solution, which can be a solution in which all inputs to a proximity-triggered amplification reaction are smaller than about 50 nm. Optionally, the homogeneous solution can include analytes and/or optical probes larger than 50 nm.

In various aspects, the present disclosure provides a method for digital detection of an analyte. A fluid is divided into a plurality of compartmentalized fluid volumes to form a homogeneous assay, such that some volumes contain analyte and some do not. An optical signal is triggered by a proximity-induced interaction in the analyte-containing volumes involving the analyte and a constituent of the compartmentalized volume. The presence of analyte is detected in the analyte-containing volumes based on the optical signal from those volumes. During the detection, the fluid in each of the plurality of compartmentalized fluid volumes consists essentially of the respective compartmentalized fluid volumes produced by the dividing step and reaction products produced therefrom.

That is, after dividing the fluid into respective compartmentalized volumes, the participants in the reaction are maintained in the respective volumes of fluid, or consumed to produce reaction products, but are not removed, nor are additional reaction products or participants added. On the other hand, material not materially participant in the reaction can be added or removed; for example, some fluid might evaporate or be added.

In many aspects, the analyte is a protein.

In many aspects, each fluid volume of the plurality of compartmentalized fluid volumes comprises a first probe and a second probe. The first probe comprises a first binding portion configured to bind to the analyte, and the first binding portion is bonded to a first nucleic acid molecule. The second probe comprises a second binding portion configured to bind to the analyte, and the second binding portion is bonded to a second nucleic acid molecule. In many aspects, the proximity-induced interaction occurs between the first and second probes upon binding to the analyte, and triggers an amplification reaction. The optical signal can be a fluorescence signal triggered by the amplification reaction in the analyte-containing volumes.

In many aspects, the first and second nucleic acids are DNA strands. For example, each can be a single DNA strand optionally conjugated with other nucleic acid molecules.

In some aspects, the method can include counting the number of volumes in which fluorescence is generated and thereby generating an analyte count for the sample. For example, the analyte count can be generated based on Poisson statistics.

In some aspects, the amplification reaction is an isothermal reaction. In certain aspects, the isothermal amplification is a digital isothermal amplification. In some aspects, the amplification reaction is a PCR amplification. In certain aspects, the amplification reaction is a digital PCR amplification. In some aspects, the method is performed without a ligase.

In some aspects, while detecting the presence of the analyte using the optical signal, each of the plurality of compartmentalized volumes consists of the respective compartmentalized fluid volume produced by the dividing step and reaction products produced therefrom. That is, the detection step is performed on the same compartmentalized volumes of fluid as generated in the dividing step. For example, upon dividing the fluid, each fluid volume can be maintained as a closed system. In some aspects, the fluid is divided into a plurality of closed containers, and each fluid volume is contained within a single container throughout the remainder of the method until the detection of the analyte using the optical signal.

In many aspects, the method is performed without a washing step. In some aspects, the optical signal is an absorption signal or a luminescent signal.

In some aspects, at least one of the proximity-induced interaction and the amplification reaction is an isothermal reaction. In certain aspects, the proximity-induced interaction is an isothermal reaction. In certain aspects, the amplification reaction is an isothermal reaction. In certain aspects, the isothermal reaction is a digital isothermal amplification. In some aspects, the amplification reaction is a PCR reaction. In certain aspects, the amplification reaction is a digital PCR reaction. In many aspects, the proximity-induced interaction and the amplification reaction are both isothermal reactions.

In many aspects, the proximity-induced interaction is a strand displacement interaction. In some aspects, prior to the proximity-induced interaction the second nucleic acid molecule is bound to a non-extendable blocker oligonucleotide. The proximity-induced interaction comprises an interaction between the first and second nucleic acids that displaces the blocker oligonucleotide into solution, and the amplification reaction comprises inducing templated polymerization to extend the first nucleic acid molecule after displacement of the blocker oligonucleotide. The second nucleic acid can be a template for the extension of the first nucleic acid, for example. Each fluid volume can comprise a nicking endonuclease configured to cleave the extended first nucleic acid, allowing the release of a nicked portion into solution. Nicking endonuclease may be an enzyme or ribozyme or RNA guided endonuclease such as versions of Cas9. The optical signal can be triggered based on the release of the nicked portion in the analyte-containing volumes.

In some aspects, the amplification reaction repeatedly extends the first nucleic acid and the nicking endonuclease repeatedly cleaves the extended first nucleic acid, thereby causing an accumulation of nicked nucleic acid chains. In some aspects, each fluid volume contains a plurality of fluorescent moieties configured to bind to the accumulated nicked nucleic acid chains, and the fluorescence is triggered by a binding of the fluorescent moieties to the accumulated nicked nucleic acid chains and by illuminating the plurality of volumes with light near resonance to the bound fluorescent moieties, thereby inducing fluorescence from the bound fluorescent moieties.

In some aspects, the fluorescent moieties are dyes. In some aspects, the fluorescent moieties are proteins. In some aspects, the fluorescent moieties are polymer dots.

In some aspects, each fluid volume comprises a plurality of auxiliary substrates. In some aspects, the auxiliary substrates each comprise an auxiliary nucleic acid chain, and at least some of the auxiliary substrates are bound to an auxiliary non-extendable blocker oligonucleotide. In some aspects, the auxiliary substrates each comprise an auxiliary nucleic acid chain, and none of the auxiliary substrates are bound to an auxiliary non-extendable blocker oligonucleotide. Auxiliary nucleic acid chain is configured to bind to the nicked portion of the extended first nucleic acid, thereby displacing the auxiliary non-extendable blocker oligonucleotide and forming an auxiliary nucleic acid complex in solution. The auxiliary nucleic acid complex comprises the nicked portion and the auxiliary nucleic acid chain, and it is configured to extend the nicked portion and repeatedly trigger removal of part of the extended nicked portion by the nicking endonuclease or a polymerase. The removed extended nicked portion comprises a copy of the originally-removed nicked portion. This process can produce an exponential amplification for the accumulation of nucleic acid product.

In many aspects, the amplification reaction is selected from the group consisting of an enzyme-free hairpin assembly reaction, an enzyme-free catalyzed hairpin reaction, an enzyme-free hybridization chain reaction, and a proximity-induced rolling circle amplification.

In some aspects, the amplification reaction is a rolling circle amplification, and the second probe includes a rolling circle amplification substrate bound to the second nucleic acid molecule. The rolling circle substrate comprises a circular nucleic acid chain. The circular nucleic acid chain comprises a first binding site to bind the first nucleic acid molecule and a second binding site to bind the second nucleic acid molecule. These sites can optionally overlap partially or totally; for example, one site can be a subset of the other. The circular nucleic acid chain can have an equal or higher affinity between the first binding site and the first nucleic acid molecule than between the second binding site and the second nucleic acid molecule, thereby promoting transfer of the circular nucleic acid chain to the first nucleic acid molecule. In some cases, the second binding site comprises one or more mismatched nucleic acids not complementary to corresponding nucleic acids of the second nucleic acid molecule.

In various aspects, the present disclosure provides a method for digital detection of protein analyte. A fluid is divided into a plurality of compartmentalized fluid volumes to form a homogenous assay, such that some volumes contain analyte and some do not. Each compartmentalized fluid volume further comprises a first probe comprising a first binding portion bonded to a first nucleic acid molecule; and a second probe comprising a second binding portion bonded to a second nucleic acid molecule. Each binding portion is configured to bind to an analyte; for example, to different loci on a common protein molecule. A proximity-induced interaction occurs between the first and second nucleic acid molecules upon binding to the analyte, and an amplification reaction results in the compartmentalized analyte-containing volumes. The presence of the analyte in the analyte-containing volumes is detected based on the amplification reaction. In some aspects, the amplification reaction is an isothermal amplification reaction. In certain aspects, the isothermal amplification is a digital isothermal amplification. In some aspects, the amplification reaction is a PCR amplification. In certain aspects, the amplification reaction is a digital PCR amplification.

In some aspects, the detection is performed by illuminating the plurality of compartmentalized volumes with light and detecting fluorescence from the compartmentalized analyte-containing volumes.

In some aspects, the dividing step includes placing each compartmentalized fluid volume into a respective container of a plurality of containers. Each compartmentalized fluid volume can remain in its respective container until the detection step has been performed.

In many aspects, the proximity-induced interaction triggers an amplification reaction in which the second nucleic acid molecule is extended. In some aspects, the second nucleic acid molecule is extended using the first nucleic acid as a template. In some cases, the first nucleic acid molecule is bound to a rolling-circle substrate prior to the proximity-induced interaction and the proximity-induced interaction triggers extension of the second nucleic acid molecule using the rolling-circle substrate as a template.

In many aspects, the first nucleic acid is bound to an extendible substrate prior to the proximity-induced interaction and the proximity-induced interaction causes the extendible substrate to be released into solution. In some aspects, the release of the extendible substrate triggers an exponential amplification reaction.

In some aspects, the proximity-induced interaction triggers a hairpin-assembly reaction. In some aspects, the proximity-induced interaction produces a catalytic surface composed of parts of the first and second nucleic acid molecules. In some cases, the fluid comprises an auxiliary substrate coupled to an auxiliary non-extendible blocker oligonucleotide, and the catalytic surface displaces the auxiliary non-extendible blocker oligonucleotide, thereby triggering an amplification reaction involving the auxiliary substrate. In some cases, the fluid comprises a rolling circle substrate coupled to an auxiliary non-extendible blocker oligonucleotide, and the catalytic surface displaces the auxiliary non-extendible blocker oligonucleotide, thereby triggering an amplification reaction involving the rolling circle substrate. In some cases, the fluid comprises a plurality of folded hairpin molecules, and the catalytic surface catalyzes an unfolding of at least one of the plurality of folded hairpin molecules.

In various aspects, a method is provided for detecting the presence of an analyte in a fluid via strand displacement amplification. A first probe and a second probe are provided in solution. The first probe comprises a first binding portion configured to bind to the analyte, and the binding portion is conjugated to a first nucleic acid molecule. The second probe comprises a second binding portion configured to bind to the analyte, and the binding portion is conjugated to a first nucleic acid molecule. The second nucleic acid molecule is bound to a non-extendable blocker oligonucleotide. The non-extendable blocker oligonucleotide is displaced into solution by a proximity-induced interaction between the first and second probes, which can occur upon binding of each to a single analyte. Templated polymerization is induced to extend the first nucleic acid molecule, and this extension is used to trigger an optical signal, which is used to detect the analyte in the fluid. In some aspects, the optical signal is fluorescence.

In many aspects, displacing the non-extendable blocker oligonucleotide comprises binding the first nucleic acid molecule to the second nucleic acid molecule. Furthermore, extending the first nucleic acid molecule can comprise using the second nucleic acid molecule as a template. In some aspects, a nicking endonuclease is provided in the fluid that is configured to cleave the extended first nucleic acid, allowing the release of a nicked portion into solution.

In some aspects, the fluid comprises a plurality of auxiliary substrates. In some aspects, the auxiliary substrates each comprise an auxiliary nucleic acid chain, and at least some of the auxiliary substrates are bound to an auxiliary non-extendable blocker oligonucleotide. In some aspects, the auxiliary substrates each comprise an auxiliary nucleic acid chain, and none of the auxiliary substrates are bound to an auxiliary non-extendable blocker oligonucleotide. The auxiliary nucleic acid chain is configured to bind to the nicked portion of the extended first nucleic acid, thereby displacing the auxiliary non-extendable blocker oligonucleotide and forming in solution an auxiliary nucleic acid complex comprising the nicked portion and the auxiliary nucleic acid chain. The auxiliary nucleic acid complex is configured to extend the nicked portion and repeatedly trigger removal of part of the extended nicked portion using the nicking endonuclease or a polymerase, said removed extended nicked portion comprising a copy of the originally-removed nicked portion. For example, the nicking endonuclease can cleave the extended nicked portion, which can be dislodged into solution by a polymerase performing an additional extension.

In many aspects, the analyte is a protein. In various aspects, the nucleic acid molecules are DNA.

In various aspects, the present disclosure provides a composition for use in detection of analyte. The composition comprises a solution containing a first probe comprising a first binding portion bonded to a first nucleic acid molecule and a second probe comprising a second binding portion bonded to a second nucleic acid molecule. Each of the first and second binding portions is configured to bind to the analyte. The second nucleic acid molecule is also bound to a non-extendable blocker oligonucleotide. The first and second nucleic acid chains comprise corresponding sections of nucleic acids, such that when the first and second probes are brought into proximity by binding to the analyte, the non-extendable blocker oligonucleotide is displaced into solution by a proximity-induced interaction between the first and second probes. Furthermore, no participant in the proximity-induced interaction is bound directly or indirectly to a solid support.

In many aspects, the solution further comprises a polymerase to extend the first nucleic acid upon the displacement of the non-extendable blocker oligonucleotide by the proximity-induced interaction. In some aspects, the solution further comprises a nicking endonuclease configured to cleave a nicked portion of the extended first nucleic acid, releasing said nicked portion into solution. The solution can further comprise fluorescent moieties configured to fluoresce in response to an accumulation of nucleic acid when illuminated. In some cases, the solution further comprises a plurality of auxiliary substrates. In some aspects, the auxiliary substrates each comprise an auxiliary nucleic acid chain, and at least some of the auxiliary substrates are bound to an auxiliary non-extendable blocker oligonucleotide. In some aspects, the auxiliary substrates each comprise an auxiliary nucleic acid chain, and none of the auxiliary substrates are bound to an auxiliary non-extendable blocker oligonucleotide. The auxiliary nucleic acid chain is configured to bind to the nicked portion of the extended first nucleic acid, thereby displacing the auxiliary non-extendable blocker oligonucleotide and forming in solution an auxiliary nucleic acid complex comprising the nicked portion and the auxiliary nucleic acid chain. The auxiliary nucleic acid complex is configured to extend the nicked portion and repeatedly trigger removal of part of the extended nicked portion by the nicking endonuclease or a polymerase. The removed extended nicked portion can comprise a copy of the originally-removed nicked portion.

In various aspects, the present disclosure provides a system for digital detection of an analyte. The system comprises a plurality of fluid volumes respectively disposed in a plurality of compartments. Some of the plurality of fluid volumes are compartmentalized non-analyte-containing volumes and others are compartmentalized analyte-containing volumes. Each fluid volume contains a first probe comprising a first binding portion configured to bind to the analyte, said first binding portion conjugated to a first nucleic acid molecule. Each fluid volume further contains a second probe comprising a second binding portion configured to bind to the analyte, said second binding portion conjugated to a second nucleic acid molecule. The system further comprises a light source configured to illuminate the fluid volumes within the compartments and induce fluorescence in response to an amplification reaction triggered by a proximity-induced interaction between the first and second probes. In some aspects, the amplification reaction is an isothermal amplification reaction. In certain aspects, the isothermal amplification is a digital isothermal amplification. In some aspects, the amplification reaction is a PCR amplification. In certain aspects, the amplification reaction is a digital PCR amplification. The interaction occurs upon binding of the first and second probes to analyte in solution within the compartments.

In many aspects, the system further comprises a detector configured to detect the fluorescence from the compartmentalized analyte-containing volumes and generate a count of analyte specimens based on the detection of fluorescence.

In many aspects, the amplification reaction includes templated polymerization, or a cascade dequenching reaction. In some aspects, the amplification reaction including templated polymerization or a cascade dequenching reaction is an isothermal amplification reaction. In certain aspects, the amplification reaction including templated polymerization or cascade dequenching reaction is a digital isothermal amplification. In some aspects, the amplification reaction including templated polymerization or a cascade dequenching reaction is a PCR amplification. In certain aspects, the amplification reaction including templated polymerization or a cascade dequenching reaction is a digital PCR amplification.

In many aspects, the proximity-induced interaction is a strand displacement interaction. In many aspects, the proximity-induced interaction is selected from the group consisting of an enzyme-free hairpin assembly reaction, an enzyme-free catalyzed hairpin reaction, an enzyme-free hybridization chain reaction, and a proximity-induced rolling circle amplification.

In some aspects, the system is configured to divide a fluid to generate the plurality of fluid volumes. The system can be further configured to maintain each of the plurality of fluid volumes as an essentially closed fluid system upon dividing the fluid until detecting the inducing of fluorescence. The essentially closed fluid system can allow for addition or removal of matter not material to the interactions or reaction, such as gain or loss of fluid through addition or evaporation, for example. Alternatively, the essentially closed fluid system can be entirely closed, maintaining the original fluid constituents in each volume, plus any reaction products.

In some aspects, a system may include fluid compartments that are essentially closed except that certain reaction products, such as nucleotide triphosphates, are allowed to flow into and out of individual compartments. In such embodiments, when used as a digital assay for analyte detection, it is necessary that neither analyte nor reaction products (e.g., nucleic acid strands generated by the amplification reaction) be allowed to travel between compartments.

In various aspects, a method is provided for analyte detection. A fluid is provided containing an analyte, a first probe, and a second probe. The first probe comprises a first binding portion conjugated to a first DNA molecule. The second probe comprises a second binding portion conjugated to a second DNA molecule. Each of the first and second binding portions is configured to bind to the analyte. The second DNA molecule includes an RNA polymerase binding site, and is bound to a blocker oligonucleotide blocking the RNA polymerase binding site. The first and second binding portions are allowed to bind to a common molecule of the analyte, thereby bringing the first and second probes into proximity. A proximity-induced interaction results between the DNA molecules of the probes, causing the displacement of the blocker oligonucleotide into solution. RNA polymerase then induces the transcription of RNA from the second DNA molecule, and presence of the analyte in the fluid is detected based on the transcription. In many aspects, the transcription of RNA triggers the production of an optical signal, such as fluorescence, that is used for the detection. In some aspects, fluorescence is triggered by an accumulation of RNA.

In some aspects, the transcribed RNA is further amplified using nucleic acid sequence-based amplification. In some aspects, the method is performed using a homogeneous assay. For example, the method can be a digital assay.

In various aspects, a composition for detection of an analyte is provided. The composition comprises a homogeneous fluid containing a first probe and a second probe. The first probe comprises a first binding portion configured to bind to the analyte and bonded to a first DNA molecule. The second probe comprises a second binding portion configured to bind to the analyte and bonded to a second DNA molecule. The second DNA molecule includes an RNA polymerase binding site, and the second DNA molecule is bound to a blocker oligonucleotide blocking the RNA polymerase binding site. The fluid further comprises an RNA polymerase and a fluorescent moiety. The first and second binding DNA molecules are configured to produce a proximity-based interaction when brought into proximity upon binding of the first and second binding portions to a common molecule of the analyte. The proximity-based interaction displaces the blocker oligonucleotide into solution and allows the RNA polymerase to transcribe RNA using the second DNA molecule as a template.

In many aspects, the composition further comprises one or more moieties selected from the group consisting of reverse transcriptase, RNAse H, nucleotide triphosphates, deoxynucleotide triphosphates, and DNA primers for amplifying the transcribed RNA using nucleic acid sequence-based amplification. For example, the composition can include all of the above-listed moieties.

In some aspects, the fluorescent moiety is a fluorescent dye, a fluorescent nanoparticle, or a fluorescent protein.

In various aspects, the amplification reactions disclosed herein are attached reactions that occur in proximity to the analyte. In other aspects, the amplification reactions disclosed herein are detached reactions that occur in solution and not necessarily in proximity to the analyte. In certain aspects, the amplification reactions disclosed herein are partially-attached reactions in which some amplification occurs in proximity to the analyte and some occurs in solution not in proximity to the analyte.

In various aspects, the amplification reactions disclosed herein are polymerization reactions. For example, the amplification reactions can include nucleic acid polymerization, such as DNA or RNA polymerization. In various aspects, the amplification reactions disclosed herein are non-polymerization reactions, such as dequenching reactions. For example, the reactions can involve the unbinding of a self-bound nucleic acid chain or a pair of bound chains. In some embodiments, the dequenching can include unbinding and assembly of DNA hairpin molecules.

In various aspects, detection can be optical detection. The optical detection can use fluorescence in some embodiments. The optical detection can use luminescence in some embodiments. In some embodiments, optical detection can include absorption detection. In various aspects, detection of analyte can include non-optical detection methods.

In various aspects, the methods and systems disclosed herein can use digital assays for analyte detection. In other aspects, non-digital (e.g., analog) detection can be used.

In various aspects, the amplification reactions disclosed herein proceed as exponential amplification reactions. In other aspects, the amplification reactions proceed as linear reactions. In some aspects, the reactions can proceed as substantially linear reactions; that is, with a reaction rate that grows similar to or faster than a linear reaction, but slower than an exponential reaction; for example, with a polynomial growth rate. Substantially linear reactions include linear reactions unless otherwise specified.

In various aspects the amplification reactions disclosed herein are isothermal reactions. In certain aspects, the isothermal amplification is a digital isothermal amplification. In some aspects, the amplification reactions disclosed herein are polymerase chain reaction amplification reactions. In certain aspects, the amplification reaction is a digital PCR amplification. The proximity-based interactions disclosed herein are preferably isothermal reactions as well. In some embodiments, the proximity-based interactions disclosed herein comprise digital PCR reactions. In certain embodiments, the proximity-based interactions and the amplification reactions are digital isothermal reactions. In some cases, the methods and systems perform the amplification and/or interaction steps under isothermal conditions; that is at a substantially constant temperature. A heating step can precede the isothermal reactions, triggering the beginning of the reactions by crossing a temperature threshold, for example. In some cases, the methods and systems performing the amplification and/or interaction steps are under conditions that comprise PCR amplification; that is with the use of thermal cycling.

In various aspects, the binding portions disclosed herein comprise antibodies or portions thereof. The antibodies can include an antigen-binding site that binds to an antigen. The analyte can comprise sites to which the antibodies bind; for example, a plurality of binding sites, each binding a specific antibody corresponding to a specific probe.

In various aspects, the methods and systems disclosed herein detect analyte without requiring a washing step. In various aspects, the proximity-based interactions and amplification reactions are carried out in a single container. In various aspects, the methods and systems disclosed herein involve only a single step for detection, said step beginning with a proximity-based interaction between fluid constituents (e.g., probes), and proceeds to trigger an amplification reaction that is used to detect presence of the analyte through optical or other methods.

In various aspects, the methods and systems disclosed herein comprise a plurality of compartmentalized volumes that comprise a threshold oligonucleotide. In some aspects, the methods and systems disclosed herein comprise a plurality of compartmentalized volumes, comprising a plurality of auxiliary substrates. In certain aspects, the plurality of auxiliary substrates comprise a threshold oligonucleotide. In some aspects, the plurality of compartmentalized fluid volumes comprise a plurality of auxiliary substrates. In certain aspects, the plurality of auxiliary substrates comprises an auxiliary substrate that binds to an amplification product oligonucleotide. In some aspects, the auxiliary substrate that binds to the amplification product oligonucleotide inactivates it. In certain aspects, the inactivation of the amplification product oligonucleotide comprises binding to the amplification product oligonucleotide. In some aspects, binding to the amplification product oligonucleotide creates a threshold for exponential growth. In certain aspects, the inactivation of the amplification product oligonucleotide comprises extending the amplification product oligonucleotide non-productively. In some aspects, extending the amplification product oligonucleotide non-productively creates a threshold for exponential growth. In certain aspects, the plurality of auxiliary substrates comprises an auxiliary substrate that binds to an amplification product oligonucleotide to create a threshold for exponential growth. In certain aspects, the plurality of auxiliary substrates comprises an auxiliary substrate that binds to an amplification product oligonucleotide and inactivates the amplification product oligonucleotide by extending the amplification product oligonucleotide non-productively, creating a threshold for exponential growth.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 1A shows a method of analyte detection.

FIGS. 1C and 1D show two general schemes for the use of proximity-based interactions to detect analyte in a fluid. FIG. 1C shows an "attached" detection scheme for analyte detection, and FIG. 1D shows a "detached" analyte detection scheme.

DETAILED DESCRIPTION

Figure 1B:
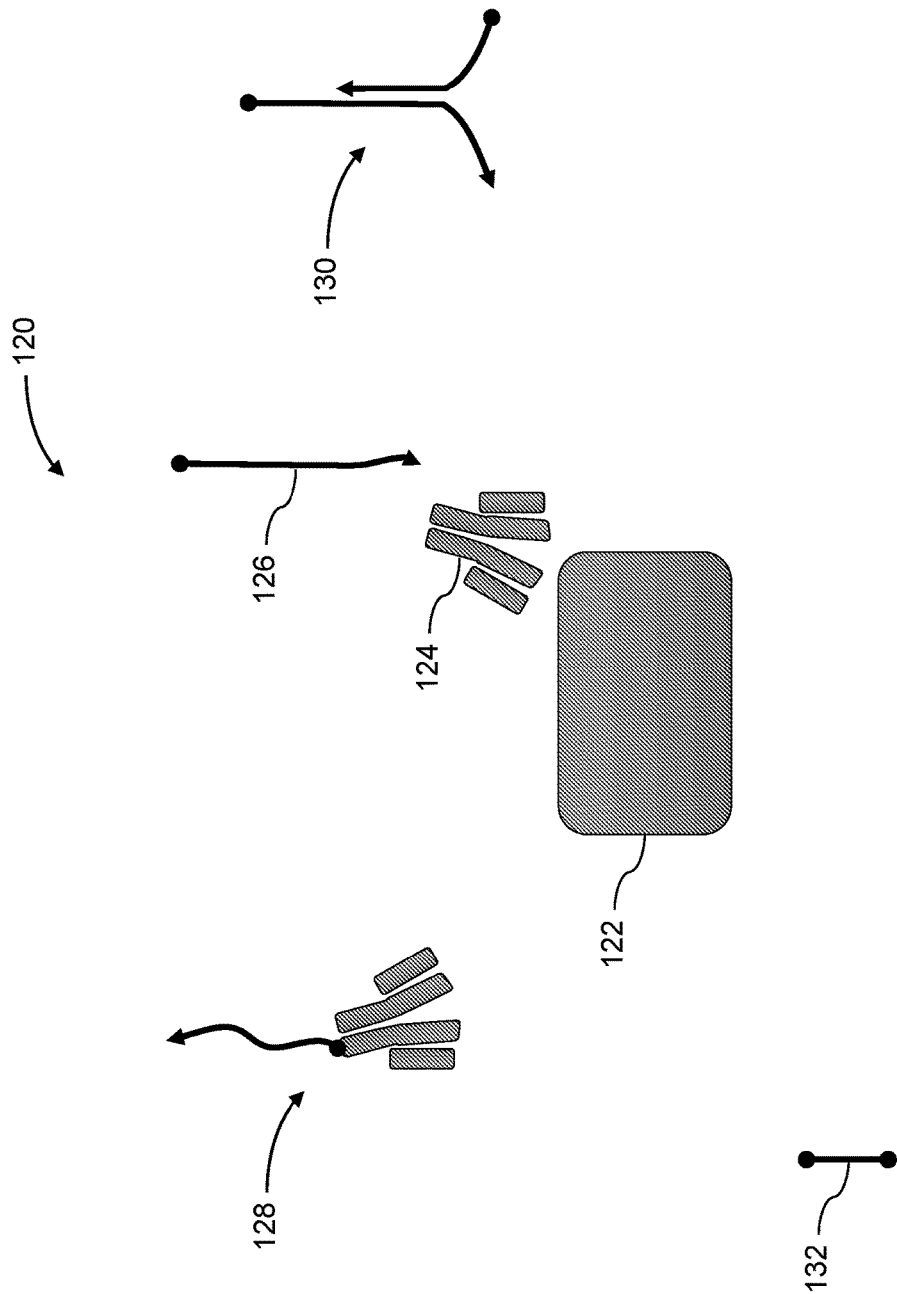
FIG. 1B illustrates a composition for detection of an analyte according to various embodiments.

The present disclosure relates generally to compositions, systems, and methods for detection of analyte, especially protein analyte, using assays involving proximity-based interactions.

The most commonly used method for amplified biomarker detection in a sample is polymerase chain reaction (PCR), in which DNA is amplified in a temperature-sensitive reaction catalyzed by a DNA-polymerizing enzyme. In PCR the sample is typically cycled between two or three temperatures ranging from about 60° C. to about 95° C. by a thermal cycling device. The use of PCR to amplify DNA has greatly advanced a wide range of disciplines, from basic biology to clinical diagnostics and forensics. PCR has also been refined to detect DNA within droplets for a "digital" readout. This allows absolute quantification or a count of individual nucleic acid molecules. However, although some progress has been made with respect to digital detection of nucleic acids, there remains a need for development of techniques for the detection of protein.

There is a need for amplification methods for detection of protein, notably those that do not require washing steps. In particular, there is a need for isothermal amplification methods for detection of protein, especially those that do not require washing steps. Isothermal protein detection has a wide range of applications, including applications in point of care diagnostics as well as personalized and precision medicine. Isothermal amplification for protein detection provides at least two substantial advantages over PCR: it does not require precise changes in temperature to achieve amplification (that is, the technique can be performed under isothermal conditions) and it is applicable to protein analytes (whereas PCR is primarily useful for detecting DNA). The isothermal techniques for protein detection as disclosed herein provide for isothermal amplification-based detection of protein, and can be performed as part of a digital assay.

A digital assay, as described herein, can comprise partitioning, aliquoting, or otherwise separating a sample (or derivative thereof) into a plurality of compartmentalized volumes, evaluating the plurality of compartmentalized volumes individually for the presence or absence of a detectable signal or code (e.g., detecting a detectable signal or code produced by a fluorescent probe), and assigning a binary value to each evaluated compartmentalized volume. In some cases, a value can be assigned to a compartmentalized volume based on the presence, absence, wavelength, intensity, and/or lifetime of a detectable signal or code (or portions thereof) in the compartmentalized volume. The values assigned to the evaluated compartmentalized volumes can be used to determine characteristics of target molecules in each compartmentalized volume. For example, detecting or failing to detect a detectable signal (e.g., a detectable code or aspects thereof) in a compartmentalized volume can indicate the presence or absence of a target molecule in the compartmentalized volume, and can be used to determine the concentration of a target molecule in the sample. In some cases, detecting or failing to detect a detectable signal in a compartmentalized volume can be used to determine the identity or the amount of a protein molecule in the sample.

One reference has reported isothermal digital protein ELISA based on bead capture for an enzyme, beta-galactosidase. However, there are substantial limitations to this kind of non-homogeneous technique (that is, techniques relying on capture rather than proceeding in solution). The protein detector requires washing for the removal of background analyte that would give a false positive signal. This required washing step is a significant disadvantage. Moreover, the requirement of bead capture prevents the technique from being performed in a homogeneous solution, further limiting the technique. The detection techniques disclosed herein can be performed in a mix-and-read manner, with no required washing step, and they can be performed in solution without use of a support such as a bead.

Prior methods for digital analysis of protein analytes in homogeneous solution also have multiple drawbacks compared to the techniques disclosed herein. For example, a technique has been reported for detection of certain protein toxins using proximity-ligation assays and PCR. However, this technique is hindered by the requirement of steps involving controlled temperature variation over a substantial range, precluding isothermal detection of analyte. Furthermore, the technique requires centrifuge steps, which requires transfer between containers. This precludes the technique from being performed in a one-pot or single-step manner. The isothermal techniques disclosed herein, by contrast, allow detection of protein analytes in an isothermal process, and can be performed in a single container, without additional steps such as centrifugation.

Finally, certain techniques have been developed for use in analog assays, such as proximity-induced rolling-circle amplification and hairpin assembly reactions. However, these techniques are limited by reliance on analog solution reactions, which require calibration and can be susceptible to errors that are difficult to correct or quantify. For example, uncertainties in amplification efficiencies can lead to very large errors when dealing with reactions that produce exponential growth.

In some embodiments, polymerase chain reaction amplification (also referred to herein as "PCR amplification" and the like) can be used for detection of protein. In certain embodiments, the PCR amplification does not require washing steps. PCR amplification can be achieved using portable machines, providing an advantageous application of the polymerase chain amplification reactions (also referred to herein as "PCR amplification reactions," "PCR reactions," and the like) disclosed herein. The PCR amplification techniques for protein detection as disclosed herein provide for PCR amplification-based detection of protein, and can be performed as part of a digital assay. In some embodiments, the PCR amplification technique comprises digital PCR amplification.

FIG. 1A shows a method 100 of analyte detection. The method can be performed for the detection of analyte dissolved or otherwise dispersed in a fluid. For example, the method can be used to detect protein in a fluid. Preferably, the method is performed in a homogeneous assay; that is, the method is performed without relying on attachment of particles to beads or other forms of solid support. This feature provides increased flexibility and efficiency; for example, unlike in heterogeneous assays, no use of a washing step is required.

In step 112, a fluid is provided containing analyte. Preferably, the analyte is a protein, and the fluid contains a number of analyte protein molecules. Additional fluid constituents can be provided that can interact with the analyte and each other in a proximity-based interaction. For example, the constituents can include a first probe and a second probe, each configured to bind to the analyte. In some embodiments, the first probe comprises a first binding portion bonded to a first nucleic acid molecule. The first binding portion can be an antibody with affinity for the analyte. The second probe can similarly comprise a second binding portion bonded to a second nucleic acid. The second binding portion can also be an antibody with affinity for the analyte. In some embodiments, the first and second binding portions are different antibodies configured to bind to different respective portions of a common protein molecule. The fluid constituents can also comprise additional reaction components, such as polymerase and endonuclease molecules and appropriate nucleobases to use in nucleosynthesis, as well as non-reactive components, such as a solvent (e.g., water), buffers, etc. The first and second nucleic acids are preferably DNA molecules.

In step 114, the fluid is divided into compartmentalized volumes, generating a digital assay. The compartmentalized volumes can be droplets or wells each containing a single droplet, for example. Other methods of dividing the fluid can also be employed; for example, the compartmentalized volumes can be generated in situ by introducing membranes or other fluid barriers within a larger fluid volume, thereby dividing the fluid constituents into respective compartmentalized volumes. Preferably, the compartmentalized volumes contain homogeneous fluid that undergoes reactions without relying on the presence of support structures such as beads. The fluid can be diluted appropriately such that some compartmentalized volumes contain no analyte and some compartmentalized volumes contain some analyte. Where the fluid is homogeneous and the analyte has fully diffused into the fluid, the division step tends to randomly assign analyte molecules to respective compartmentalized volumes. If each compartmentalized volume is similar to the others, then the dividing step will typically populate analyte in the compartmentalized volumes according to a Poisson distribution. Because digital assays generally rely on distinguishing between analyte-containing and non-analyte-containing volumes, the best signal-to-noise ratios can be achieved for assays in which a significant fraction of the compartmentalized volumes are expected to contain no analyte. Although use of a dividing step 114 is preferred for the formation of a digital assay, in some embodiments, the dividing step can be omitted. For example, in some embodiments the method 100 can be performed to generate an analog (i.e., non-digital) measurement on a single fluid volume.

The various fluid constituents can be introduced into the fluid prior to a step of adding the analyte to the fluid, or can be introduced contemporaneously or afterward—for example, during the dividing step 114. In some cases, different constituents can be added at different times; for example, one or more reagents can be withheld until dividing the fluid into compartments to ensure that reactions proceed only within the compartmentalized volumes, thus protecting against cross-contamination.

In step 116, a proximity-based interaction is allowed to occur between fluid constituents. The interaction can occur spontaneously, e.g., from the presence of the analyte and other fluid constituents in solution, or the interaction can be triggered. For example, the interaction and/or subsequent amplification reactions (e.g., dequenching or enzymatic amplification) can be triggered by raising the temperature of the fluid above a critical temperature. Preferably, the amplification reaction is an isothermal reaction; optionally, the proximity-based interaction is also an isothermal reaction. More preferably, all isothermal amplifications are digital isothermal amplifications. Although the isothermal reaction can be triggered by bringing a temperature to a certain level, the reaction does not require temperature to be varied to run to completion. As used herein, an isothermal reaction is one that proceeds to completion at a constant temperature. The term "isothermal" characterizes the reaction, not the conditions under which a reaction takes place; thus, an isothermal reaction remains an isothermal reaction even if the temperature of the system is varied as the reaction takes place, so long as the reaction would still take place if the temperature were held constant. By way of contrast, polymerase chain reaction (PCR) is not isothermal because it requires a number of cycles at varying temperatures to run to completion. On the other hand, the amplification reactions and other interactions discussed herein are typically isothermal because, although they may require temperature within a certain range, and they may proceed at slightly different rates as a function of temperature, they do not require temperature to be varied during the course of the reaction to run to completion. In some embodiments, the amplification reaction is a PCR reaction, and in some embodiments the amplification reaction is a digital PCR reaction. In certain embodiments, the amplification is a PCR reaction (e.g., a digital PCR reaction) and the proximity-based interaction is an isothermal reaction (e.g., a digital isothermal reaction). As used herein, a PCR reaction is one that proceeds to completion with use of thermal cycling to permit different temperature-dependent reactions. In some embodiments, the amplification reaction is selected from the group consisting of an enzyme-free hairpin assembly reaction, an enzyme-free catalyzed hairpin reaction, an enzyme-free hybridization chain reaction, and a proximity-induced rolling circle amplification. In some embodiments, the amplification reaction comprises an enzyme-free hairpin assembly reaction, an enzyme-free catalyzed hairpin reaction, an enzyme-free hybridization chain reaction, a proximity-induced rolling circle amplification, or any combination thereof. In some embodiments, the amplification reaction is selected from the group consisting of a hairpin assembly reaction, a catalyzed hairpin reaction, a hybridization chain reaction, and a proximity-induced rolling circle amplification. In some embodiments, the amplification reaction comprises a hairpin assembly reaction, a catalyzed hairpin reaction, a hybridization chain reaction, a proximity-induced rolling circle amplification, or any combination thereof.

In certain embodiments, the amplification reaction uses digital isothermal amplifications, such as NASBA (Nucleic Acid Sequence Based Amplification), LAMP (Loop-mediated AMPlification), SDA (Strand Displacement Amplification), EXPAR (EXPonential Amplification Reaction), and rolling circle amplification (RCA), where the use of an array of digitized volumes, similar to digital PCR, is used for carrying out digital NASBA, digital LAMP, digital SDA, digital EXPAR, and digital rolling circle amplification.

In some embodiments, the proximity-based interaction involves an interaction between first and second nucleic acid molecules bonded to first and second binding portions (e.g., antigens), forming first and second probes which respectively bind to a protein analyte. The binding of the two probes to a common analyte brings the two probes into proximity, allowing the nucleic acid chains to interact. In some embodiments, the proximity-based interaction involves a pairing interaction between the first and second nucleic acid molecules. For example, the nucleic acid molecules can pair to allow the transcription of RNA, the extension of one of the two nucleic acid molecules by a polymerase, or the formation of a catalyst by a partial pairing of portions of the two nucleic acid molecules. Various manners in which the proximity-based interaction can proceed are discussed in more detail with respect to the remaining figures. In some cases, the proximity-based interaction can produce reaction products, such as an accumulation of nucleic acid chains, in solution in the fluid. In some cases, these byproducts can interact with other fluid constituents to generate further reaction products, in an exponential amplification reaction, for example.

In step 118, the analyte is detected based on the proximity-based interaction. Optical detection through fluorescence, absorption, luminescence, or similar methods of generating optical signals is a preferred detection method. In some embodiments, a fluorescent moiety (e.g., a fluorescent probe such as a dye, nanoparticle, protein, or polymer dot (PDot)) is provided in the fluid, and the fluorescent moiety interacts with accumulated products of the proximity-based interaction. The fluorescent moiety interacting with the accumulated products can fluoresce in response to illumination by light at an appropriate wavelength. For example, SyBr Green I (or SyBr Green II or SyBr Gold, for single-stranded DNA) can be used to detect accumulated DNA molecules in solution using standard fluorescence detection. Alternatively or additionally, other detection mechanisms can be used to detect the analyte. In some embodiments, detection of nucleic acid chains generated or altered by the proximity-based interaction can be performed using absorption detection, colorimetric detection, or various forms of chemical, electrical, or magnetic detection. For example, in some embodiments an intercalating dye can be used to detect an accumulation of nucleic acid molecules, such as a double-stranded DNA produced by polymerase. In some embodiments, accumulation of a DNA or other nucleic acid product is detected by a dye that interacts with a single-stranded product by backbone interactions or interaction between a light-up aptamer and its target. In some embodiments, accumulation of a DNA of other nucleic acid product is detected by a molecular beacon. In some embodiments, accumulation of a nucleic acid product is detected by formation of a G-quadruplex structure in the product nucleic acid (e.g., DNA) which can then catalyze further fluorescent or colored product. In some embodiments, the accumulation of nucleic acid product is detected by chemiluminescence or bioluminescence associated with the product or the polymerization of product. In some embodiments, the product is detected by electrochemical changes in the solution such as changes in capacitance, conductivity or electron transfer rate.

In analog assay embodiments, detection can include determining a signal strength correlated to the number or concentration of the analyte in the fluid. In digital embodiments, detection can include determining, for the plurality of compartmentalized volumes, which contain analyte and which do not. For example, in fluorescence-based embodiments, fluorescence can be detected from one type of volume (e.g., those volumes containing analyte) and not from the other (e.g., those not containing analyte). Alternatively, the readout can be reversed if the reactions in analyte-containing volumes serve to quench, rather than enable, fluorescence. Based on a determination of which volumes contain analyte, analyte properties such as a total count of analyte can be measured. This measurement can be performed by comparing the number of zero- and nonzero-analyte containing volumes to a Poisson distribution. For example, Poisson statistics can be used to generate an average quantity of analyte per container. A total count or quantity of analyte can be generated by multiplying the number of volumes times this average.

Method 100 can be performed by a system configured to perform digital assays. The system can divide the fluid into a plurality of fluid volumes respectively disposed in a plurality of compartments. For example, in some embodiments, the system can comprise an array of wells, droplets, or other compartmentalized volumes, into each of which a portion of the analyte-containing fluid can be deposited. The fluid in the compartmentalized volumes can contain one or more of each of the first and second probes, as well as appropriate additional constituents, such as polymerases, endonucleases, base pairs, etc., to support an amplification reaction and subsequent detection. Preferably, the system detects the presence of analyte in the wells optically, such as by inducing and measuring fluorescence, or by measuring a change in absorption. Alternatively or additionally, the system can employ methods such as chemical or electrical detection to determine which wells contain analyte. The system can further generate measurements of analyte, such as analyte count or analyte concentration, based on the detection of analyte in the wells.

For example, the system can comprise a computer-controlled digital assay system that automatically divides an analyte-containing fluid into a plurality of compartmentalized fluid volumes, controls reaction conditions (e.g., temperature) to promote a proximity-based interaction in analyte-containing volumes. The system can then detect which volumes contain analyte and which do not (e.g., using fluorescence or other detection), and based on this measurement, the system can generate a count of the number of analyte molecules present in the fluid. For example, using Poisson statistics, a measurement of a fraction x of non-analyte-containing volumes and a fraction (1-x) of analyte-containing volumes can correspond to a total analyte fraction of $-\ln(x)$, where ln is the natural logarithm, or a total analyte number of $-\ln(x)*N$, where N is the number of volumes. The system can include a processor that executes instructions to control each step performed by the digital assay system, including the calculations required to generate an analyte count. The number of volumes (e.g., number of wells) can be selected to provide a desired level of precision in the overall measurement. For example, the fluid can be divided between 10 or more, 20 or more, 50 or more, 100 or more, 200 or more, 500 or more, 1000 or more, 10,000 or more, or 100,000 or more volumes, with more volumes providing progressively greater precision. Preferably, the fluid is evenly divided, although uneven divisions are possible and can be accounted for statistically.

FIG. 1B illustrates a composition 120 for detection of analyte according to various embodiments. The composition 120 can comprise a fluid with various fluid constituents. For example, the composition can be an aqueous solution. Preferably, the composition is a homogeneous fluid; that is, the various fluid constituents that participate in reactions in the fluid are not attached to macroscopic structures such as beads that can require washing steps prior to or during the detection process. The constituents of the fluid can include various biological molecules and structures, as appropriate to the particular method of detection to be used. For example, the methods of detection discussed in FIGS. 2-11 employ a variety of proximity-based analyte detection methods, and the fluid constituents can be selected as appropriate to perform any one or more of the illustrated methods.

The illustrative composition 120 includes a variety of constituents, which are shown in similar formats in the remaining drawings for ease of illustration. For example, the composition 120 includes an analyte 122, which may be a protein molecule, or any of a variety of biological structures to which other biological molecules can bind, such as a protein complex, a metabolite, a carbohydrate, a lipid structure, a drug, a virus, a nucleic acid structure, or even larger structures such as bacterium or other cell. The composition further comprises a binding portion 124 that includes a binding site to bind to a given location (e.g., an epitope) on the analyte 122. For example, the binding portion 124 may be an antibody or portion thereof, and the analyte 122 can constitute an antigen matching the antibody, such that the binding portion 124 targets and binds to the analyte 122. Furthermore, the analyte 122 can comprise a plurality of sites to which different antibodies can bind, and by simultaneously binding to appropriate sites (e.g., different epitopes) of a common analyte, the antibodies can bring themselves (and other molecules to which they are attached) into proximity to trigger a proximity-based interaction. The composition further comprises a nucleic acid molecule 126; for example, a strand of DNA or RNA. The nucleic acid molecule 126 is illustrated with a dot at its 5' end and an arrow at its 3' end, indicating the direction in which polymerization is possible for the molecule using a polymerase. A binding portion and a nucleic acid molecule can be bonded together to form a probe 128 that can be used to trigger a proximity-based interaction with another probe upon binding to the analyte. When two nucleic acid molecules engage in a proximity-based interaction, they can form a double-stranded nucleic acid complex, such as double-stranded DNA complex 130. In double-stranded DNA complex 130, only a portion of the two DNA molecules are illustrated as binding together (e.g., through base-pairing). The remaining portions of the DNA molecules can be separated because they attach to respective binding portions attached to different sites on an analyte, for example. In some embodiments, a "blocker" 132 is included that can bind to a nucleic acid molecule to inhibit polymerization, transcription, or binding. The blocker can be a non-extendible oligonucleotide, which may be formed by including a modification to its 3' end. For example, the blocker 132 can have an inverted 3' end, or another similar modification, such that templated extension by polymerase is inhibited on that end. The blocker 132 can have an inverted 3' end, or another similar modification alone or in combination, such that nicking by endonuclease or templated extension by polymerase is inhibited on that end. Other modifications that may prevent elongation include dideoxy bases, phosphate modifications, extended mismatches, or any other modification that inhibits one or more enzymes necessary for amplification. The blocker can comprise a plurality of complementary bases to another nucleic acid molecule, such that the blocker binds to the nucleic acid molecule, resulting in an inactivated complex. Further fluid constituents that may optionally be included in a composition are illustrated in FIGS. 2-11, below.

FIGS. 1C and 1D illustrate two general schemes for the use of proximity-based interactions to detect analyte in a fluid.

FIG. 1C shows an "attached" detection scheme 140 for analyte detection. In the attached detection scheme 140, a first probe 142 and a second probe 144 each bind to a common analyte 141. The two probes are thereby brought into proximity, and can undergo a proximity-based interaction with each other. The two probes include nucleic acid molecules that interact to form a nucleic acid complex 146. This complex then participates in further reactions; for example, one of the nucleic acid molecules forming the complex can be extended by a polymerase, leading to further reactions that eventually generate a detectible signal that analyte is present in the fluid.

FIG. 1D shows an alternative "detached" analyte detection scheme 150. Like in detection scheme 140, in detection scheme 150, a first probe 152 and a second probe 154 each bind to a common analyte 151, then undergo a proximity-based interaction to form a complex 156. However, whereas the complex 146 in the attached scheme 140 participates in further amplification reactions, the formation of complex 156 instead triggers reactions away from the analyte. For example, the formation of complex 156 can dislodge an active nucleic acid strand 158 from one of the first and second probes, which can then form an active complex with other fluid constituents, leading to amplification reactions in solution, away from the analyte. In many embodiments, detached reactions are used as part of exponential amplification reactions.

In addition to the strict "attached" and "detached" schemes discussed above, some schemes employ "partially-attached" reactions in which some amplification occurs involving the attached complex, but other parts of the reaction occur away from the analyte in solution. For example, many of the attached reactions described herein can be used to produce free nucleic acid strands that can interact with other substrates in solution to trigger an exponential amplification reaction.

FIGS. 2-11 illustrate in more detail how various proximity-based interactions can be used in accordance with the methods disclosed herein to generate measurements of analyte. Each of the processes illustrated in FIGS. 2-11 can be performed under isothermal conditions (e.g., using isothermal assembly and amplification reactions), and can be performed either in a single fluid solution (e.g., as an analog assay) or in a plurality of compartmentalized fluid volumes (e.g., as a digital assay). Alternatively, each of the processes illustrated in FIGS. 2-11 can be performed under conditions that comprise PCR amplification (e.g., using thermal cycling assembly and PCR amplification reactions such as digital PCR), and can be performed either in a single fluid solution (e.g., as an analog assay) or in a plurality of compartmentalized fluid volumes (e.g., as a digital assay).

Figure 2:
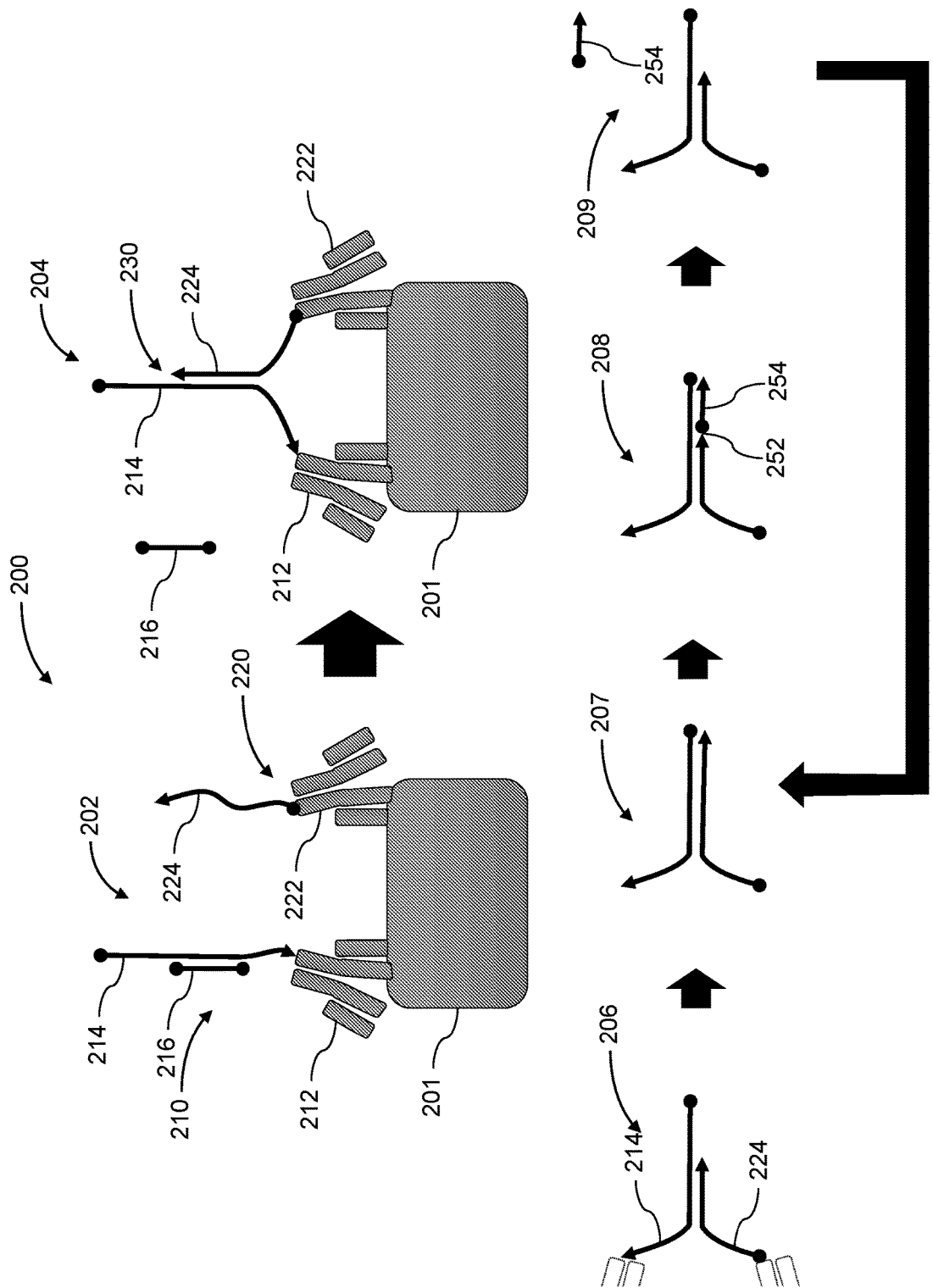
FIG. 2 illustrates a method for analyte detection using attached strand displacement amplification.

FIG. 2 illustrates a method 200 for analyte detection using attached strand displacement amplification. The method can be performed in a fluid; for example, in each of a plurality of compartmentalized fluid-containing volumes. In the fluid is provided an analyte 201. For example, the analyte may be a protein molecule. The method 200 can be characterized as an "attached" method, in that it involves a reaction (an amplification reaction) that occurs in a complex attached to the analyte.

The fluid can further comprise a first probe 210 and a second probe 220. The first probe comprises a first binding portion 212 bonded to a first interaction portion comprising a first nucleic acid molecule 214. The first binding portion 212 can be an antibody or portion thereof, for example, with a binding site to bind to the analyte 201. The first nucleic acid molecule 214 is bound to a non-extendible blocker oligonucleotide 216. The first nucleic acid molecule 214 and non-extendible blocker oligonucleotide 216 can be DNA molecules bound together by base pairing interactions, for example. The non-extendible blocker oligonucleotide 216 can comprise a modification to its 3' end (e.g., an inverted 3' end), such that templated extension by DNA polymerase is inhibited on that end (as well as the 5' end, which is naturally not extended by DNA polymerase). If the first nucleic acid molecule 214 is bonded to the first binding portion 212 on the 3' end, polymerization can be inhibited for both the first nucleic acid molecule 214 and the non-extendible blocker oligonucleotide 216.

The second probe 220 can comprise a second binding portion 222 and a second interaction portion comprising a second nucleic acid molecule 224. The second binding portion 222 can be an antibody or portion thereof; for example, with a binding site to bind to the analyte 201. The second nucleic acid molecule 224 can be a DNA molecule, for example, and can be bonded to the binding portion 222 at the 5' end. Accordingly, the second nucleic acid molecule 224 can be extended by a polymerase (e.g., DNA polymerase) if provided with an appropriate template.

In a first step 202, the first probe 210, the second probe 220, and the analyte 201 are each provided in the fluid together. The first and second probes each bind to a common analyte molecule 201, and this binding brings the two probes into proximity, allowing the interaction portions of the probes to interact.

This interaction occurs in a second step 204, in which the first nucleic acid molecule 214 and the second nucleic acid molecule 224 interact to form a complex 230. The first and second nucleic acid molecules can contain a plurality of complementary base pairs, for example, such that they can interact when in proximity to form a double-stranded nucleic acid complex 230. The interaction can displace the non-extendible blocker oligonucleotide 216, which can then be released into solution as waste. The remaining complex 230 can include a discrepancy in length of the two nucleic acid molecules; that is, the first nucleic acid molecule 214 can be extend beyond the corresponding portion of the second nucleic acid molecule 224 to which it is complementary, such that the first nucleic acid molecule 214 presents a template to allow for base pair polymerization to extend the second nucleic acid molecule 224.

The formation of a nucleic-acid complex between the first and second nucleic acid molecules 214 and 224 can set up a repeatable cycle of nucleic acid amplification. The starting point of such a cycle is illustrated in step 206. The first and second nucleic acid molecules 214 and 224 remain bonded to the binding portions 212 and 222, respectively, which in turn remain bound to the analyte 201. The ends of the binding portions 212 and 222 are illustrated in step 206 with dotted lines, but are omitted from the drawings for the remainder of illustrations of amplification process steps.

The amplification process proceeds from step 206 to step 207 by the binding of a polymerase such as DNA polymerase to the complex 230. The polymerase extends the second nucleic acid molecule 224, using the first nucleic acid molecule 212 as a template. The extension can continue until reaching the 5' end of the first nucleic acid molecule 212, for example.

The extension of the second nucleic acid molecule 224 in step 207 can be followed in step 208 by the binding of a nicking endonuclease to the extended portion of the second nucleic acid molecule. For example, the extended portion of the second nucleic acid molecule can include a plurality of base pairs forming a binding site for an endonuclease configured to sever the second nucleic molecule at a point 252. In some embodiments, the point 252 is at or near its original 3' end of the second nucleic acid molecule 224. The action of the endonuclease produces a nicked nucleic acid molecule 254.

In step 209, the nicked nucleic acid molecule 254 is released into solution, producing a nucleic acid complex capable of undergoing another templated extension by the action of a polymerase. This extension brings the process back to step 207, and the cycle can then repeat. In some embodiments, the release of nicked nucleic acid molecule 254 is mediated by the extension by polymerase. The repeated action of this nucleic acid amplification cycle can lead to an accumulation of nicked nucleic acid molecules 254 in solution, which can be used for detection. For example, fluorescence imaging can be used to detect the accumulation of nicked nucleic acid molecules by providing a fluorescent moiety in the fluid that fluoresces upon illumination with light of an appropriate wavelength when in the presence of the nicked nucleic acid molecules (e.g., upon binding thereto).

Because the amplification process 200 depends on the presence of the analyte 201 to run to completion (by effecting the proximity of the first and second probes via their binding to a common analyte, thereby initiating the proximity-based interaction), the generation of nicked nucleic acid molecules 254 in solution is an indication that analyte is present. The presence or absence of fluorescence (or other properties) based on the accumulation or non-accumulation of nicked nucleic acid molecules in solution thus allows detection of which fluid volumes do and do not contain analyte. Thus, by using method 200 as part of a digital assay, a measurement can be generated of the number of nucleic acid molecules in the fluid, and correspondingly other properties such as analyte concentration. Alternatively, the process 200 can be used to perform an analog measurement of the analyte. The rate of production of nicked nucleic acid molecules 254 in solution increases with the number of analyte particles present in solution; accordingly, a measurement of the amount of nicked nucleic acid produced (e.g., by measurement of fluorescence intensity, by measurement of time to reach a given intensity, etc.) can be used to produce an analog measurement of the amount of analyte in the fluid. The measurement can include comparison of a measured signal to a calibrated scale, for example, to determine a measured quantity of analyte.

Figure 3:
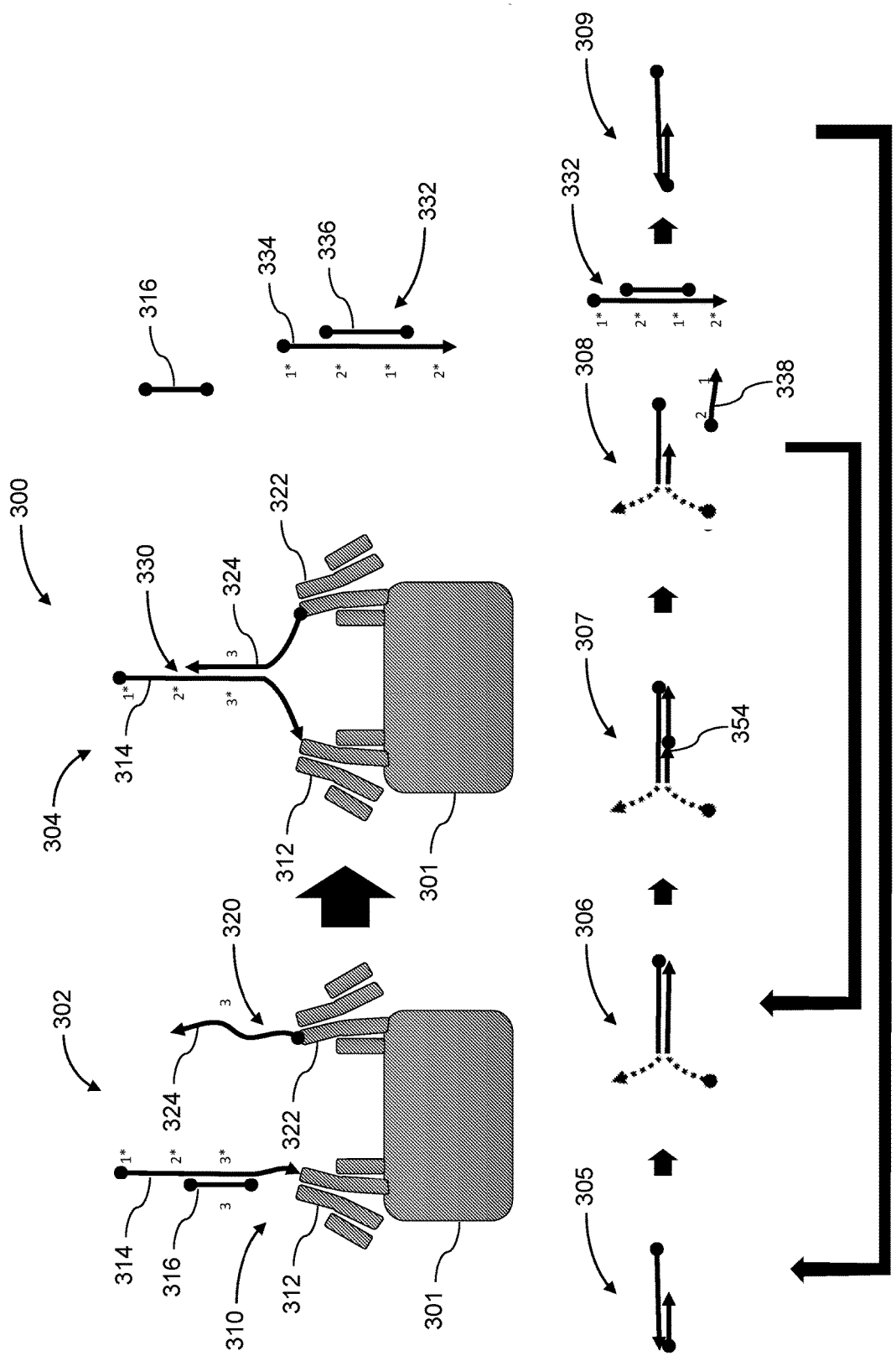
FIG. 3 illustrates a method for analyte detection using detached exponential amplification in combination with attached strand displacement amplification.

FIG. 3 illustrates a method 300 for analyte detection using attached strand displacement amplification. The method can be performed in a fluid; for example, in each of a plurality of compartmentalized fluid-containing volumes. In the fluid is provided an analyte 301. For example, the analyte may be a protein molecule. The method 300 can be characterized as a "partially-attached" method, in that it involves a reaction (an amplification reaction) that occurs in a complex attached to the analyte, but the attached reaction triggers further reaction steps that occur in solution.

The fluid can further comprise a first probe 310 and a second probe 320. The first probe comprises a first binding portion 312 bonded to a first interaction portion comprising a first nucleic acid molecule 314. The first binding portion 312 can be an antibody or portion thereof, for example, with a binding site to bind to the analyte 301. The first nucleic acid molecule 314 can comprise consecutive nucleic acid sequences in order 3*, 2*, 1*, where a sequence x* denotes a sequence complementary to a sequence x. The first nucleic acid molecule 314 is bound to a non-extendible blocker oligonucleotide 316. The first nucleic acid molecule 314 and non-extendible blocker oligonucleotide 316 can be DNA molecules bound together by base pairing interactions, for example by binding a base pair sequence 3 on the blocker to a base pair sequence 3* on the first nucleic acid molecule. The non-extendible blocker oligonucleotide 316 can comprise a modification to its 3' end (e.g., an inverted 3'), such that templated extension by DNA polymerase is inhibited on that end (as well as the 5' end, which is naturally not extended by DNA polymerase). If the first nucleic acid molecule 314 is bonded to the first binding portion 312 on the 3' end, polymerization can be inhibited for both the first nucleic acid molecule 314 and the non-extendible blocker oligonucleotide 316.

The second probe 320 can comprise a second binding portion 322 and a second interaction portion comprising a second nucleic acid molecule 324. The second binding portion 322 can be an antibody or portion thereof, for example, with a binding site to bind to the analyte 301. The second nucleic acid molecule 324 can be a DNA molecule, for example, and can be bonded to the binding portion 322 at the 5' end. Accordingly, the second nucleic acid molecule 324 can be extended by a polymerase (e.g., DNA polymerase) if provided with an appropriate template. Further, the second nucleic acid molecule 324 can comprise a base pair sequence 3 complementary to the base pair sequence 3* of the first nucleic acid molecule.

In a first step 302, the first probe 310, the second probe 320, and the analyte 301 are each provided in the fluid together. The first and second probes each bind to a common analyte molecule 301, and this binding brings the two probes into proximity, allowing the interaction portions of the probes to interact.

This interaction occurs in a second step 304, in which the first nucleic acid molecule 314 and the second nucleic acid molecule 324 interact to form a complex 330. The first and second nucleic acid molecules can contain a plurality of complementary base pairs forming respective complementary sequences 3* and 3 such that they can interact when in proximity to form a double-stranded nucleic acid complex 330 while displacing the non-extendible blocker oligonucleotide 316 from its binding to the same 3* sequence of the first nucleic acid molecule. The non-extendible blocker oligonucleotide 316 can then be released into solution as waste. The remaining complex 330 can include a discrepancy in length of the two nucleic acid molecules; that is, while the first nucleic acid molecule 314 has a base pair sequence 3* binding to the base pair sequence 3 of the second nucleic acid molecule 324 to which it is complementary, the first nucleic acid molecule further comprises a continuation of its strand in the form of a 2* sequence followed by a 1* sequence. Thus, the first nucleic acid molecule 314 presents a template to allow for base pair polymerization to extend the second nucleic acid molecule 324 into regions 2 and 1. Optionally, the length and sequence of the 3 may be substantially or completely identical to the 1 domain. Optionally, domain 3 on the second nucleic acid molecule can initially include fewer or more base pairs than the 3 sequence on the first nucleic acid molecule; for example, the second nucleic acid molecule can initially include region 3 followed by a portion of region 2, or some but not all of region 1. The non-extendible blocker oligonucleotide 316 can also be varied in length, to comprise more than or less than region 3. This variability allows variation of the strength of the proximity-based interaction between the first and second nucleic acid molecules, relative to the non-extendible blocker oligonucleotide, which can be used to increase the reaction rate or alternatively to decrease it (to decrease the rate of reactions produced by chance collisions of the first and second probes in solution, for example). Furthermore, both the first and second nucleic acid chains can include a plurality of nucleic acids between the identified regions and the binding portion. Because these additional nucleic acids need not undergo pairing interactions, they can be varied freely, and might include complementary or non-complementary base pair sequences.

The fluid further comprises an auxiliary complex 332 comprising an auxiliary substrate 334 optionally bound to an auxiliary non-extendable blocker oligonucleotide 336. In some aspects, the auxiliary substrate is bound to an auxiliary non-extendable blocker oligonucleotide 336. In some aspects, the auxiliary substrates each comprise an auxiliary nucleic acid chain, and none of the auxiliary substrates are bound to an auxiliary non-extendable blocker oligonucleotide 336. The auxiliary substrate 334 can include consecutive nucleic acid sequences 1*, 2*, 1*, 2*, reading from the 5' end, such that the auxiliary substrate 334 at least partly resembles the first nucleic acid 314. In some embodiments, the two are identical; in such a case, the additional 2* portion of the first nucleic acid molecule can avoid participating in base pairing with the second nucleic acid molecule during the proximity-based interaction because it bridges the gap between the two probes binding the analyte. One or both strands of the auxiliary substrate may be modified (e.g., with inverted 3') to avoid polymerase extension of the auxiliary substrate.

The complex 330, as well as the auxiliary substrate 334, can engage in a cycle of repeated amplification, the products of which can trigger more auxiliary substrates to join the amplification reaction cycle, leading to an exponentially growing production of nucleic acid strands in solution. The process can begin from the configuration of complex 330 depicted in step 304. The second nucleic acid molecule 324 is extended by a polymerase using the first nucleic acid as a template to reach a configuration illustrated in step 306. The complex is illustrated partly with dotted lines because a similar process occurs involving auxiliary substrate 334, which will be addressed later in the discussion. Extension of the second nucleic acid produces a binding site for a nicking endonuclease, similar to the site discussed with respect to FIG. 2, for example. The nicking endonuclease binds to the extended complex and nicks the extended portion of the second nucleic acid at a point 354, allowing the nucleic acid chain after that point to be released into solution. Because the extension of the second nucleic acid used the first as a template, the nicked extended portion 338 has nucleic acid sequences 2 and 1 respectively, reading from 5' to 3', as those are the complements to the 2* and 1* sequences of the first nucleic acid molecule after its initial 3* sequence is paired to the 3 sequence of the second nucleic acid molecule. (Although it is possible that the second nucleic acid molecule will interact with the 1* sequence of the first nucleic acid molecule, this arrangement would lead to an alignment of the first and second nucleic acid molecules' respective 5' and 3' ends, preventing further polymerization. Eventually, random thermal detachment and movement will bring the appropriate portions of the first and second nucleic acid molecules into contact in the appropriate configuration, and this process will proceed relatively quickly given the molecules' proximity.) After the nicked portion 338 goes into solution, the complex 330 can be extended again, repeating the cycle at step 306.

Moreover, the nicked portion 338, having been released into solution, can eventually collide with an auxiliary complex 332. The nicked portion 338 has sequences 2 and 1 reading from its 5' end, complementing the 2 and 1 of the auxiliary substrate 334, reading from its 3' end. The nicked portion 338 can thus pair with the auxiliary substrate 334 at one end (and at the middle, though for the same reasons as discussed above for the first and second nucleic acid molecules, such a pairing is a temporary dead end, requiring thermal re-equilibration). When the nicked portion 338 binds with the auxiliary substrate 334, it displaces the auxiliary non-extendable blocker oligonucleotide 336 into solution. This forms an active complex in step 309. In step 305, the active complex comprising the nicked portion 338 and the auxiliary substrate 334 is extended by a polymerase, using the auxiliary substrate 334 as a template. This produces an extended nicked portion similar to the extended second nucleic acid chain, as illustrated in step 206. The two complexes differ in the area with dotted lines; the extended nicked substrate has sequence 2, 1, 2, 1 paired with the complementary sequence in the auxiliary substrate reading from 5' to 3', while the second nucleic acid has a portion not paired with the first nucleic acid, followed by the 3, 2, 1 sequence. In step 307, the nicking endonuclease binds to the active complex and nicks the extended nicked portion to produce an identical copy of the nicked portion, which is released into solution in step 308 or during subsequent activity by polymerase. The active complex can then continue cycling in step 306, while the newly-released nicked portion can bring yet another auxiliary complex to form another active complex, which enters the cycle in turn. This process can grow exponentially, adding more and more complexes into the cycle and producing exponentially more nicked portions.

As the repeated cycle leads to an accumulation of more and more nucleic acid molecules 338 in solution, this accumulation can be used for detection. For example, an optical signal can be generated based on the accumulation. In many embodiments, fluorescence imaging can be used to detect the accumulation of nucleic acid molecules (e.g., nicked double stranded or single stranded nucleic acid molecules) by providing fluorescent probes (e.g., dyes or proteins) in the fluid that fluoresces upon illumination with light of an appropriate wavelength when in the presence of the nucleic acid molecules (e.g., upon binding thereto). Because the amplification process 300 depends on the presence of the analyte 301 to run to completion (by effecting the proximity of the first and second probes via their binding to a common analyte, thereby initiating the proximity-based interaction and further triggering activation of the auxiliary complexes), the generation of nucleic acid molecules 338 in solution is an indication that analyte is present. The presence or absence of fluorescence (or other properties) based on the accumulation or non-accumulation of nucleic acid molecules in solution thus allows detection of which fluid volumes do and do not contain analyte. Thus, by using method 300 as part of a digital assay, a measurement can be generated of the number of nucleic acid molecules in the fluid, and correspondingly other properties such as analyte concentration. Alternatively, the process 300 can be used to perform an analog measurement of the analyte. The rate of production of nucleic acid molecules 338 in solution increases with the number of analyte particles present in solution; accordingly, a measurement of the amount of nucleic acid produced (e.g., by measurement of fluorescence intensity, by measurement of time to reach a given intensity, etc.) can be used to produce an analog measurement of the amount of analyte in the fluid. The measurement can include comparison of a measured signal to a calibrated scale, for example, to determine a measured quantity of analyte.

Figure 4:
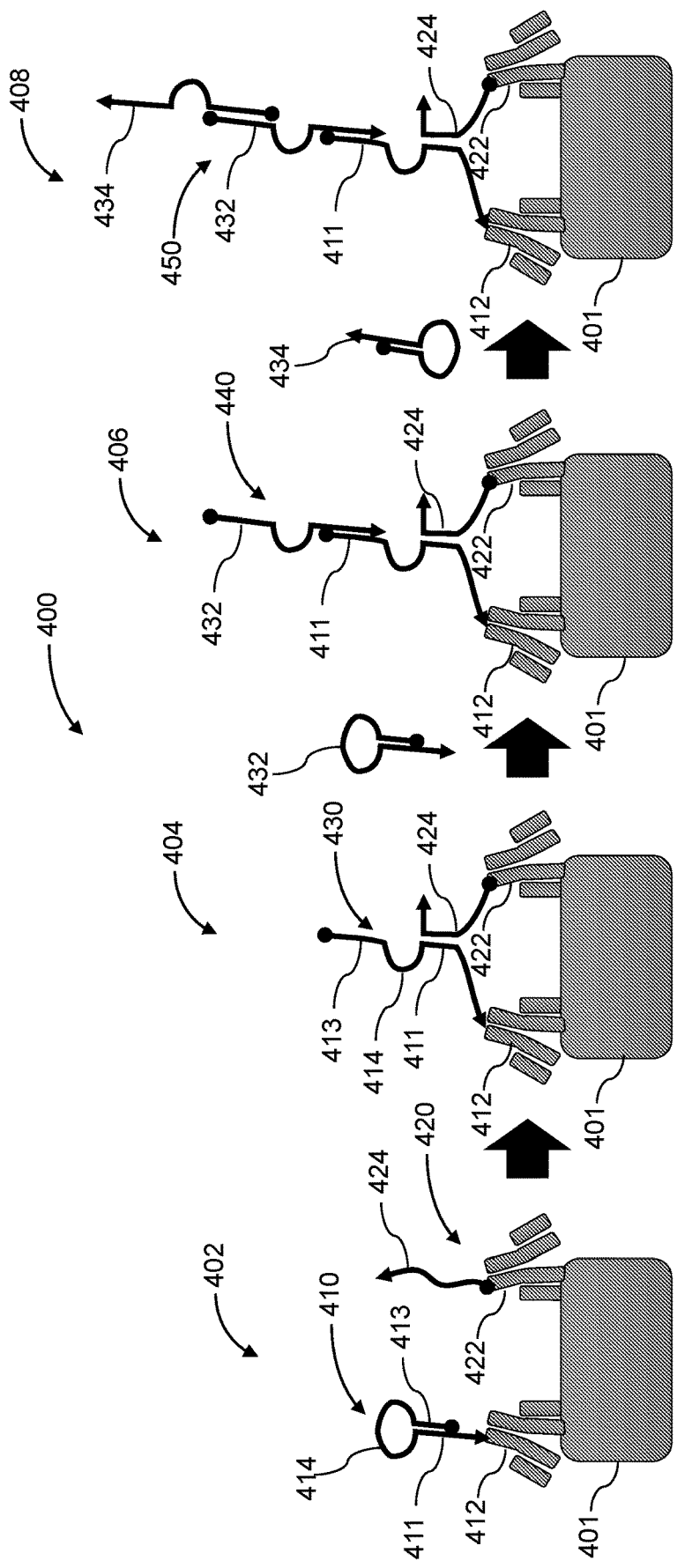
FIG. 4 illustrates a method for analyte detection using an attached hairpin assembly reaction.

FIG. 4 illustrates a method 400 for analyte detection using an attached hairpin assembly reaction. The method can be performed in a fluid; for example, in each of a plurality of compartmentalized fluid-containing volumes. In the fluid is provided an analyte 401. For example, the analyte may be a protein molecule. The method 200 can be characterized as an "attached" method, in that it involves a reaction (an assembly reaction) that occurs in a complex attached to the analyte.

The fluid can further comprise a first probe 410 and a second probe 420. The first probe comprises a first binding portion 412 bonded to a first interaction portion comprising a first nucleic acid molecule 414. The first binding portion 412 can be an antibody or portion thereof, for example, with a binding site to bind to the analyte 401. The first nucleic acid molecule 414 can comprise a sequence of base pairs configured to bind into a hairpin configuration; for example, a first portion 411 can comprise a plurality of base pairs complementary to a second portion 413, with a non-complementary region between the two, such that the first and second portions bind together in a hairpin shape. Because the first nucleic acid molecule is bound to itself, it is inhibited from pairing with complementary hairpin molecules 432 in solution. In some embodiments, the 3' end of the first nucleic acid molecule is bonded to the binding portion, thereby inhibiting polymerization; however, since the method 400 does not require polymerization, and can therefore be done in the absence of polymerase, the 5' and 3' ends illustrated in FIG. 4 can be optionally varied. For consistency with the drawings, however, the first portion of the first nucleic acid molecule will be referred to as the 3' portion 411, while the second portion will be referred to as the 5' portion 413.

The second probe 420 can comprise a second binding portion 422 and a second interaction portion comprising a second nucleic acid molecule 424. The second binding portion 422 can be an antibody or portion thereof, for example, with a binding site to bind to the analyte 401. The second nucleic acid molecule 424 can be a DNA molecule, for example, and can be bonded to the binding portion 422 at the 5' end. The second nucleic acid molecule 424 can comprise a base pair sequence complementary to the base pair sequence of the first nucleic acid molecule for at least a portion of the second nucleic acid molecule; for example, the 3' portion 411 corresponding to the self-binding part of the first nucleic acid molecule. However, the second nucleic acid molecule can also include a portion that does not complement the first nucleic acid molecule toward the 3' end, such that the two molecules, when paired together, only bind to each other at a middle part of each strand, with one end of each bonded to its respective binding portion and one end of each free to move thermally.

In a first step 402, the first probe 410, the second probe 420, and the analyte 401 are each provided in the fluid together. The first and second probes each bind to a common analyte molecule 401, and this binding brings the two probes into proximity, allowing the interaction portions of the probes to interact.

This interaction occurs in a second step 404, in which the 3' portion 411 of the first nucleic acid molecule 414 and the second nucleic acid molecule 424 interact to form a complex 430. The first and second nucleic acid molecules can contain a plurality of complementary base pairs forming respective complementary sequences such that they can interact when in proximity to form a double-stranded nucleic acid complex over a portion of the two molecules, while unfolding the first nucleic acid from its closed hairpin configuration. The 5' portion 413 of the first nucleic acid molecule 414 is then free to move in solution (as is, optionally, the remaining sequence at the end of the second nucleic acid molecule 424). Because the 5' portion 413 of the first nucleic acid molecule was complementary to the 3' portion 411, it has base pairs matching those of the second nucleic acid molecule 412 (although the matching does not need to be perfect, the two sequences should be substantially identical such that each sufficiently binds to the 3' portion 411).

The fluid further comprises a plurality of free hairpin molecules, including hairpin molecule 432. Hairpin molecule 432 includes sequences of base pairs at each end complementary to each other as well as to the corresponding ends of the first nucleic acid molecule 414, but in reverse order so that the 3' end of the hairpin molecule 432 complements a part of the first nucleic acid molecule near the hairpin turn. Because the free hairpin 432 contains a 3' end that is reverse-complementary to the 5' end 411 of the first nucleic acid molecule, the two can bind, unfolding the free hairpin 432 and forming a two-molecule hairpin complex 440.

In step 408, a second free hairpin molecule 434, comprising an end reverse-complementary to the 5' end of the two-molecule hairpin complex 440, is drawn out of solution, unfolded by base-airing interactions, and binds to the complex to form a three-molecule hairpin complex 450. The end of this new complex will then be reverse-complementary to a second molecule the first free hairpin 432, allowing another unfolding and further extension of the complex. This process can continue indefinitely, even if the original binding to the analyte breaks, as a runaway hairpin assembly reaction. Fluorescence or other imaging can then be used to detect the assembly reaction in analyte-containing volumes in a manner similar to that described above for FIGS. 2 and 3, and similar analysis techniques can be used to determine characteristics such as analyte number or concentration, for example. For example, fluorescent moieties can be included in solution fluoresce in the presence of unfolded hairpins, but not in the presence of folded hairpins. While the hairpins remain folded, fluorescence is thus quenched, but the hairpin assembly reaction causes a cascade dequenching of fluorescence as many hairpins are unfolded.

Figure 5:
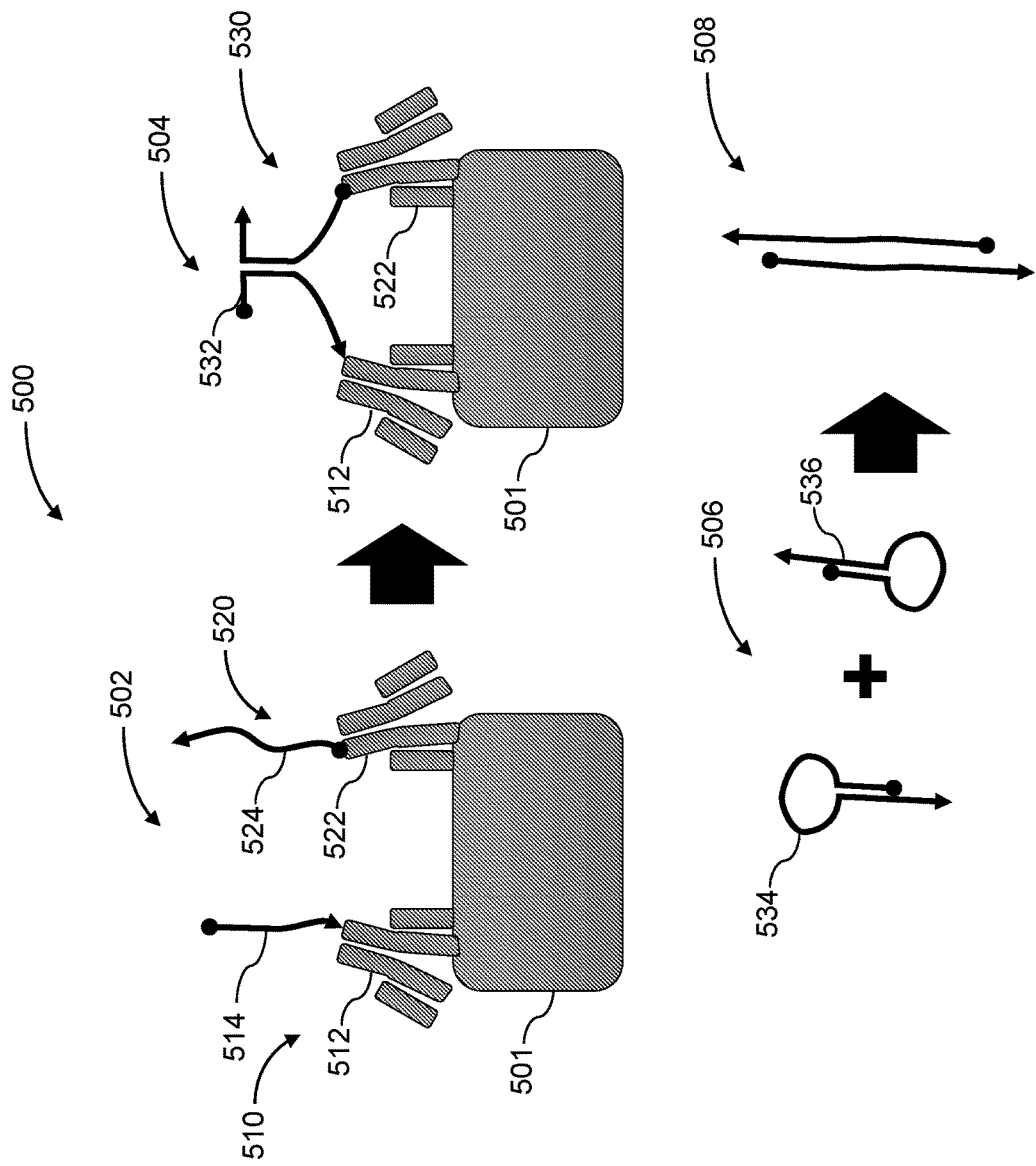
FIG. 5 illustrates a method for analyte detection using a three-way junction to catalyze a hairpin assembly reaction.

FIG. 5 illustrates a method 500 for analyte detection using a three-way junction to catalyze a hairpin assembly reaction. The method can be performed in a fluid; for example, in each of a plurality of compartmentalized fluid-containing volumes. In the fluid is provided an analyte 501. For example, the analyte may be a protein molecule. The method 500 can be characterized as a "detached" method, in the sense that although a proximity-based interaction occurs while fluid constituents are attached to the analyte, the interaction is used to generate a catalyst for reactions that occur in solution, detached from the junction. Furthermore, no enzymes are needed for the method 500; thus there is no requirement for nucleic acid polymerization, for example.

The fluid can further comprise a first probe 510 and a second probe 520. The first probe comprises a first binding portion 512 bonded to a first interaction portion comprising a first nucleic acid molecule 514. The first binding portion 512 can be an antibody or portion thereof, for example, with a binding site to bind to the analyte 501. The second probe comprises a second binding portion 522 bonded to a second nucleic acid molecule 524. The second binding portion 522 can be an antibody or portion thereof, for example, with a binding site to bind to the analyte 501.

In a first step 502, the first probe 510, the second probe 520, and the analyte 501 are each provided in the fluid together. The first and second probes each bind to a common analyte molecule 501, and this binding brings the two probes into proximity, allowing the interaction portions of the probes to interact.

This interaction occurs in a second step 504, in which the first nucleic acid molecule 514 and the second nucleic acid molecule 524 interact to form a complex 530. The first and second nucleic acid molecules can contain a plurality of complementary base pairs for part of each molecule, for example, such that they can interact when in proximity to form a double-stranded nucleic acid complex 530. The remaining, non-complementary portions of the first and second nucleic acids can then form a catalytic surface 532 with which other nucleic acid molecules can interact.

As an example of such a catalyzed interaction, in step 506 the catalytic surface 532 of the complex 530 can catalyze an unfolding of a first hairpin molecule 534 and a second hairpin molecule 536 that are provided in solution. The catalysis can occur via base-pairing between portions of the first and second nucleic acid molecules forming the catalytic surface 532 and portions of one or both of the hairpin molecules. These unfolded hairpin molecules can have complementary base-pair sequences, such that they form a double-stranded nucleic acid complex in step 508. Furthermore, steps 506 and 508 can be repeated as catalytic surface 532 catalyzes the unfolding of additional pairs of hairpin molecules, leading to a depletion of hairpin molecules from solution and an accumulation of double strands of nucleic acids. Fluorescence or other imaging can then be used to detect the accumulation of these double strands in analyte-containing volumes in a manner similar to that described above for FIGS. 2 and 3, and similar analysis techniques can be used to determine characteristics such as analyte number or concentration, for example. The unfolding of hairpins can thus be detected by a cascade dequenching of fluorescence similar to that discussed above with respect to FIG. 4.

Figure 6:
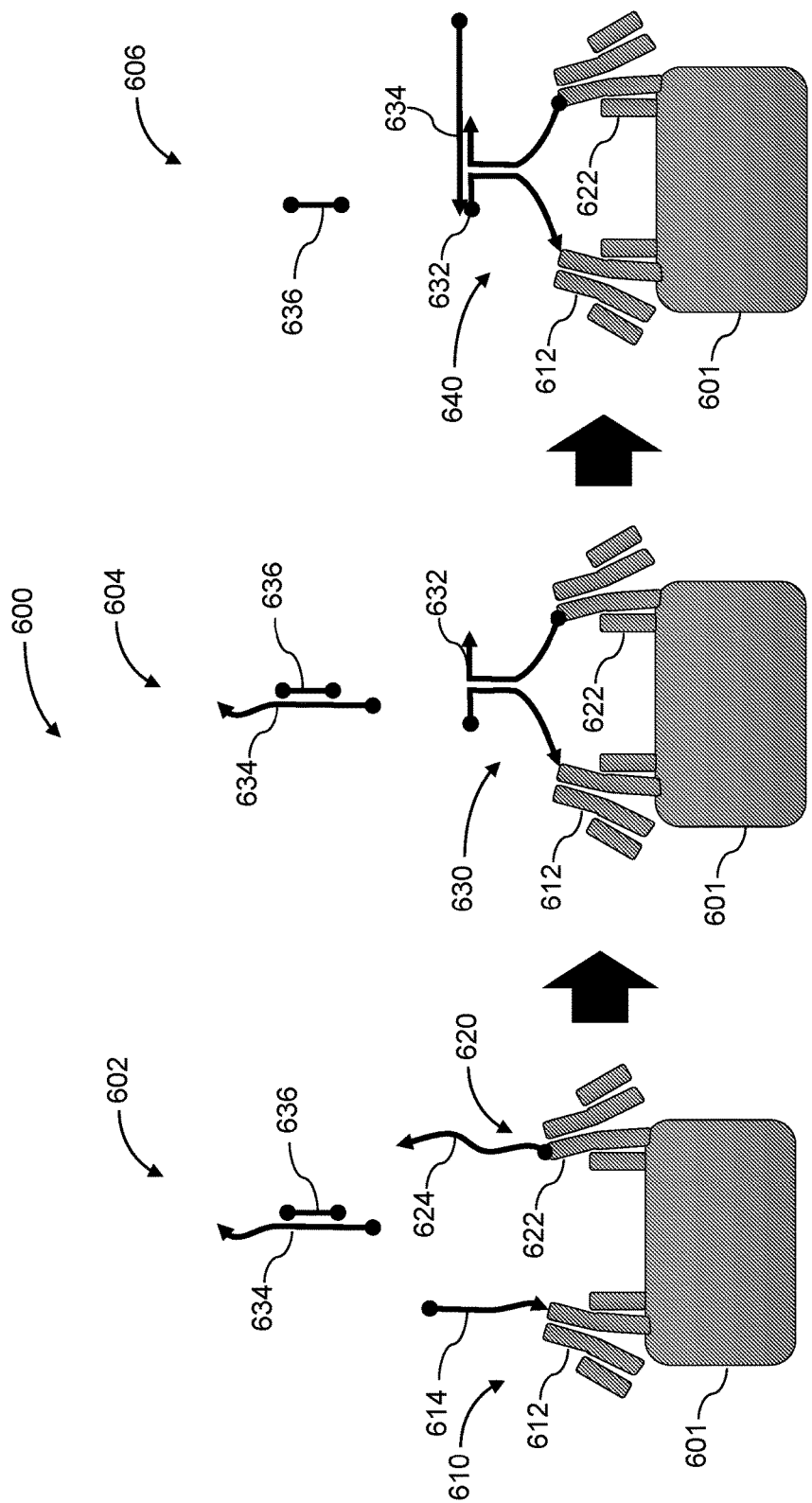
FIG. 6 illustrates a method for analyte detection using a three-way junction to catalyze attached strand displacement amplification.

FIG. 6 illustrates a method 600 for analyte detection using a three-way junction to catalyze attached strand displacement amplification. The method can be performed in a fluid; for example, in each of a plurality of compartmentalized fluid-containing volumes. In the fluid is provided an analyte 601. For example, the analyte may be a protein molecule. The method 600 can be characterized as an at least partially-attached method, in the sense that although a proximity-based interaction occurs while fluid constituents are attached to the analyte, and the interaction proceeds to polymerize in an amplification reaction while attached to the analyte. As discussed below, the amplification reaction can optionally also involve an exponential amplification reaction that proceeds detached from the analyte.

The fluid can further comprise a first probe 610 and a second probe 620. The first probe comprises a first binding portion 612 bonded to a first interaction portion comprising a first nucleic acid molecule 614. The first binding portion 612 can be an antibody or portion thereof, for example, with a binding site to bind to the analyte 601. The second probe comprises a second binding portion 622 bonded to a second nucleic acid molecule 624. The second binding portion 622 can be an antibody or portion thereof, for example, with a binding site to bind to the analyte 601.

In a first step 602, the first probe 610, the second probe 620, and the analyte 601 are each provided in the fluid together. The first and second probes each bind to a common analyte molecule 601, and this binding brings the two probes into proximity, allowing the interaction portions of the probes to interact. Also in solution is an auxiliary substrate 634 coupled to an auxiliary non-extendible blocker oligonucleotide 636. The auxiliary non-extendible blocker oligonucleotide 636 binds to the auxiliary substrate 634 and inhibits polymerization. The auxiliary substrate 634 comprises a first portion complementary to a sequence at or near the end of the first nucleic acid molecule, and the auxiliary substrate comprises a second portion complementary to a sequence at the end of the second nucleic acid molecule. The non-extendible blocker oligonucleotide 636 can be complementary to and bound to at least part of the first and second portions of the auxiliary substrate 634. Accordingly, although either the first or second nucleic acid molecules can comprise a sequence that competes with the blocker to bind with part of the auxiliary substrate, the blocker can bind more strongly (e.g., to more complementary nucleic acids) than either the first or second nucleic acid molecules. Thus, while all molecules are in solution, without binding to the analyte, it is unlikely for the blocker to be dislodged.

However, upon binding of the first and second probes to the analyte, this relationship can change due to a proximity-based interaction between the first and second nucleic acid molecules. This interaction occurs in a second step 604, in which the first nucleic acid molecule 614 and the second nucleic acid molecule 624 interact to form a complex 630. The first and second nucleic acid molecules can contain a plurality of complementary base pairs for part of each molecule, for example, such that they can interact when in proximity to form a double-stranded nucleic acid complex 630. The remaining, non-complementary portions of the first and second nucleic acids can then form a catalytic surface 632 with which other nucleic acid molecules can interact. The portions of the first and second nucleic acid molecules forming the catalytic surface 632 can comprise the portions complementary to the first and second portions of the auxiliary substrate. Although neither portion may be sufficient individually to reliably overcome the binding of the blocker 636 to the auxiliary substrate 634, together the two nucleic acid molecules can form a catalytic surface that binds strongly enough to the auxiliary substrate to reliably displace the blocker. This displacement occurs in step 606, releasing the blocker 636 into solution.

This forms an active complex 640, in which the 3' end of the second nucleic acid molecule can be extended using the auxiliary substrate as a template. The extended portion can be nicked by a nicking endonuclease, using a process similar to that illustrated in FIG. 2, releasing a nicked portion into solution. In some embodiments, the nicking endonuclease comprises sgRNA guided CRISPR-Cas9. In some embodiments, this process simply repeats, producing an accumulation of nicked portions into solution at a roughly linear rate. Alternatively, the auxiliary substrate can be configured to take part in an exponential amplification reaction. For example, the auxiliary substrate can have a pattern of base pairs similar to that illustrated in FIG. 3, e.g., with regions 1*, 2*, 1*, 2* reading from 5' to 3'. The portions of the first and second nucleic acids can then present complementary sequences 1 and 2, respectively, which form the catalytic surface 632. The extended portion nicked into solution can then be a copy of this surface, having sequences 1, 2 from 5' to 3'. The nicked portion can then act as a freely-moving catalytic surface, displacing blockers from additional auxiliary substrates in solution, then being extended and nicked in turn to produce more nicked portions with the same 1,2 sequence. This process can then resemble the process illustrated in FIG. 3, leading to an exponentially-growing accumulation of nicked portions in solution.

Whichever amplification method is selected, fluorescence or other imaging can then be used to detect the amplification reaction in analyte-containing volumes in a manner similar to that described above for FIGS. 2 and 3, and similar analysis techniques can be used to determine characteristics such as analyte number or concentration, for example.

In some embodiments of this disclosure, fluid volumes comprise a plurality of auxiliary substrates. In certain embodiments, at least some of the auxiliary substrates are bound to an auxiliary non-extendable blocker oligonucleotide. In some embodiments, none of the auxiliary substrates are bound to an auxiliary non-extendable blocker oligonucleotide. In some embodiments, fluid volumes comprise a nicking endonuclease configured to cleave an extended nucleic acid, and an auxiliary nucleic acid chain is configured to bind to the nicked portion of the extended nucleic acid. In some embodiments, the plurality of auxiliary substrates includes an auxiliary substrate designed to bind to the extended nicked portion of the nucleic acid and inactivate it. In certain embodiments, the auxiliary substrate designed to bind to the extended nicked portion of the nucleic acid inactivates it by extending it non-productively to create a threshold for exponential growth. The auxiliary substrate designed to bind to the extended nicked portion of the nucleic acid to inactivate it (referred to herein as the "threshold oligonucleotide" and "leakage threshold oligonucleotide") can be added to any of the fluid volumes disclosed herein. A leakage threshold oligonucleotide can react with product and inactivates it in order to suppress spontaneous exponential initiation in the absence of target protein.

In some embodiments of this disclosure, fluid volumes comprise a plurality of auxiliary substrates. In certain embodiments, at least some of the auxiliary substrates are bound to an auxiliary non-extendable blocker oligonucleotide. In some embodiments, none of the auxiliary substrates are bound to an auxiliary non-extendable blocker oligonucleotide. In some embodiments, fluid volumes comprise an amplification reaction that produces an amplification product oligonucleotide (e.g. from a digital isothermal amplification or digital EXPAR or digital PCR). In some embodiments, the plurality of auxiliary substrates include an auxiliary substrate designed to bind to an amplification product oligonucleotide (or product oligonucleotide) and inactivate it. In certain embodiments, the auxiliary substrate is designed to create a threshold for growth by binding to an amplification product oligonucleotide and inactivating it. In certain embodiments, the auxiliary substrate is designed to create a threshold for exponential growth by binding to an amplification product oligonucleotide and inactivating it. In certain embodiments, the auxiliary substrate is designed to bind to an amplification product oligonucleotide and inactivate it by extending it non-productively to create a threshold for growth. In certain embodiments, the auxiliary substrate is designed to bind to an amplification product oligonucleotide and inactivate it by extending it non-productively to create a threshold for exponential growth. The auxiliary substrate designed to bind to the amplification product oligonucleotide (referred to herein as the "threshold oligonucleotide" and "leakage threshold oligonucleotide") can be added to any of the fluid volumes disclosed herein. A leakage threshold oligonucleotide can react with product oligonucleotide and inactivates it in order to suppress spontaneous initiation in the absence of target. A leakage threshold oligonucleotide can react with product oligonucleotide and inactivate it in order to suppress spontaneous initiation and exponential growth in the absence of target.

In some embodiments, the plurality of auxiliary substrates comprises an auxiliary substrate that binds to an amplification product oligonucleotide and inactivates it. In some embodiments, the plurality of auxiliary substrates comprises an auxiliary substrate that binds to a product oligonucleotide and inactivates it. In certain embodiments, the plurality of auxiliary substrates comprises an auxiliary substrate that creates a threshold for growth by binding to an amplification product oligonucleotide. In certain embodiments, the plurality of auxiliary substrates comprises an auxiliary substrate that creates a threshold for exponential growth by binding to an amplification product oligonucleotide. In certain embodiments, the plurality of auxiliary substrates comprises an auxiliary substrate that binds to an amplification product oligonucleotide and inactivates it by extending it non-productively to create a threshold for growth. In certain embodiments, the plurality of auxiliary substrates comprises an auxiliary substrate that binds to an amplification product oligonucleotide and inactivates it by extending it non-productively to create a threshold for exponential growth. The auxiliary substrate that binds to the amplification product oligonucleotide (referred to herein as the "threshold oligonucleotide" and "leakage threshold oligonucleotide") can be added to any of the fluid volumes disclosed herein.

Figure 7:
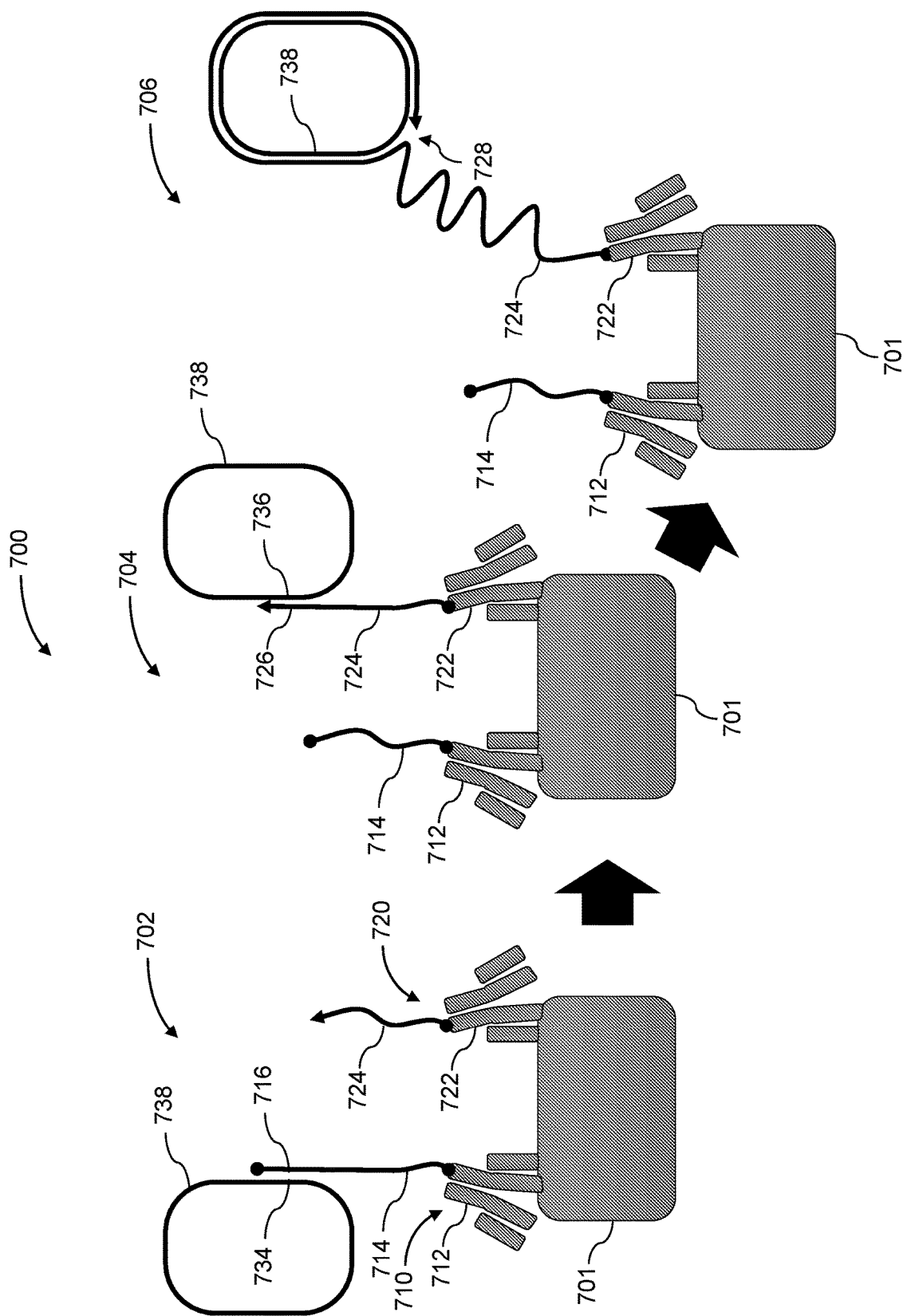
FIG. 7 illustrates a method for analyte detection using attached rolling-circle amplification.

FIG. 7 illustrates a method 700 for analyte detection using attached rolling-circle amplification. The method can be performed in a fluid; for example, in each of a plurality of compartmentalized fluid-containing volumes. In the fluid is provided an analyte 701. For example, the analyte may be a protein molecule. The method 700 can be characterized as an "attached" method, in that it involves a reaction (an amplification reaction) that occurs in a complex attached to the analyte.

The fluid can further comprise a first probe 710 and a second probe 720. The first probe comprises a first binding portion 712 bonded to a first interaction portion comprising a first nucleic acid molecule 714. The first binding portion 712 can be an antibody or portion thereof, for example, with a binding site to bind to the analyte 701. The first nucleic acid molecule 714 is bound to a rolling-circle substrate 738 (e.g., a circular nucleic acid molecule). The first nucleic acid molecule 714 and the rolling-circle substrate 738 can be DNA molecules bound together by base pairing interactions, for example. The rolling-circle substrate 738 can comprise a plurality of nucleic acids chained together to form a loop. Because the loop lacks an end, extension by DNA polymerase is inhibited. The rolling-circle substrate 738 comprises a first binding site 734 complementary to a first binding sequence 716 on the first nucleic acid molecule. If the first nucleic acid molecule 714 is bonded to the first binding portion 712 on the 3' end, or if the first nucleic acid molecule is modified to prevent extension (e.g., with an inverted nucleotide), polymerization can be inhibited for the first nucleic acid molecule 714 as well.

The second probe 720 can comprise a second binding portion 722 and a second interaction portion comprising a second nucleic acid molecule 724. The second binding portion 722 can be an antibody or portion thereof, for example, with a binding site to bind to the analyte 701. The second nucleic acid molecule 724 can be a DNA molecule, for example, and can be bonded to the binding portion 722 at the 5' end. Accordingly, the second nucleic acid molecule 724 can be extended by a polymerase (e.g., DNA polymerase) if provided with an appropriate template.

In a first step 702, the first probe 710, the second probe 720, and the analyte 701 are each provided in the fluid together. The first and second probes each bind to a common analyte molecule 701, and this binding brings the two probes into proximity, allowing the interaction portions of the probes to interact.

This interaction occurs in a second step 704, in which the first nucleic acid molecule 714 transfers the rolling-circle substrate 738 to the second nucleic acid molecule 724. The second nucleic acid molecule has a base pair sequence complementary to a second binding portion 736 of the rolling-circle substrate 738, which may overlap in whole or in part with the binding portion 734. In some embodiments, the second nucleic acid molecule 724 can have a higher affinity to the second binding site 736 than the first nucleic acid molecule 714 has to the first binding site 734. In alternative embodiments, the second nucleic acid has an equivalent or even weaker affinity than the first, and relies on thermal equilibration to eventually transfer the rolling-circle substrate. The affinities can be varied by having different lengths of complementary base pair sequences, for example, or by including some mismatched base pairs in one or both nucleic acid molecules. Upon binding to the rolling-circle substrate, the second nucleic acid molecule 724 can be extended from its 3' end using the rolling-circle substrate as a template.

The polymerization continues in step 706, eventually extending the second nucleic acid molecule 724 to form a loop complementary to the rolling-circle substrate 738. The reaction can continue extending the 3' end of the second nucleic acid molecule, unwinding the second nucleic acid molecule as needed to clear a polymerization site 728 for further extension. As the process continues in a runaway amplification reaction, the second nucleic acid molecule grows larger and larger. The generation of this large strand can be detected using fluorescence or other imaging. Because the reaction tends to only run to completion in analyte-containing volumes, such volumes can therefore be detected in a manner similar to that described above for FIGS. 2 and 3, and similar analysis techniques can be used to determine characteristics such as analyte number or concentration, for example.

Figure 8:
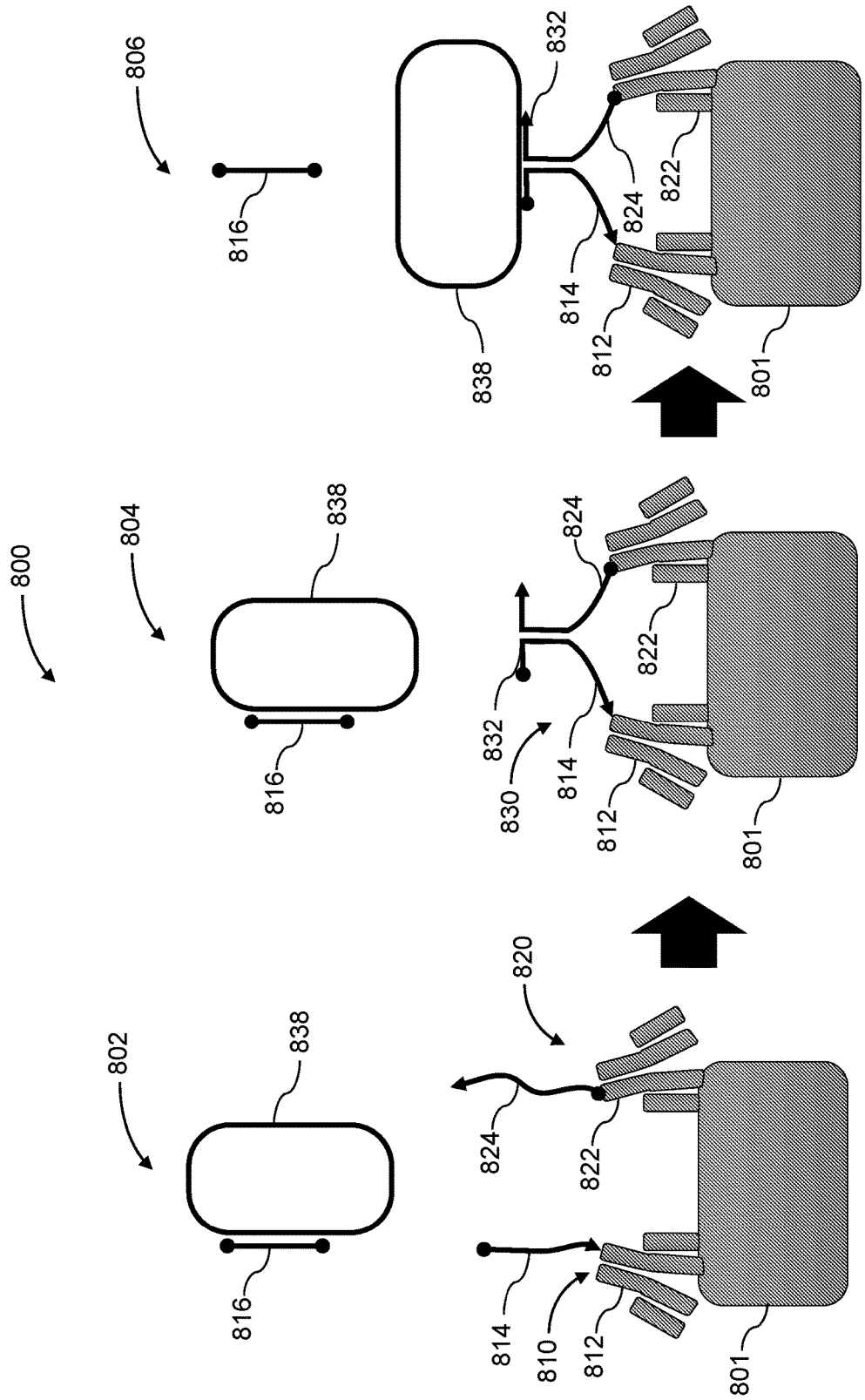
FIG. 8 illustrates a method for analyte detection using a three-way junction to activate detached rolling-circle amplification.

FIG. 8 illustrates a method 800 for analyte detection using a three-way junction to activate detached rolling-circle amplification. The method can be performed in a fluid; for example, in each of a plurality of compartmentalized fluid-containing volumes. In the fluid is provided an analyte 801. For example, the analyte may be a protein molecule. The method 800 can be characterized as an "attached" method, in that it involves a reaction (an amplification reaction) that occurs in a complex attached to the analyte.

The fluid can further comprise a first probe 810 and a second probe 820. The first probe comprises a first binding portion 812 bonded to a first interaction portion comprising a first nucleic acid molecule 814. The first binding portion 812 can be an antibody or portion thereof, for example, with a binding site to bind to the analyte 801. The second probe comprises a second binding portion 822 bonded to a second nucleic acid molecule 824. The second binding portion 822 can be an antibody or portion thereof, for example, with a binding site to bind to the analyte 801.

In a first step 802, the first probe 810, the second probe 820, and the analyte 801 are each provided in the fluid together. The first and second probes each bind to a common analyte molecule 801, and this binding brings the two probes into proximity, allowing the interaction portions of the probes to interact. Also in solution is a rolling-circle substrate 838 coupled to a non-extendible blocker oligonucleotide 816. The non-extendible blocker oligonucleotide 816 binds to the rolling-circle substrate 838 and inhibits polymerization. The rolling-circle substrate 838 comprises a first portion complementary to a sequence at or near the end of the first nucleic acid molecule, and the rolling-circle substrate 838 comprises a second portion complementary to a sequence at the end of the second nucleic acid molecule. The non-extendible blocker oligonucleotide 816 can be complementary to and bound to at least part of the first and second portions of the rolling-circle substrate 838. Accordingly, although either the first or second nucleic acid molecules can comprise a sequence that competes with the blocker to bind with part of the rolling-circle substrate 838, the blocker can bind more strongly (e.g., to more complementary nucleic acids) than either the first or second nucleic acid molecules. Thus, while all molecules are in solution, without binding to the analyte, it is unlikely for the blocker to be dislodged.

However, upon binding of the first and second probes to the analyte, this relationship can change due to a proximity-based interaction between the first and second nucleic acid molecules. This interaction occurs in a second step 804, in which the first nucleic acid molecule 814 and the second nucleic acid molecule 824 interact to form a complex 830. The first and second nucleic acid molecules can contain a plurality of complementary base pairs for part of each molecule, for example, such that they can interact when in proximity to form a double-stranded nucleic acid complex 830. The remaining, non-complementary portions of the first and second nucleic acids can then form a catalytic surface 832 with which other nucleic acid molecules can interact. The portions of the first and second nucleic acid molecules forming the catalytic surface 832 can comprise the portions complementary to the first and second portions of the rolling-circle substrate 838. Although neither portion may be sufficient individually to reliably overcome the binding of the blocker 816 to the rolling-circle substrate 838, together the two nucleic acid molecules can form a catalytic surface that binds strongly enough to the rolling-circle substrate 838 to reliably displace the blocker.

This displacement occurs in step 806, releasing the blocker 816 into solution. This forms an active complex 830, in which the 3' end of the second nucleic acid molecule can be extended using the rolling-circle substrate 838 as a template. As the polymerization continues, it eventually extends the second nucleic acid molecule 824 to form a loop complementary to the rolling-circle substrate 838 (see FIG. 7, step 706, for example). The reaction can continue extending the 3' end of the second nucleic acid molecule, unwinding the second nucleic acid molecule as needed to clear a polymerization site for further extension. Once the polymerization process has begun, it is no longer necessary for the first nucleic acid molecule to remain bound to the rolling-circle substrate; indeed, once the polymerization has circled around once, the first nucleic acid molecule must be detached to continue using the rolling-circle substrate as a template. The complex 830 can break apart as needed, although once the process moves sufficiently far along, the configuration of the first and second molecules near the analyte is irrelevant. In fact, the two probes are free to detach from the analyte while the process continues. As the process continues in a runaway amplification reaction, the second nucleic acid molecule grows larger and larger. The generation of this large strand can be detected using fluorescence or other detection methods (e.g., other optical or non-optical detection methods). Because the reaction tends to only run to completion in analyte-containing volumes, such volumes can therefore be detected in a manner similar to that described above for FIGS. 2 and 3, and similar analysis techniques can be used to determine characteristics such as analyte number or concentration, for example.

Figure 9:
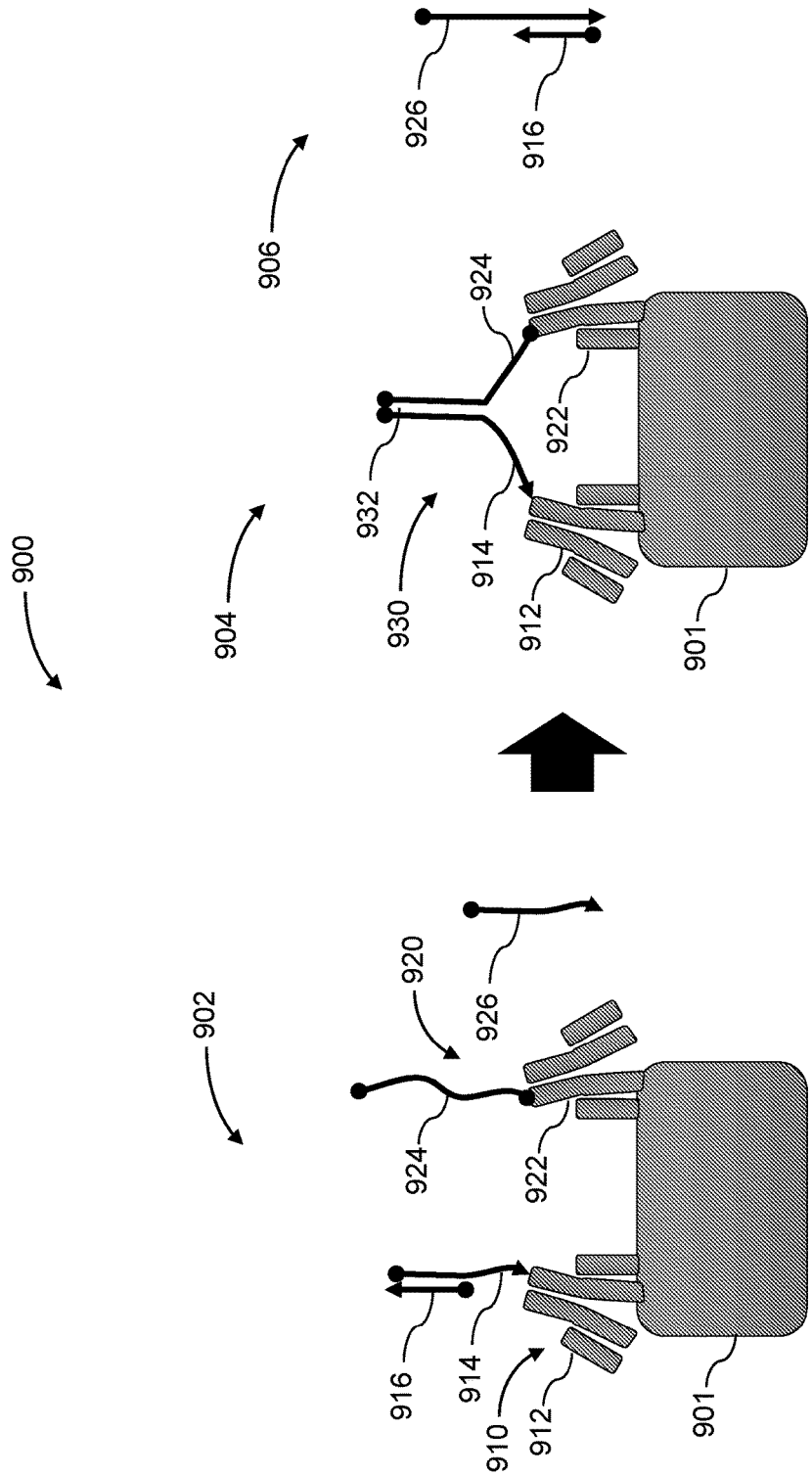
FIG. 9 illustrates a method for analyte detection using detached strand displacement amplification.

FIG. 9 illustrates a method 900 for analyte detection using detached strand displacement amplification. The method can be performed in a fluid; for example, in each of a plurality of compartmentalized fluid-containing volumes. In the fluid is provided an analyte 901. For example, the analyte may be a protein molecule. The method 900 can be characterized as a "detached" method, in that although a proximity-based interaction occurs involving fluid constituents attached to the analyte, this interaction merely serves to trigger the initiation of an amplification reaction involving constituents detached from the analyte.

The fluid can further comprise a first probe 910 and a second probe 920. The first probe comprises a first binding portion 912 bonded to a first interaction portion comprising a first nucleic acid molecule 914. The first binding portion 912 can be an antibody or portion thereof, for example, with a binding site to bind to the analyte 901. The first nucleic acid molecule 914 is bound to an extendible substrate 916. The first nucleic acid molecule 914 and extendible substrate 916 can be DNA molecules bound together by base pairing interactions, for example. The extendible substrate 916 can be bound with its 3' end attached to the 5' end of the first nucleic acid molecule 914, thus providing no template for DNA polymerase to act on that end. If the first nucleic acid molecule 914 is bonded to the first binding portion 912 on the 3' end, polymerization can be inhibited for both the first nucleic acid molecule 914 and the extendable substrate 916.

The second probe 920 can comprise a second binding portion 922 and a second interaction portion comprising a second nucleic acid molecule 924. The second binding portion 922 can be an antibody or portion thereof, for example, with a binding site to bind to the analyte 901. The second nucleic acid molecule 924 can be a DNA molecule, for example, and can be bonded to the binding portion 922. The second nucleic acid molecule 924 can be inhibited from extension on both ends. The end bonded to the binding portion is naturally inhibited from extension by the bond, and can be either the 3' or 5' end. The other end, while freely moving in solution, can be prevented from extending either by being the 5' end of the second nucleic acid molecule, or by being the 3' end but including a modification to prevent polymerization (e.g., an inverted 3' end).

The fluid can further comprise an auxiliary substrate 926 that contains a base pair sequence complementary to the extendable substrate 916, as well as a plurality of additional bases located adjacent to the complementary base pair sequence, such that if the extendible substrate 916 pairs with the corresponding sequence of the auxiliary substrate 926, the extendible substrate 916 can be extended by a polymerase using the auxiliary substrate 926 as a template. In some embodiments, the relative affinities of the auxiliary substrate 926, the extendible substrate 916, the first nucleic acid molecule 914, and the second nucleic acid molecule 924, are selected to inhibit removal of the extendible substrate 916 from the first nucleic acid molecule 914 until coming into proximity with the second nucleic acid molecule 924. For example, the extendible substrate 916 substrate can have a greater (or similar) affinity for the first nucleic acid molecule 914 than for the auxiliary substrate 926, but the first nucleic acid molecule 914 can have a greater (or similar) affinity for the second nucleic acid molecule 924 than for the extendible substrate 916. The affinities can be varied by varying the respective lengths of each molecule's matching base pairs, for example, as well as (optionally) including one or more mismatched base pairs to lower binding affinity.

In a first step 902, the first probe 910, the second probe 920, and the analyte 901 are each provided in the fluid together. The first and second probes each bind to a common analyte molecule 901, and this binding brings the two probes into proximity, allowing the interaction portions of the probes to interact.

This interaction occurs in a second step 904, in which the first nucleic acid molecule 914 and the second nucleic acid molecule 924 interact to form a complex 930. The first and second nucleic acid molecules can contain a plurality of complementary base pairs, for example, such that they can interact when in proximity to form a double-stranded nucleic acid complex 930. The interaction can displace extendable substrate 916, which can then be released into solution. The extendible substrate 916 is released into solution, and can conjugate with the auxiliary substrate 926 in solution. In step 906, the extendible substrate 916 binds to the auxiliary substrate 926 by complementary base pairing, and is subsequently extended by a polymerase (e.g., DNA polymerase), using auxiliary substrate 926 as a template. The extended portion can then be nicked by a nicking endonuclease so that the process can be repeated, leading to an accumulation of nicked nucleic acid portions, similar to the process described in FIG. 2. Furthermore, if a plurality of auxiliary substrates 926 are present in solution, and if base pair sequence of auxiliary substrate 926 contains a repeated sequence complementary to extendible substrate 916 (e.g., the 1*, 2*, 1*, 2* sequence described for FIG. 3, where the extendible substrate 916 has a 1, 2 sequence; or more simply an 1*, 1* sequence where extendible substrate 916 has a 1 sequence), then the amplification reaction can spread to include additional auxiliary substrates in an exponential amplification reaction, similar to the process described for FIG. 3.

Whichever amplification method is selected, fluorescence or other imaging can then be used to detect the amplification reaction in analyte-containing volumes in a manner similar to that described above for FIGS. 2 and 3, and similar analysis techniques can be used to determine characteristics such as analyte number or concentration, for example.

Figure 10:
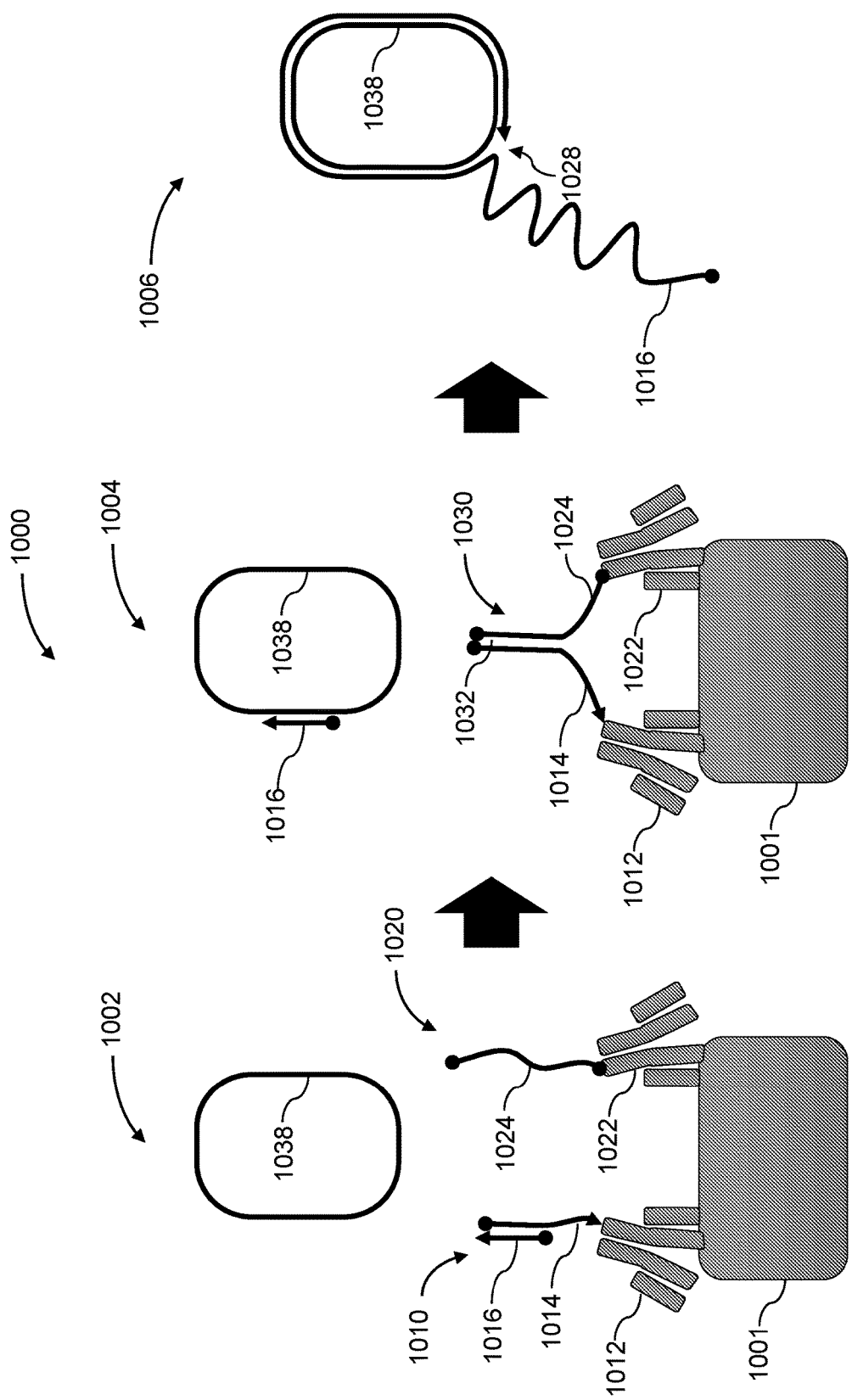
FIG. 10 illustrates a method for analyte detection using detached rolling-circle amplification.

FIG. 10 illustrates a method 1000 for analyte detection using detached rolling-circle amplification. The method can be performed in a fluid; for example, in each of a plurality of compartmentalized fluid-containing volumes. In the fluid is provided an analyte 1001. For example, the analyte may be a protein molecule. The method 1000 can be characterized as a "detached" method, in that although a proximity-based interaction occurs involving fluid constituents attached to the analyte, this interaction merely serves to trigger the initiation of an amplification reaction involving constituents detached from the analyte.

The fluid can further comprise a first probe 1010 and a second probe 1020. The first probe comprises a first binding portion 1012 bonded to a first interaction portion comprising a first nucleic acid molecule 1014. The first binding portion 1012 can be an antibody or portion thereof, for example, with a binding site to bind to the analyte 1001. The first nucleic acid molecule 1014 is bound to an extendible substrate 1016. The first nucleic acid molecule 1014 and extendible substrate 1016 can be DNA molecules bound together by base pairing interactions, for example. The extendible substrate 1016 can be bound with its 3' end attached to the 5' end of the first nucleic acid molecule 1014, thus providing no template for DNA polymerase to act on that end. If the first nucleic acid molecule 1014 is bonded to the first binding portion 1012 on the 3' end, polymerization can be inhibited for both the first nucleic acid molecule 1014 and the extendable substrate 1016.

The second probe 1020 can comprise a second binding portion 1022 and a second interaction portion comprising a second nucleic acid molecule 1024. The second binding portion 1022 can be an antibody or portion thereof, for example, with a binding site to bind to the analyte 1001. The second nucleic acid molecule 1024 can be a DNA molecule, for example, and can be bonded to the binding portion 1022. The second nucleic acid molecule 1024 can be inhibited from extension on both ends. The end bonded to the binding portion is naturally inhibited from extension by the bond, and can be either the 3' or 5' end. The other end, while freely moving in solution, can be prevented from extending either by being the 5' end of the second nucleic acid molecule, or by being the 3' end but including a modification to prevent polymerization (e.g., an inverted 3' end).

The fluid can further comprise a rolling-circle substrate 1038 that contains a base pair sequence complementary to the extendable substrate 1016, as well as a plurality of additional bases located adjacent to the complementary base pair sequence, such that if the extendible substrate 1016 pairs with the corresponding sequence of the rolling-circle substrate 1038, the extendible substrate 1016 can be extended by a polymerase using the rolling-circle substrate 1038 as a template. In some embodiments, the relative affinities of the rolling-circle substrate 1038, the extendible substrate 1016, the first nucleic acid molecule 1014, and the second nucleic acid molecule 924, are selected to inhibit removal of the extendible substrate 1016 from the first nucleic acid molecule 1014 until coming into proximity with the second nucleic acid molecule 1024. For example, the extendible substrate 1016 substrate can have a greater (or similar) affinity for the first nucleic acid molecule 1014 than for the rolling-circle substrate 1038, but the first nucleic acid molecule 1014 can have a greater (or similar) affinity for the second nucleic acid molecule 1024 than for the extendible substrate 1016. The affinities can be varied by varying the respective lengths of each molecule's matching base pairs, for example, as well as (optionally) including one or more mismatched base pairs to lower binding affinity.

In a first step 1002, the first probe 1010, the second probe 1020, and the analyte 1001 are each provided in the fluid together. The first and second probes each bind to a common analyte molecule 1001, and this binding brings the two probes into proximity, allowing the interaction portions of the probes to interact.

This interaction occurs in a second step 1004, in which the first nucleic acid molecule 1014 and the second nucleic acid molecule 1024 interact to form a complex 1030. The first and second nucleic acid molecules can contain a plurality of complementary base pairs 1032, for example, such that they can interact when in proximity to form a double-stranded nucleic acid complex 1030. The interaction can displace extendable substrate 1016, which can then be released into solution. The extendible substrate 1016 is released into solution, and can conjugate with the rolling-circle substrate 1038 in solution. After being released from the first nucleic acid molecule, the extendible substrate 1016 can conjugate with the rolling-circle substrate 1038 in solution. The extendible substrate 1016 binds to the rolling-circle substrate 1038 by complementary base pairing, and is subsequently extended by a polymerase (e.g., DNA polymerase), using rolling-circle substrate 1038 as a template.

The polymerization continues in step 1006, eventually extending the extendible substrate 1016 to form a loop complementary to the rolling-circle substrate 1038. The reaction can continue extending the 3' end of the second nucleic acid molecule, unwinding the extendible substrate 1016 as needed to clear a polymerization site 1028 for further extension. As the process continues in a runaway amplification reaction, the extendible substrate 1016 grows larger and larger. The generation of this large strand can be detected using fluorescence or other imaging. Because the reaction tends to only run to completion in analyte-containing volumes, such volumes can therefore be detected in a manner similar to that described above for FIGS. 2 and 3, and similar analysis techniques can be used to determine characteristics such as analyte number or concentration, for example.

Figure 11:
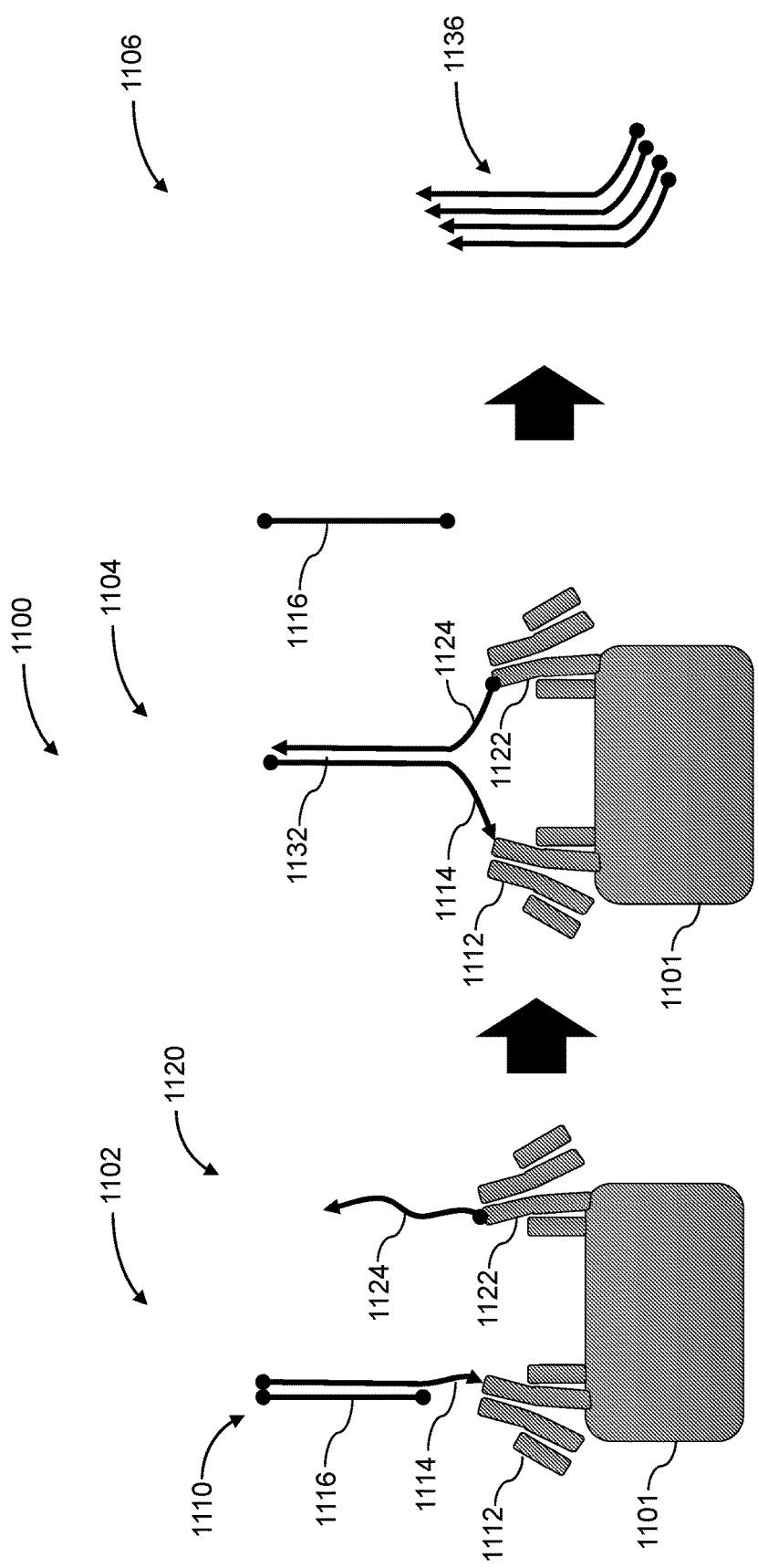
FIG. 11 illustrates a method for analyte detection using strand displacement of a blocking oligonucleotide to trigger RNA polymerization.

FIG. 11 illustrates a method 1100 for analyte detection using strand displacement of a blocking oligonucleotide to trigger RNA polymerization. The method can be performed in a fluid; for example, in each of a plurality of compartmentalized fluid-containing volumes. In the fluid is provided an analyte 1101. For example, the analyte may be a protein molecule. The method 1100 can be characterized as an "attached" method, in that it involves a reaction (RNA polymerization) that occurs in a complex attached to the analyte.

The fluid can further comprise a first probe 1110 and a second probe 1120. The first probe comprises a first binding portion 1112 bonded to a first interaction portion comprising a first nucleic acid molecule 1114. The first binding portion 1112 can be an antibody or portion thereof, for example, with a binding site to bind to the analyte 1101. The first nucleic acid molecule 1114 is bound to a blocker oligonucleotide 1116. The first nucleic acid molecule 1114 and blocker oligonucleotide 1116 can be DNA molecules bound together by base pairing interactions, for example. The blocker oligonucleotide 1116 can comprise a modification to its 3' end (e.g., an inverted 3' end), such that templated extension by DNA polymerase is inhibited on that end (as well as the 5' end, which is naturally not extended by DNA polymerase). If the first nucleic acid molecule 1114 is bonded to the first binding portion 1112 on the 3' end, polymerization can be inhibited for both the first nucleic acid molecule 1114 and the blocker oligonucleotide 1116. The blocker oligonucleotide 1116 and first nucleic acid molecule 1114 can collectively constitute an inactive RNA polymerase substrate; for example, the pair of molecules can form a double-stranded DNA complex with modified bases or mismatches to disrupt a polymerase recognition site. Accordingly, although the fluid can further comprise RNA polymerase, the production of RNA is inhibited due to the inactivation of the polymerase recognition site.

The second probe 1120 can comprise a second binding portion 1122 and a second interaction portion comprising a second nucleic acid molecule 1124. The second binding portion 1112 can be an antibody or portion thereof, for example, with a binding site to bind to the analyte 1101. The second nucleic acid molecule 1124 can be a DNA molecule, for example, and can be bonded to the binding portion 1122 at the 5' end.

In a first step 202, the first probe 1110, the second probe 1120, and the analyte 1101 are each provided in the fluid together, along with an RNA polymerase. The first and second probes each bind to a common analyte molecule 1101, and this binding brings the two probes into proximity, allowing the interaction portions of the probes to interact.

This interaction occurs in a second step 1104, in which the first nucleic acid molecule 1114 and the second nucleic acid molecule 1124 interact to form a complex 1130. The first and second nucleic acid molecules can contain a plurality of complementary base pairs, for example, such that they can interact when in proximity to form a double-stranded nucleic acid complex 1130. The interaction can displace the blocker oligonucleotide 1116, which can then be released into solution as waste. Whereas the complex comprising the blocker 1116 and first nucleic acid molecule 1114 comprises an inactive RNA polymerase substrate, the new complex 1130 comprising the first and second nucleic acid molecules comprises an active RNA polymerase substrate.

In step 1106, RNA polymerase interacts with the complex 1130 in solution in the fluid, transcribing a plurality of RNA molecules 1136. The accumulation of RNA molecules can be detected using techniques such as fluorescence imaging, which can be used to detect the accumulation of RNA strands by providing fluorescent moieties in the fluid that fluoresce upon illumination with light of an appropriate wavelength when in the presence of the RNA strands (e.g., upon binding thereto).

Because the amplification process 1100 depends on the presence of the analyte 1101 to run to completion (by effecting the proximity of the first and second probes via their binding to a common analyte, thereby initiating the proximity-based interaction), the generation of RNA strands 1136 in solution is an indication that analyte is present. The presence or absence of fluorescence (or other properties) based on the accumulation or non-accumulation of RNA in solution thus allows detection of which fluid volumes do and do not contain analyte. Thus, by using method 1100 as part of a digital assay, a measurement can be generated of the number of nucleic acid molecules in the fluid, and correspondingly other properties such as analyte concentration. Alternatively, the process 1100 can be used to perform an analog measurement of the analyte. The rate of production of RNA in solution increases with the number of analyte particles present in solution; accordingly, a measurement of the amount of RNA produced (e.g., by measurement of fluorescence intensity, by measurement of time to reach a given intensity, etc.) can be used to produce an analog measurement of the amount of analyte in the fluid. The measurement can include comparison of a measured signal to a calibrated scale, for example, to determine a measured quantity of analyte.

Optionally, the RNA produced by the polymerization from the double-stranded DNA complex 1130 can be used to trigger an exponential amplification process, thereby enhancing the signal strength indicating the presence of analyte (similar to the type of enhancement applicable to other exponential amplification reactions disclosed herein). For example, an exponential amplification reaction such as nucleic acid sequence-based amplification (NASBA) can be employed. Detection mechanisms for digital or analog measurement of exponential reactions, such as those discussed for FIG. 3, can then be employed to generate measurements of quantities of analyte in the fluid.

In some aspects, the systems described herein include a computer comprising one or more processors and a memory device with executable instructions stored thereon. In some aspects, the computer is used to perform the methods described herein. In various aspects, a computer can be used to implement any of the systems or methods illustrated and described above. In some aspects, a computer includes a processor that communicates with a number of peripheral subsystems via a bus subsystem. These peripheral subsystems can include a storage subsystem, comprising a memory subsystem and a file storage subsystem, user interface input devices, user interface output devices, and a network interface subsystem.

In some aspects, a bus subsystem provides a mechanism for enabling the various components and subsystems of the computer to communicate with each other as intended. The bus subsystem can include a single bus or multiple busses.

In some aspects, a network interface subsystem provides an interface to other computers and networks. The network interface subsystem can serve as an interface for receiving data from and transmitting data to other systems from a computer. For example, a network interface subsystem can enable a computer to connect to the Internet and facilitate communications using the Internet.

In some aspects, the computer includes user interface input devices such as a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to a computer.

In some aspects, the computer includes user interface output devices such as a display subsystem, a printer, a fax machine, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from a computer.

In some aspects, the computer includes a storage subsystem that provides a computer-readable storage medium for storing the basic programming and data constructs. In some aspects, the storage subsystem stores software (programs, code modules, instructions) that when executed by a processor provides the functionality of the methods and systems described herein. These software modules or instructions can be executed by one or more processors. A storage subsystem can also provide a repository for storing data used in accordance with the present disclosure. The storage subsystem can include a memory subsystem and a file/disk storage subsystem.

In some aspects, the computer includes a memory subsystem that can include a number of memories including a main random access memory (RAM) for storage of instructions and data during program execution and a read only memory (ROM) in which fixed instructions are stored. A file storage subsystem provides a non-transitory persistent (non-volatile) storage for program and data files, and can include a hard disk drive, a floppy disk drive along with associated removable media, a Compact Disk Read Only Memory (CD-ROM) drive, an optical drive, removable media cartridges, and other like storage media.

The computer can be of various types including a personal computer, a portable computer, a workstation, a network computer, a mainframe, a kiosk, a server or any other data processing system. Due to the ever-changing nature of computers and networks, the description of computer contained herein is intended only as a specific example for purposes of illustrating the aspect of the computer. Many other configurations having more or fewer components than the system described herein are possible.

The specific dimensions of any of the apparatuses, devices, systems, and components thereof, of the present disclosure can be readily varied depending upon the intended application, as will be apparent to those of skill in the art in view of the disclosure herein. Moreover, it is understood that the examples and aspects described herein are for illustrative purposes only and that various modifications or changes in light thereof may be suggested to persons skilled in the art and are included within the spirit and purview of this application and scope of the appended claims. Numerous different combinations of aspects described herein are possible, and such combinations are considered part of the present disclosure.

As used herein A and/or B encompasses one or more of A or B, and combinations thereof such as A and B.

All features discussed in connection with any aspect or aspect herein can be readily adapted for use in other aspects and aspects herein. The use of different terms or reference numerals for similar features in different aspects does not necessarily imply differences other than those expressly set forth. Accordingly, the present disclosure is intended to be described solely by reference to the appended claims, and not limited to the aspects disclosed herein.

Unless otherwise specified, the presently described methods and processes can be performed in any order. For example, a method describing steps (a), (b), and (c) can be performed with step (a) first, followed by step (b), and then step (c). Or, the method can be performed in a different order such as, for example, with step (b) first followed by step (c) and then step (a). Furthermore, those steps can be performed simultaneously or separately unless otherwise specified with particularity.

The particulars shown herein are by way of example and for purposes of illustrative discussion of the preferred aspects of the present disclosure only and are presented in the cause of providing what is believed to be the most useful and readily understood description of the principles and conceptual aspects of various aspects of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

While preferred aspects of the present disclosure have been shown and described herein, it is to be understood that the disclosure is not limited to the particular aspects of the disclosure described, as variations of the particular aspects can be made and still fall within the scope of the appended claims. It is also to be understood that the terminology employed is for the purpose of describing particular aspects of the disclosure, and is not intended to be limiting. Instead, the scope of the present disclosure is established by the appended claims.

Where a range of values is provided, it is understood that each intervening value, to the tenth of the unit of the lower limit unless the context clearly dictates otherwise, between the upper and lower limit of that range, and any other stated or intervening value in that stated range, is encompassed within the disclosure provided herein. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the disclosure provided herein.

All features discussed in connection with an aspect or aspect herein can be readily adapted for use in other aspects and aspects herein. The use of different terms or reference numerals for similar features in different aspects does not necessarily imply differences other than those expressly set forth. Accordingly, the present disclosure is intended to be described solely by reference to the appended claims, and not limited to the aspects disclosed herein.

EXAMPLES

The following examples are included to further describe some aspects of the present disclosure, and should not be used to limit the scope of the invention.

Example 1

Detection of Analyte with Strand Displacement Amplification (SDA)

This example describes the detection of analyte in a process corresponding to the process described above and illustrated in FIG. 2. DNA for a first probe is generated by synthesizing two parts, using standard, commercially available methods for DNA synthesis. A first strand of the DNA, DNA A, acting as an anchor attached to a binding portion, is a 3' amine-terminated oligonucleotide with a length of 60 nucleotides. The sequence is synthesized to contain the restriction site for Nb.BsrDI nicking endonuclease at a location 25 nucleotides from the 5' end. Another strand, acting as a blocker, is an oligonucleotide of 30 nucleotides with complementarity to nucleotides 30-60 of the anchor. The melting temperature of the two DNA molecules is significantly higher than 65° C. The blocker is modified at its 3' terminus with Inverted dT to prevent elongation by polymerase.

The anchor and blocker are hybridized by placing equimolar concentrations at ~1 uM in a suitable buffer (e.g., 40 mM Tris-HCl, 50 mM sodium chloride), and to 80° C., and cooling slowly at 0.1° C. per second. The two-part complex is then purified by gel electrophoresis to remove any residual unbound single-stranded DNA.

DNA for the second probe is generated by synthesizing a 5' amine-terminated oligonucleotide with a length of 30 nucleotides and identical sequence as the blocker. This is synthesized to hybridize to the same location of the anchor as the blocker. There is no significant energetic advantage for the DNA strand of the second probe, DNA B, to displace the blocker in solution and strand displacement reactions are slow. As such, DNA B is not prone to bind to DNA A in solution.

One antibody against a target of interest (e.g., interleukin-2 or IL-2) AB A is chemically ligated to DNA A to form a first probe. A second antibody, AB B is chemically ligated to DNA B to form a second probe. These two antibodies both bind to IL-2 but at different epitopes. The DNA-antibody conjugates are purified by FPLC or similar methods to remove any free DNA.

The sample containing IL-2 is treated with both DNA-antibody conjugates in a buffer containing Bst Large Fragment polymerase, Nb.BsrDI nicking endonuclease, and the appropriate conditions for enzyme activity (e.g., 40 mM Tris-HCl, 5 mM DTT, 50 mM sodium chloride, 10 mM magnesium chloride, pH 8.8 at 25° C., 0.5 mM each of dATP, dCTP, dTTP, and dGTP, plus 1/100,000 diluted SYBR Green I). After a suitable incubation of 2 hours, the temperature is increased to 65° C. to initiate the reaction.

The IL-2 antibodies bind to the IL-2 in solution, bringing DNA A and DNA B into proximity. DNA B displaces the blocker attached to DNA A. This creates an active substrate for Bst Large Fragment polymerase. When the polymerization is complete, the newly generated double stranded DNA product now contains the recognition site for the Nb.BsrDI nicking endonuclease. Nb.BsrDI creates a single stranded break which can then be recognized by polymerase to displace a single stranded product. The cycling of endonuclease and polymerase causes single stranded DNA to accumulate. This accumulation is detected by an increased fluorescence from SYBR Green I using standard fluorescence detection.

Example 2

Detection of Analyte with SDA Plus Exponential Amplification Reaction (EXPAR)

This example describes the detection of analyte in a process corresponding to the process described above and illustrated in FIG. 3. Synthetic DNA is produced according to the scheme shown in FIG. 3. An efficient EXPAR template is used, having domains 1-2-1 where for this specific example domain 1 is CTCACGCTAC (SEQ ID NO: 1) and domain 2 is GGACGACTC. A threshold oligonucleotide with domain 1 followed by mismatched bases may also be included to inhibit spurious reaction without an active substrate. Synthetic DNA having domains as illustrated in FIG. 3 is ligated to each of two respective antibodies to form antibody-DNA conjugates, using the process described in Example 1. Each antibody includes a binding site to bind to a different epitope of the target analyte.

The overall protocol involves the dilution of sample into a reaction buffer that includes the antibody-DNA conjugates. When these conjugates bind to the target analyte, this can release an initiator for EXPAR, as illustrated in FIG. 3. EXPAR enzymes, substrate DNA, and intercalating dye are added, and the sample is partitioned into droplets. The reaction volume is heated to the appropriate temperature for polymerase activity. At the enabling temperature (55° C. for Bst polymerase) the reaction exponentially amplifies any primers that have been released. No digestion or ligation is required, nor is any change of enzyme conditions (buffer exchange, etc.) necessary.

More particularly, Antibodies are be conjugated to the DNA per the protocol described above in Example 1. Antigen plus DNA-modified antibodies along with all permutations of the control combinations are be mixed at nanomolar concentrations. These samples are each added a reaction mixture of 30 μL volume, 6 units Nt.BstNBI nicking enzyme, 0.9 U Bst DNA Polymerase, 0.24 mM of each dNTP, 3 mM MgCl2, 1× Evagreen, 20 mM Tris-HCl pH 7.9, 15 mM ammonium sulfate, 30 mM KCl, 0.005% Triton X-100, and 50 nM EXPAR substrate DNA (e.g., an oligonucleotide with sequence CTCACGCTACGGACGACTCTCTCACGCTAC (SEQ ID NO: 2)). This is an adjusted version of ThermoPol buffer. Thermopol buffer (20 mM Tris-HCl; 0.1% Triton® X-100; 10 mM (NH4)2SO4; 2 mM MgSO4; 10 mM KCl; pH 8.8@25° C.) may be an adequate alternative and is supplied with Nt.BstNBI. A serial dilution from 50 nm to 0.5 pM is prepared of EXPAR primer DNA (e.g., an oligonucleotide with sequence GTAGCGTGAG (SEQ ID NO: 3)). The reaction should then be raised to 55 deg C. and monitored every minute for 120 minutes.

Example 3

Detection of Analyte with an Enzyme-Free Catalyzed Hairpin Reaction

This example describes the detection of analyte in a process corresponding to the process described above and illustrated in FIG. 5. DNA for a first probe is generated by synthesizing an oligonucleotide using standard, commercially available methods for DNA synthesis. A first strand of the DNA, DNA A, acting as an anchor attached to a binding portion, is a 3' amine-terminated oligonucleotide with a length of 60 nucleotides. The sequence is designed to contain a binding region for DNA B.

DNA for the second probe is generated by synthesizing a 5' amine-terminated oligonucleotide with a length of 30 nucleotides and a partially complementary sequence to DNA A. The binding energy of the second probe, DNA B, is very weak with a melting point near or below room temperature. As such, DNA B is not prone to bind to DNA A in solution.

One antibody against a target of interest (e.g., interleukin-2 or IL-2) AB A is chemically ligated to DNA A to form a first probe. A second antibody, AB B is chemically ligated to DNA B to form a second probe. These two antibodies both bind to IL-2 but at different epitopes. The DNA-antibody conjugates are purified by FPLC or similar methods to remove any free DNA.

Hairpin DNA 1 and hairpin DNA 2 are designed to form folded structures. Hairpin DNA 2 is synthesized to contain a fluorophore and quencher to act as a molecular beacon. The hairpin oligonucleotides are prepared separately in reaction buffer (e.g., 40 mM Tris-HCl, 150 mM sodium chloride, 10 mM potassium chloride, pH 8 at 25° C.). The hairpin DNA are annealed by heating to 80° C. for 3 minutes then snap cooling on ice. Hairpin DNA 1 and hairpin DNA 2 are then diluted and mixed to a concentration of 200 nM each along with 1 nM of each of the first and second probe in reaction buffer. Sample containing IL-2 is then added to this mixture.

The IL-2 antibodies bind to the IL-2 in solution, bringing DNA A and DNA B into proximity. DNA B binds to DNA A and creates an active catalytic complex. The catalytic complex can hybridize to hairpin DNA 1 and disrupt the double stranded stem. This makes available single stranded regions which can hybridize to hairpin DNA 2. Hairpin DNA 2 can then bind to hairpin DNA 1, displacing the catalytic complex. This results in an accumulation of double stranded product. This accumulation is detected by an increased fluorescence as the fluorophore and quencher in hairpin DNA 2 are separated.

Example 4

Detection of Analyte with a Detached Rolling-Circle Amplification Reaction

This example describes the detection of analyte in a process corresponding to the process described above and illustrated in FIG. 10. DNA for a first probe is generated by synthesizing two parts, using standard, commercially available methods for DNA synthesis. A first strand of the DNA, DNA A, acting as an anchor attached to a binding portion, is a 3' amine-terminated oligonucleotide with a length of 60 nucleotides. The sequence is synthesized to contain a part (16 bases) of a circular template viral genome from bacteriophage M13 (M13 DNA). Another strand, a primer, is an oligonucleotide of 30 nucleotides with complementarity to nucleotides 30-60 of the anchor. The melting temperature of the two DNA molecules is significantly higher than 65° C. The primer is bound to DNA A at a position that is not amenable to elongation by polymerase.

The anchor and primer are hybridized by placing equimolar concentrations at ~1 uM in a suitable buffer (e.g., 40 mM Tris-HCl, 50 mM sodium chloride), and to 80° C., and cooling slowly at 0.1° C. per second. The two-part complex is then purified by gel electrophoresis to remove any residual unbound single-stranded DNA.

DNA for the second probe, DNA B, is generated by synthesizing a 5' amine-terminated oligonucleotide with a length of 30 nucleotides and identical sequence as the primer. The 3' terminus is also modified with an inverted base to prevent elongation by polymerase. This is synthesized to hybridize to the same location of the anchor as the primer. There is no significant energetic advantage for the DNA strand of the second probe, DNA B, to displace the blocker in solution and strand displacement reactions are slow. As such, DNA B is not prone to bind to DNA A in solution.

One antibody against a target of interest (e.g., interleukin-2 or IL-2) AB A is chemically ligated to DNA A to form a first probe. A second antibody, AB B is chemically ligated to DNA B to form a second probe. These two antibodies both bind to IL-2 but at different epitopes. The DNA-antibody conjugates are purified by FPLC or similar methods to remove any free DNA.

The sample containing IL-2 is treated with both DNA-antibody conjugates in a buffer containing 1 nM M13 DNA, Bst Large Fragment polymerase, and the appropriate conditions for enzyme activity (e.g., 40 mM Tris-HCl, 5 mM DTT, 50 mM sodium chloride, 10 mM magnesium chloride, pH 8.8 at 25° C., 0.5 mM each of dATP, dCTP, dTTP, and dGTP), plus 50 nM of a molecular beacon designed to bind to the reverse complement of M13 DNA. After a suitable incubation of 2 hours, the temperature is increased to 65° C. to initiate the reaction.

The IL-2 antibodies bind to the IL-2 in solution, bringing DNA A and DNA B into proximity. DNA B displaces the primer attached to DNA A. This primer then binds to M13 DNA to generate an active substrate for Bst Large Fragment polymerase. As polymerization progresses, the newly generated rolling circle DNA product can bind to molecular beacons in solution which is detected by an increased fluorescence using standard fluorescence detection.

Example 5

Detection of Analyte with Strand Displacement Amplification (SDA)

This example describes the detection of an analyte in a process corresponding to the process described above and illustrated in FIG. 2. DNA for a first probe was generated by synthesizing two parts, using standard, commercially available methods for DNA synthesis. A first strand of the DNA, DNA A, acting as an anchor attached to a binding portion, was a 3' biotin-terminated oligonucleotide with a length of 60 nucleotides and a sequence of CTTTAACTCACACTCACGCTACGGACGACTCTATGATGGTACCTGCTTCTGAATTCTA AA (SEQ ID NO: 4).

The sequence was synthesized to contain the template for the restriction site for Nb.BstNBI nicking endonuclease at a location 22 nucleotides from the 5' end. Another strand, acting as a blocker, was an oligonucleotide of 40 nucleotides with complementarity to nucleotides 21-60 of the anchor (sequence TTTAGAATTCAGAAGCAGGTACCATCATAGAGTCGTCC*G invdT (SEQ ID NO: 5)). The blocker was modified with phosphorothioate at the position 1 base from the 3' terminus (denoted *) as well as an Inverted dT at the 3' terminus (denoted invdT) to prevent cleavage by endonuclease or elongation by a polymerase.

The anchor (1 µM as determined by UV-Vis) and blocker (1.1 µM as determined by UV-Vis) were prepared in a suitable buffer (in this case, 1×NEB isothermal amplification buffer composed of 20 mM Tris-HCl, 10 mM $(NH4)_2SO_4$, 50 mM KCl, 2 mM $MgSO_4$, 0.1% Tween® 20, pH 8.8 at 25° C.). The mixture was annealed by heating to 80° C., and cooling slowly at 0.1° C. per second. The blocker strand was added at 10% molar excess to ensure that all template strand was covered. The two-part complex may optionally be separated by gel electrophoresis to remove any residual unbound single-stranded DNA.

DNA for the second probe was generated by synthesizing a 5' biotin-terminated oligonucleotide with a length of 39 nucleotides and identical sequence as the blocker minus the modifications (sequence TTTAGAATTCAGAAGCAGGTACCATCATAGAGTCGTCCG (SEQ ID NO: 6)). This was synthesized to hybridize to the same location of the anchor as the blocker. There was no significant energetic advantage for the DNA strand of the second probe, DNA B, to displace the blocker in solution and strand displacement reactions are slow. As such, DNA B is not prone to bind to DNA A in solution.

Both DNA complexes were conjugated to a probe (biotin). The sample can be assayed for the presence of a target protein that binds to that probe (avidin). The sample containing 1 µM avidin was added along with both DNA-probe complexes to a reaction buffer containing Bst Large Fragment polymerase, Nb.BsrNBI nicking endonuclease, and the appropriate conditions for enzyme activity (e.g., appropriate buffer as noted above, 0.5 mM each of dATP, dCTP, dTTP, and dGTP, plus 1/50,000 diluted SYBR Green II). The temperature was increased to 55° C. to initiate the reaction. Control reactions were also prepared that leave out components of the reaction (i.e., template, primer, blocker, or avidin are omitted)

The biotin moieties bind to the avidin in solution, bringing DNA A and DNA B into proximity. DNA B displaced the blocker attached to DNA A. This created an active substrate for Bst Large Fragment polymerase. When the polymerization was complete, the newly generated double-stranded DNA product contained the recognition site for the Nb.BstNBI nicking endonuclease. Nb.BstNBI created a single-stranded break which could then be recognized by Bst polymerase to displace a single-stranded product. The cycling of endonuclease and polymerase causes single-stranded DNA to accumulate. This accumulation was detected by an increased fluorescence from SYBR Green II using standard fluorescence detection. The results are shown in FIG. 12A-E.

Figure 12A:
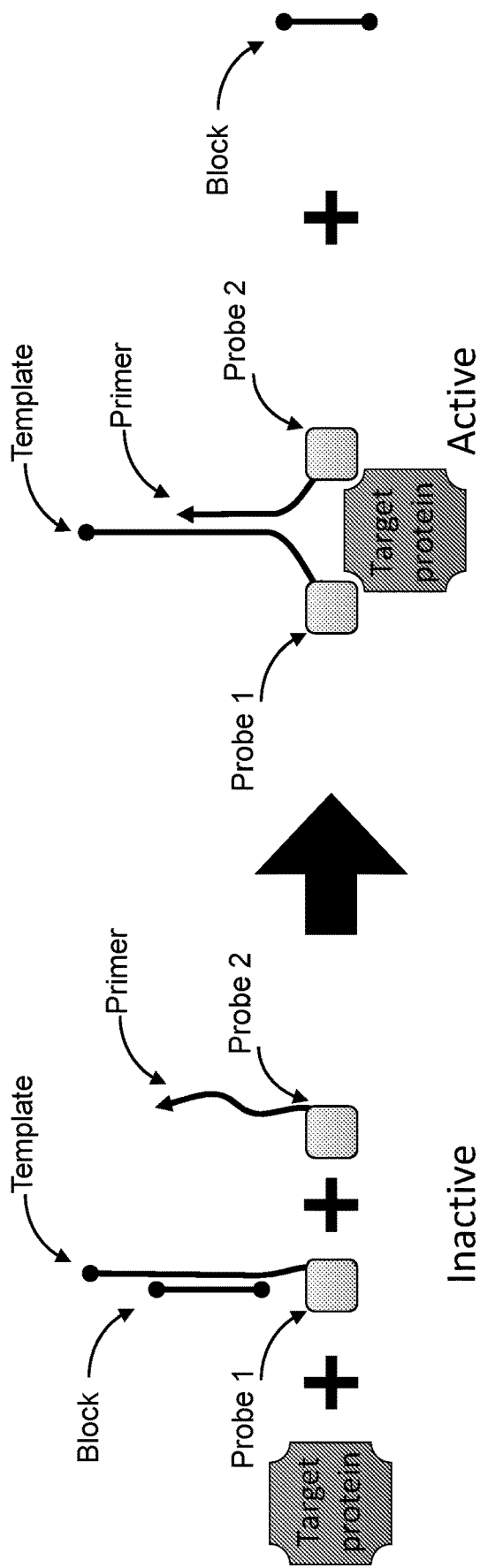
FIG. 12A illustrates a schematic of an attached strand displacement amplification reaction where proximity induces strand displacement to generate an active substrate for polymerase and nicking endonuclease.
Figure 12C:
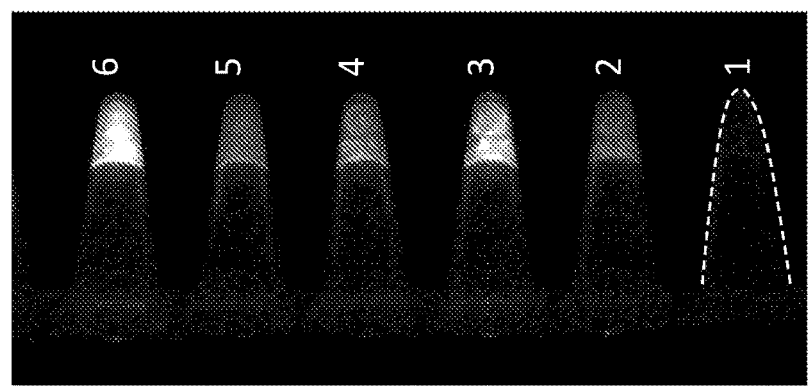
FIG. 12C illustrates an end-point fluorescence digital photograph depicting the relative fluorescence of samples from strand displacement amplification.
Figure 12B:
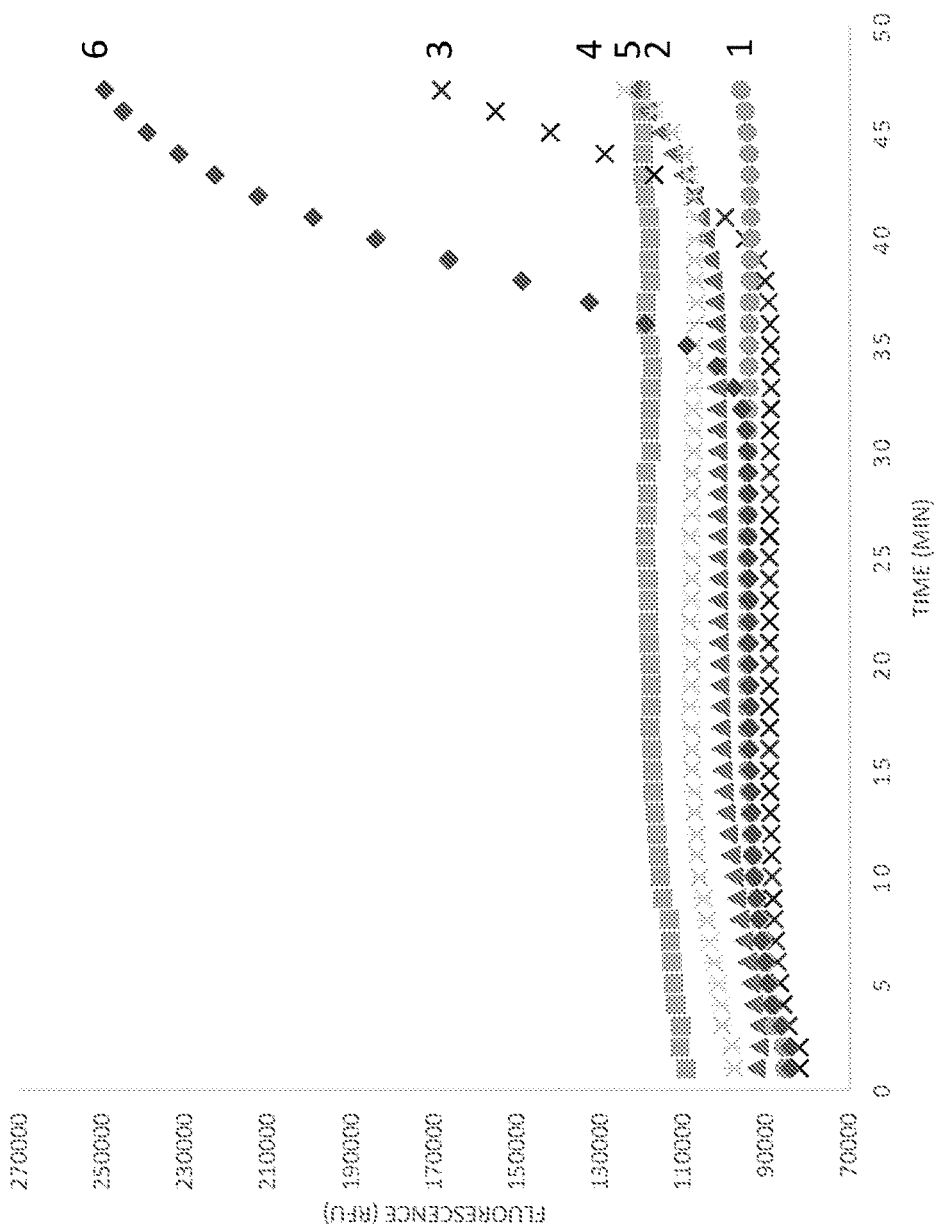
FIG. 12B illustrates fluorescence over time in the detection of analyte with strand displacement amplification.
Figures 12D, 12E:
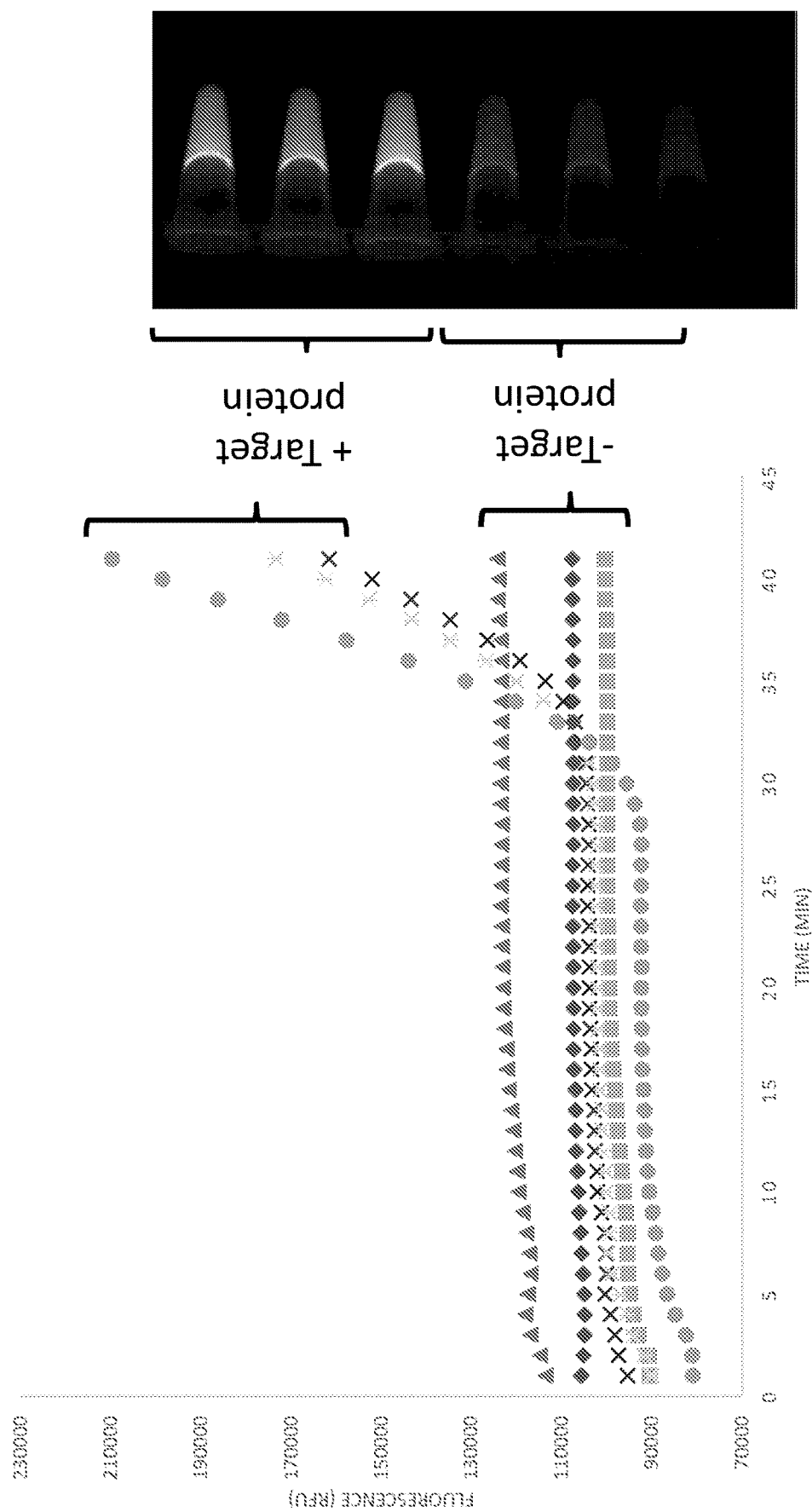
FIG. 12D illustrates fluorescence over time, conducted in triplicate experiments with and without target protein in strand displacement amplification.
FIG. 12E illustrates an end-point fluorescence digital photograph showing the relative fluorescence of triplicate samples with and without target protein.

FIG. 12A shows a schematic of reaction where proximity induces strand displacement to generate an active substrate for polymerase and nicking endonuclease. FIG. 12B shows that fluorescence over time shows the effect of proximity driven by binding of DNA to protein. Samples were prepared with: 1. water only; 2. template only; 3. positive control containing template and primer (no block); 4. negative control showing template-block; 5. negative control showing template-block+primer; and 6. experimental sample containing template-block, primer, and target protein. Sample 6, containing the template-block, primer, and target protein showed significant increases in fluorescence over time. FIG. 12C shows an end-point fluorescence digital photograph depicting the relative fluorescence of samples 1-6. The dotted line indicates location of the null-control vial. FIG. 12D shows fluorescence over time, conducted in triplicate experiments with and without target protein. The triplicate samples with target protein showed increased fluorescence over time when compared to the triplicate samples without target protein. FIG. 12E shows an end-point fluorescence digital photograph showing the relative fluorescence of triplicate samples with and without target protein. The triplicate samples with target protein showed increased fluorescence in comparison to the samples without target protein, by fluorescence digital photograph.

Example 6

Detection of Analyte with EXPAR in Solution and Droplets

This example describes the detection of an analyte in a process corresponding to the process described above and illustrated in FIG. 3. DNA for a first probe was generated by synthesizing two parts, using standard, commercially available methods for DNA synthesis. A first strand of the DNA, DNA A, acting as an anchor attached to a binding portion, was a 3' biotin-terminated oligonucleotide with a length of 60 nucleotides and a sequence of CTTTAACTCACACTCACGCTACGGACGACTCTATGATGGTACCTGCTTCTGAATTCTA AA (SEQ ID NO: 4).

The sequence was synthesized to contain the template for the restriction site for Nb.BstNBI nicking endonuclease at a location 22 nucleotides from the 5' end. Another strand, acting as a blocker, was an oligonucleotide of 32 nucleotides with complementarity to nucleotides 34-60 of the anchor (sequence TTTAGAATTCAGAAGCAGGTACCATCATTTT InvdT (SEQ ID NO: 7)). The blocker was extended with mismatched poly-T and an Inverted dT at the 3' terminus (denoted invdT) to prevent elongation by a polymerase.

The anchor (1 µM as determined by UV-Vis) and blocker (1.1 µM as determined by UV-Vis) were prepared in a suitable buffer (in this case, 1×NEB isothermal amplification buffer composed of 20 mM Tris-HCl, 10 mM $(NH_4)_2SO_4$, 50 mM KCl, 12 mM $MgSO_4$, 0.1% Tween® 20, pH 8.8 at 25° C.). The mixture was annealed by heating to 80° C., and cooling slowly at 0.1° C. per second. The blocker strand was added at 10% molar excess to ensure that all template strand was covered. The two-part complex may optionally be separated by gel electrophoresis to remove any residual unbound single-stranded DNA.

DNA for the second probe was generated by synthesizing a 5' biotin-terminated oligonucleotide with a length of 28 nucleotides and identical sequence as the blocker minus the mismatched poly-T and inverted dT modifications (sequence TTTAGAATTCAGAAGCAGGTACCATCAT (SEQ ID NO: 8)). This was synthesized to hybridize to the same location of the anchor as the blocker. There was no significant energetic advantage for the DNA strand of the second probe, DNA B, to displace the blocker in solution and strand displacement reactions were slow. As such, DNA B is not prone to bind to DNA A in solution.

Both DNA complexes were conjugated to a probe (biotin). The sample can be assayed for the presence of a target protein that binds to that probe (avidin). The sample containing 1 μM avidin was added along with both DNA-probe complexes to a reaction buffer containing Bst Large Fragment polymerase, Nb.BsrNBI nicking endonuclease, and the appropriate conditions for enzyme activity (e.g., appropriate buffer as noted above, 0.5 mM each of dATP, dCTP, dTTP, and dGTP, plus 500 nM hairpin reporter). The hairpin reporter was an oligonucleotide (sequence ATTGTACT-CACGCTACTACAAT (SEQ ID NO: 9)) modified with an Alexa Fluor® 488 fluorophore at the 5' terminus and a BHQ-1® quencher at the 3' terminus. The hairpin reporter was designed to hybridize to the product, assume a linear conformation, and increase in fluorescence. Also included in the reaction buffer was an auxiliary template oligonucleotide (sequence CTCACGCTACGGACGACTCTCTCACGC-TAC (SEQ ID NO: 2)) at 50 nM. The auxiliary template was designed to reproduce the product exponentially. A leakage threshold oligonucleotide (sequence TTTTTCTCACGC-TAC (SEQ ID NO: 10)) was also included at 10 nM. This reacts with product and inactivates it in order to suppress spontaneous exponential initiation in the absence of target protein. The temperature was increased to 45° C. to initiate the reaction. Control reactions are also prepared that leave out components of the reaction (i.e., primer, blocker, or avidin are omitted).

The biotin moieties bound to the avidin in solution, bringing DNA A and DNA B into proximity. DNA B displaced the blocker attached to DNA A. This created an active substrate for Bst Large Fragment polymerase. When the polymerization was complete, the newly generated double-stranded DNA product contained the recognition site for the Nb.BstNBI nicking endonuclease. Nb.BstNBI created a single-stranded break which could then be recognized by Bst polymerase to displace a single-stranded product. The cycling of endonuclease and polymerase caused single-stranded DNA to accumulate. The single-stranded product can act as a primer on the auxiliary template. The auxiliary template acted in the same way as the template to catalytically produce the single-stranded product DNA with the same sequence. This produced an exponential accumulation of product. The product was detected by an increased fluorescence due to binding between product and hairpin reporter.

The reaction was also enclosed in droplets. Once the reaction mixture is prepared as above, the sample and reaction buffer are emulsified within an oil phase (BioRad Droplet Generation Oil for Probes) by rapid vortexing for 30 seconds. This generated water-in-oil droplets containing all reagent components. In some of the experiments, some droplets contained the target molecule while some droplets did not contain the target molecule (also referred to as the analyte molecule). The temperature was increased to 45° C. to initiate the reaction. Active substrate for Bst Large Fragment polymerase generated fluorescent product within isolated droplets. Inactive droplets indicated no active initiator to exponential growth and showed only low levels of fluorescent product. In the limiting case where all droplets contain the reaction product, all droplets are fluorescent. The results are shown in FIG. 13A-C.

Figure 13A:
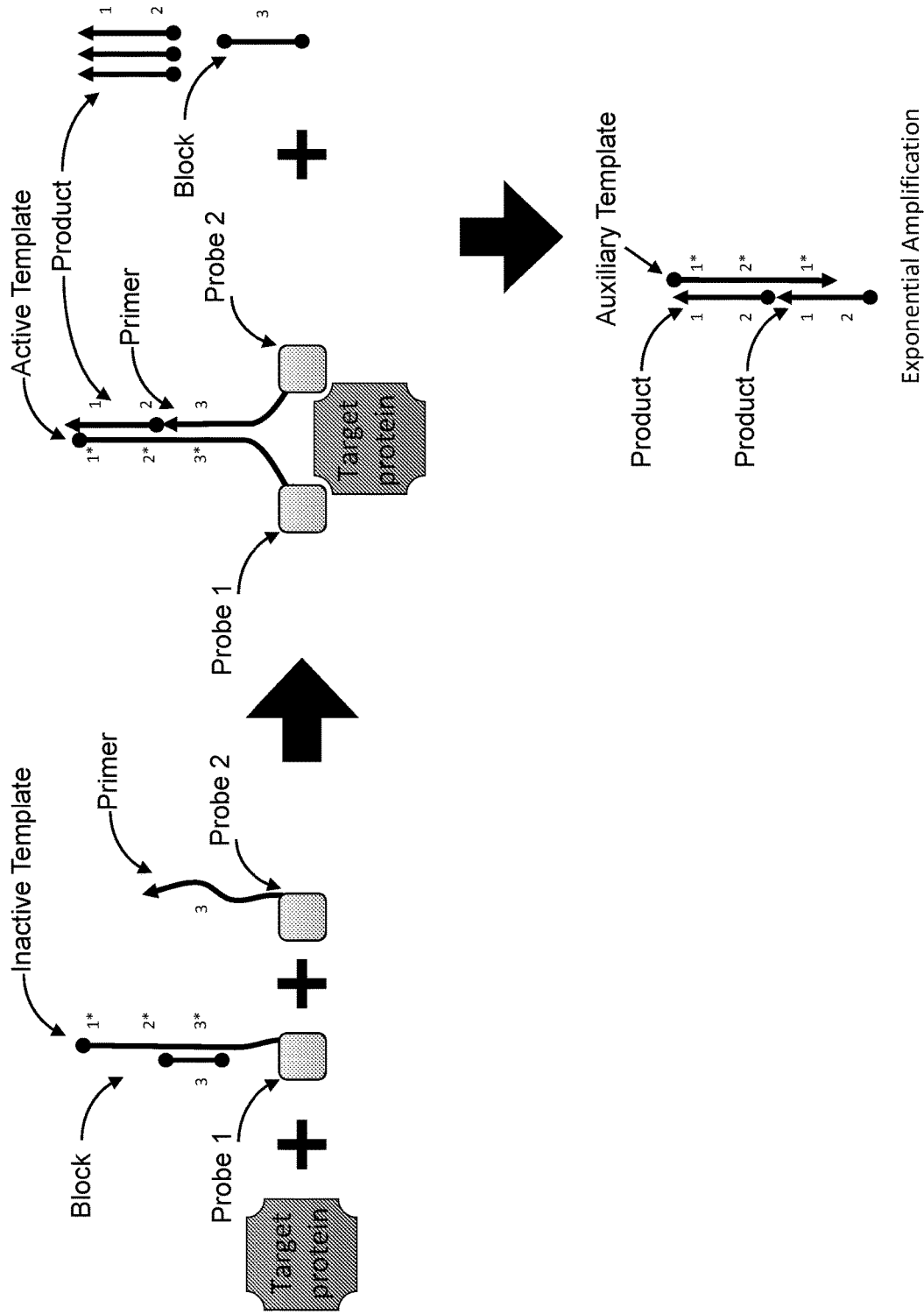
FIG. 13A illustrates a schematic of detection using detached exponential amplification in combination with attached strand displacement amplification (denoted "EXPAR reaction") where proximity induces strand displacement to generate an active substrate for polymerase and nicking endonuclease plus subsequent reactions to produce exponential growth.
Figure 13B:
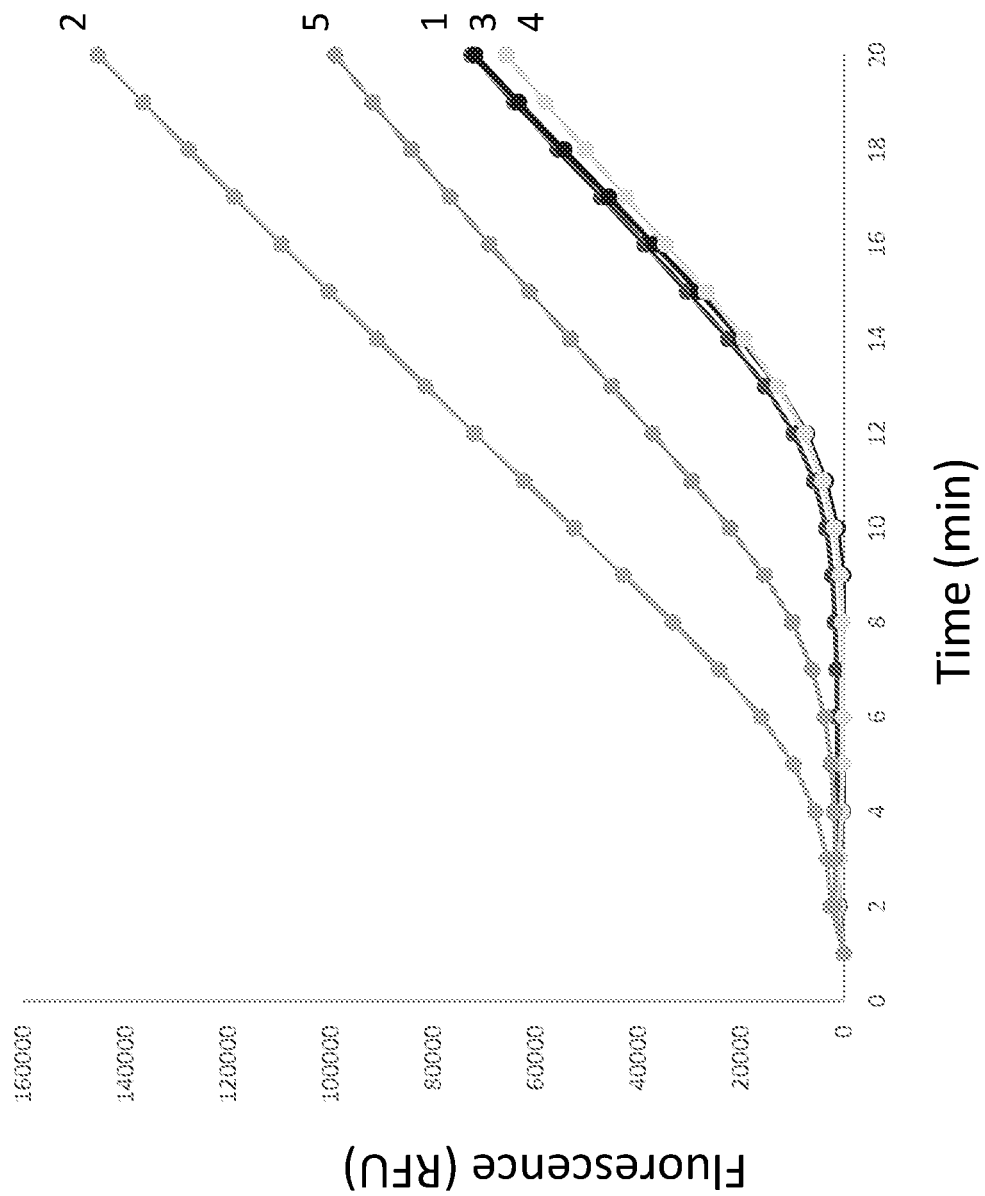
FIG. 13B illustrates fluorescence over time in the detection of analyte with EXPAR amplification.
Figure 13C:
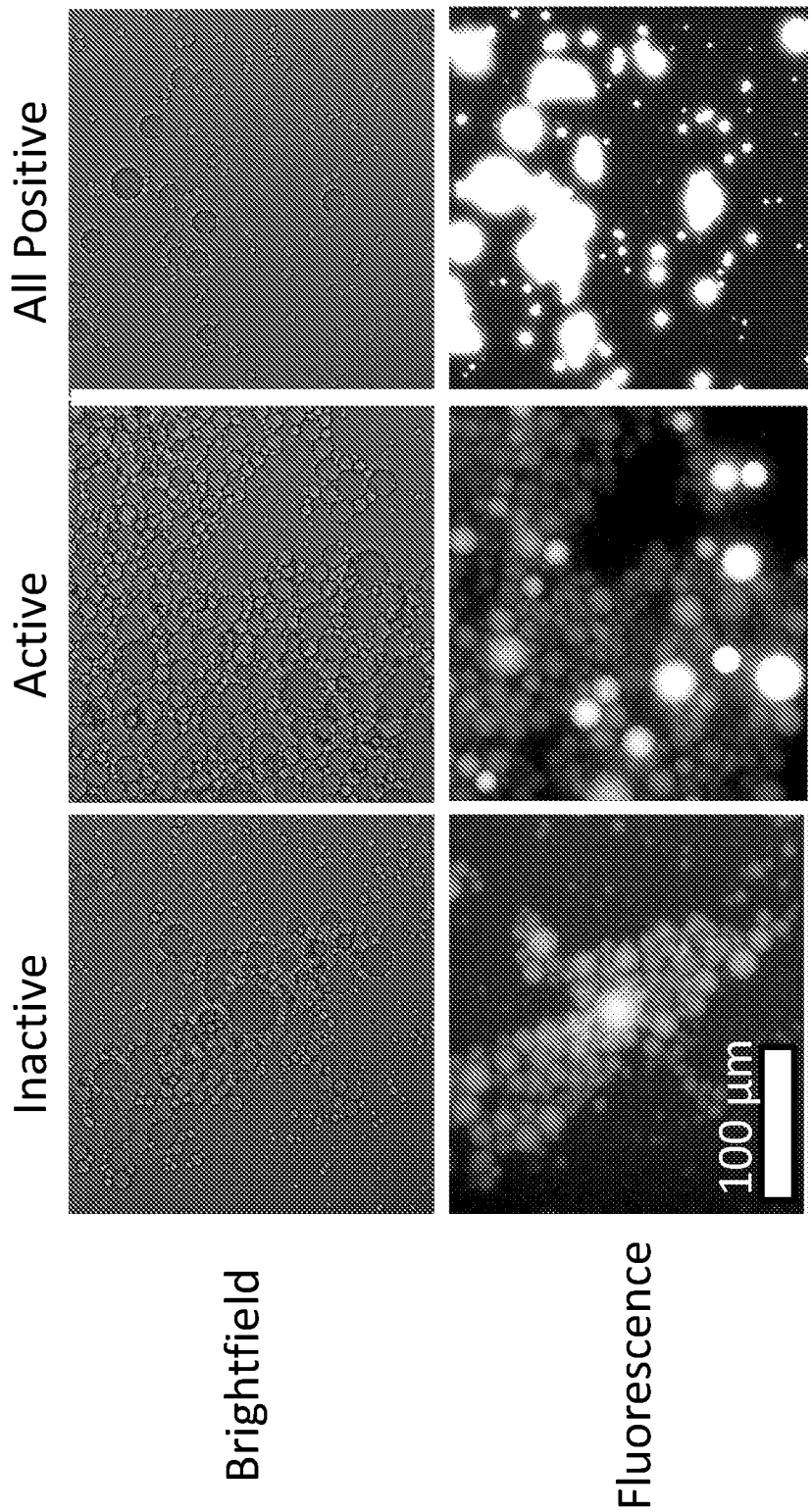
FIG. 13C illustrates end-point images of fluorescent droplets produced from a digital isothermal amplification assay.

FIG. 13A shows a schematic of the reaction, where proximity induces strand displacement to generate an active substrate for polymerase and nicking endonuclease plus subsequent reactions to produce exponential growth. FIG. 13B shows the detected fluorescence over time, and shows the effect of proximity driven by binding of DNA/probe to the target molecule (or target protein). Samples were prepared with: 1. template only; 2. positive control containing template and primer (no block); 3. negative control showing template-block; 4. negative control showing template-block+primer; and 5. experimental sample containing template-block, primer, and target protein. The positive control containing template and primer, and the experimental sample showed the highest levels of fluorescence over time. FIG. 13C shows images of the fluorescent droplets produced, enclosing samples. The top three images show the end-point brightfield images, while the bottom three images show the end-point fluorescence images. The images depict inactive template (left), active template (middle), and the limiting case with all droplets containing reaction product (right).

What is claimed is:

1. A method for digital detection of a protein analyte, the method comprising:
dividing a fluid into a plurality of compartmentalized fluid volumes to form a homogeneous assay, some of said plurality of compartmentalized fluid volumes being compartmentalized non-analyte-containing volumes and others of said plurality of compartmentalized fluid volumes being compartmentalized analyte-containing volumes; and
detecting a presence of the protein analyte in the compartmentalized analyte-containing volumes based on an optical signal from the plurality of compartmentalized fluid volumes,
wherein:
the optical signal is subsequent to a proximity-induced interaction in the compartmentalized analyte-containing volumes involving the protein analyte and a constituent of each compartmentalized fluid volume;
the proximity-induced interaction precedes an isothermal amplification reaction;
the proximity-induced interaction is a digital isothermal reaction;
each fluid volume of the plurality of compartmentalized fluid volumes comprises:
a first probe comprising a first binding portion configured to bind to the protein analyte, said first binding portion bonded to a first nucleic acid molecule; and
a second probe comprising a second binding portion configured to bind to the protein analyte, said second binding portion bonded to a second nucleic acid molecule;
the proximity-induced interaction occurs between the first probe and second probe upon binding to the protein analyte;
the optical signal comprises a fluorescence signal, an absorption signal, a luminescent signal, or any combination thereof;
prior to the proximity-induced interaction, the second nucleic acid molecule is bound to a non-extendable blocker oligonucleotide;
the proximity-induced interaction comprises an interaction between the first and second nucleic acid molecules that displaces the non-extendable blocker oligonucleotide into solution;
the isothermal amplification reaction comprises inducing templated polymerization to extend the first nucleic acid molecule after displacement of the non-extendable blocker oligonucleotide;
each fluid volume comprises a nicking endonuclease configured to cleave an extended first nucleic acid molecule, allowing a first release of a nicked portion of the extended first nucleic acid molecule into solution;
the fluorescence is measured subsequently to the first release of the nicked portion of the extended first nucleic acid molecule in the compartmentalized analyte-containing volumes;
each fluid volume comprises a plurality of auxiliary substrates, said auxiliary substrates each comprising an auxiliary nucleic acid chain;
the auxiliary nucleic acid chain is configured to bind to the nicked portion of the extended first nucleic acid molecule to thereby form in solution an auxiliary nucleic acid complex comprising the nicked portion of the extended first nucleic acid molecule and the auxiliary nucleic acid chain;
the auxiliary nucleic acid complex is configured to extend the nicked portion of the extended first nucleic acid molecule; and
the nicking endonuclease is configured to repeatedly remove a part of an extended nicked portion of the extended first nucleic acid molecule, the removed part of the extended nicked portion of the extended first nucleic acid molecule comprising a copy of the nicked portion of the extended first nucleic acid molecule.

2. The method of claim 1, further comprising counting the number of compartmentalized fluid volumes of the plurality of compartmentalized fluid volumes in which the fluorescence signal is generated and thereby generating an analyte count for a sample.

3. The method of claim 2, wherein the analyte count is generated based on Poisson statistics.

4. The method of claim 1, wherein the isothermal amplification reaction comprises a digital isothermal reaction, a strand displacement interaction, an enzyme-free hybridization chain reaction, a proximity-induced rolling circle amplification, an exponential amplification reaction, a cascade dequenching reaction, a loop mediated isothermal amplification reaction, or any combination thereof.

5. The method of claim 1, wherein the method is performed without a ligase.

6. The method of claim 1, wherein after the dividing the fluid into the plurality of compartmentalized fluid volumes, each fluid volume is contained within a single container until detecting the presence of the protein analyte using the optical signal.

7. The method of claim 1, wherein the method is performed without a washing step.

8. The method of claim 1, wherein:
the isothermal amplification reaction repeatedly extends the first nucleic acid molecule and the nicking endonuclease repeatedly cleaves the extended first nucleic acid molecule, thereby generating a plurality of the nicked portion of the extended first nucleic acid molecule;
each fluid volume contains a plurality of fluorescent moieties configured to bind to the plurality of the nicked portion of the extended first nucleic acid; and
the fluorescence signal is triggered by a binding of a fluorescent moiety of the plurality of fluorescent moieties to a plurality of the nicked portions of the first nucleic acid molecule and illuminating the plurality of compartmentalized fluid volumes with light to the bound fluorescent moiety of the plurality of fluorescent moieties, thereby inducing fluorescence from the bound fluorescent moiety.

9. The method of claim 1, wherein at least some portion of the plurality of auxiliary substrates are each bound to an auxiliary non-extendable blocker oligonucleotide, and wherein the auxiliary nucleic acid chain is configured to bind to the nicked portion of the extended first nucleic acid molecule, thereby displacing the auxiliary non-extendable blocker oligonucleotide.

10. The method of claim 1, wherein the plurality of auxiliary substrates comprises an auxiliary substrate designed to bind to the extended nicked portion of the extended first nucleic acid molecule.

11. The method of claim 1, wherein:
the isothermal amplification reaction is a rolling circle amplification;
the second probe includes a rolling circle amplification substrate comprising a circular nucleic acid chain bound to the second nucleic acid molecule; and
the circular nucleic acid chain comprises a first binding site to bind the first nucleic acid molecule and a second binding site to bind the second nucleic acid molecule, the circular nucleic acid chain having an equal or higher affinity between the first binding site and the first nucleic acid molecule than between the second binding site and the second nucleic acid molecule.

12. The method of claim 11, wherein the second binding site comprises one or more mismatched nucleic acids not complementary to corresponding nucleic acids of the second nucleic acid molecule.

13. The method of claim 1, wherein during the isothermal amplification reaction, the second nucleic acid molecule is extended using the first nucleic acid molecule as a template.

14. The method of claim 1, wherein:
the first nucleic acid molecule is bound to an extendable substrate prior to the proximity-induced interaction;
the proximity-induced interaction causes the extendable substrate to be released into solution;
the release of the extendable substrate triggers an exponential amplification reaction.

15. The method of claim 1, wherein the plurality of compartmentalized fluid volumes are essentially closed fluid systems upon the dividing and at least until the detecting the presence of the protein analyte using the optical signal.

16. The method of claim 1, wherein the compartmentalized analyte-containing volumes comprise droplets.

17. The method of claim 1, wherein while detecting the presence of the protein analyte using the optical signal, each of the plurality of compartmentalized fluid volumes consists essentially of the respective compartmentalized fluid volumes produced by the dividing step and any optical signal produced therefrom.

* * * * *

SEQUENCE LISTING

```
<160> NUMBER OF SEQ ID NOS: 10

<210> SEQ ID NO 1
<211> LENGTH: 10
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 1
ctcacgctac                                                             10

<210> SEQ ID NO 2
<211> LENGTH: 30
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 2
ctcacgctac ggacgactct ctcacgctac                                       30
```

```
<210> SEQ ID NO 3
<211> LENGTH: 10
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 3
gtagcgtgag                                                            10

<210> SEQ ID NO 4
<211> LENGTH: 60
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 4
ctttaactca cactcacgct acggacgact ctatgatggt acctgcttct gaattctaaa    60

<210> SEQ ID NO 5
<211> LENGTH: 40
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 5
tttagaattc agaagcaggt accatcatag agtcgtccgt                           40

<210> SEQ ID NO 6
<211> LENGTH: 39
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 6
tttagaattc agaagcaggt accatcatag agtcgtccg                            39

<210> SEQ ID NO 7
<211> LENGTH: 32
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 7
tttagaattc agaagcaggt accatcattt tt                                   32

<210> SEQ ID NO 8
<211> LENGTH: 28
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 8
tttagaattc agaagcaggt accatcat                                        28

<210> SEQ ID NO 9
```

```
<211> LENGTH: 22
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 9
attgtactca cgctactaca at                                              22

<210> SEQ ID NO 10
<211> LENGTH: 15
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 10
tttttctcac gctac                                                      15
```